United States Patent [19]
Takeuchi et al.

[11] Patent Number: 5,820,053
[45] Date of Patent: Oct. 13, 1998

[54] SPINNING REEL FOR FISHING HAVING A MECHANISM FOR SECURING THE SPOOL DURING FISHLINE CASTING

[75] Inventors: Shinji Takeuchi, Hiroshima; Akira Yamaguchi, Saitama, both of Japan

[73] Assignee: Daiwa Seiko, Inc., Tokyo, Japan

[21] Appl. No.: 748,863

[22] Filed: Nov. 14, 1996

[30] Foreign Application Priority Data

| Nov. 14, 1995 | [JP] | Japan | 7-319490 |
| Dec. 19, 1995 | [JP] | Japan | 7-348820 |
| Feb. 13, 1996 | [JP] | Japan | 8-049574 |
| Mar. 14, 1996 | [JP] | Japan | 8-085648 |
| Jun. 26, 1996 | [JP] | Japan | 8-185649 |

[51] Int. Cl.$^6$ .............................................. A01K 89/027
[52] U.S. Cl. ........................................ 242/247; 242/231
[58] Field of Search .................. 242/231, 232, 242/233, 247

[56] References Cited

U.S. PATENT DOCUMENTS

| 3,045,942 | 7/1962 | Henze . | |
| 3,586,255 | 6/1971 | Monthulet . | |
| 4,256,271 | 3/1981 | Ruin | 242/232 |
| 4,426,045 | 1/1984 | Gifford | 242/232 |
| 4,509,705 | 4/1985 | Councilmen et al. . | |
| 4,634,074 | 1/1987 | Ohmori | 242/231 |
| 5,350,132 | 9/1994 | Hitomi | 242/232 |
| 5,524,832 | 6/1996 | Sakaguchi | 242/233 |

FOREIGN PATENT DOCUMENTS

| 0 026 084 | 4/1981 | European Pat. Off. . |
| 0 467 812 | 1/1992 | European Pat. Off. . |
| 905 268 | 11/1945 | France . |
| 1 561 190 | 2/1969 | France . |
| 2 462 098 | 7/1979 | France . |
| 6-37656 | 10/1994 | Japan . |

*Primary Examiner*—Katherine Matecki
*Attorney, Agent, or Firm*—Sughrue, Mion, Zinn, Macpeak & Seas, PLLC

[57] ABSTRACT

In a spinning reel for fishing, by moving an actuator in accordance with an operation to move a bail support member from a fishing line retrieving position to a fishing line casting position, a cam surface of the actuator contacts with a cam surface of a securing member to bring a securing claw of the securing member into engagement with one of several securing grooves provided on the spool, thereby preventing the spool against rotation. On the other hand, movement of the actuator in accordance with a return operation to return the bail support member back to the fishing line retrieving position, separates the securing claw that was engaged with the securing grove from the securing groove, thereby allowing the spool to rotate.

5 Claims, 35 Drawing Sheets

SPINNING REEL FOR FISHING HAVING A MECHANISM FOR SECURING THE SPOOL DURING FISHLINE CASTING

BACKGROUND OF THE INVENTION

The present invention relates to a spinning reel for fishing and, in particular, to a bail reversing and returning mechanism in a spinning reel including a drag mechanism.

In a conventional spinning reel including a drag mechanism, when a bail is reversed and a fishing line is cast, the drag force may be set to a weak level. This is done in consideration of the possibility that the fishing line might be cut when the fish hits the bait. At the moment the terminal tackles of the spinning reel are thrown with fingers placed on the fishing line, the spool may rotate due to the weight of the terminal tackles, thereby causing the fishing line to be cast further than necessary, with the result that the fingers can be damaged. Therefore, in order to solve this problem, there is conventionally known a spinning reel which is disclosed in Japanese Utility Model No. 6-37656 of Heisei. In this spinning reel, the rotation of the spool can be locked in conjunction with the reversing operation of the bail to its fishing line casting position.

However, in this conventional spinning reel, since the spool is locked to and engaged with a reel main body through a lock member supported on a rotor when the fishing line is cast, the rotation of the rotor is also locked, with the result that the bail must be returned from its fishing line casting position to its fishing line retrieving position directly by hand. This makes it troublesome to return the bail to the fishing line retrieving position successively after the fishing line is cast, resulting in poor efficiency operation of the spinning reel.

SUMMARY OF THE INVENTION

The present invention provides a spinning reel for fishing, comprising:
  a rotor rotatable in accordance with operation of a handle for winding a fishing line around a spool;
  a spool shaft supporting the spool and being frictionally coupled to the spool;
  a bail pivotable with respect to the rotor and movable from a fishing line casting position to a fishing line retrieving position and vice versa;
  a first engagement member non-rotatably supported on the spool shaft;
  a second engagement member interposed between the first engagement member and the spool, and movable radially with respect to the spool so that the first engagement member is operatively engaged with and disengaged from the spool;
  first means for radially moving the second engagement member to engage the first engagement member with the spool to thereby prevent the spool from rotating relative to the spool shaft when the bail is switched from the fishing line retrieving position to the fishing line casting position, and
  second means for radially moving the second engagement member to disengage the first engagement member from the spool to thereby permit the spool to rotate relative to the spool shaft when the bail is switched from the fishing line casting position to the fishing line retrieving position upon rotation of the handle.

The present invention provides a spinning reel for fishing of a type that a bail support member is supported on a rotor rotatable in accordance with operation of a handle in such a manner that the bail support member can be freely reversed between a fishing line retrieving position and a fishing line casting position, and that a return mechanism is provided for returning the bail support member from the fishing line casting position to the fishing line retrieving position by rotating the rotor in a fishing line retrieving direction, said spinning reel for fishing comprising:
  a securing claw member engageable with and disengageable from a securing groove formed in an inner peripheral surface of a spool, radially movably mounted on a support body non-rotatably supported on a spool shaft, and energized in a direction to disengage from the securing groove; and,
  an actuator rotatable together with the rotor and axially movable with respect to the rotor, the actuator including an engaging portion engageable with the securing claw member,
  wherein said actuator is moved in accordance with reversing operation of the bail support member from the fishing line retrieving position to said fishing line casting position so that the securing claw member is moved by contact with the engaging portion of the actuator to engage the securing groove to thereby prevent the spool from rotating, and
  wherein the securing claw is disengaged from the securing groove with movement of the actuator moved in linking with returning operation of the bail support member from the fishing line casting position to the fishing line retrieving position, thereby permitting the spool to rotate.

The present invention provides a spinning reel for fishing of a type that a bail support member is supported on a rotor rotatable in accordance with operation of a handle in such a manner that the bail support member can be freely reversed between a fishing line retrieving position and a fishing line casting position, and that an automatic return mechanism is provided for returning the bail support member from the fishing line casting position to the fishing line retrieving position by rotating the rotor in a fishing line retrieving direction, said spinning reel comprising:
  a securing claw member engageable with and disengageable from one of a securing portion formed in an inner peripheral surface of a spool and movably mounted on a support body non-rotatably supported on a spool shaft;
  energizing means for always energizing the securing claw member in a direction to engage the securing claw with the securing portion;
  an actuator rotatable together with the rotor and axially movable with respect to the rotor, wherein the actuator disengages the securing claw member from the securing portion upon its forward movement and contact with the securing claw; and,
  an actuator drive mechanism for moving the actuator in accordance with operation of said bail support member in such manner as to to retreat the actuator to thereby separate the actuator from said securing claw member when said bail support member is switched to the fishing line casting position and to move the actuator to thereby bring the actuator into contact with the securing claw when said bail support member is switched to the fishing line retrieving position.

The present invention provides a spinning reel for fishing of a type that a bail support member is supported on a rotor rotatable in accordance with operation of a handle in such a manner that the bail support member can be freely reversed between a fishing line retrieving position and a fishing line casting position, and that a return mechanism is provided for returning the bail support member from the fishing line casting position to the fishing line retrieving position by rotating the rotor in a fishing line retrieving direction, said spinning reel, comprising:

a securing body radially movably mounted on a support body non-rotatably supported on an inner peripheral portion of a spool so that the securing body is engageable with and disengageable from a securing portion of an engaging body non-rotatably mounted on a spool shaft; and, a moving member rotatable together with the rotor and axially movable with respect to the rotor for operatively moving the securing body radially, wherein, by moving the moving member in accordance with operation of the bail support member from the fishing line retrieving position to the fishing line casting position, the securing body is engaged with said securing portion to thereby prevent the spool from rotating, and wherein the securing body is disengaged from the securing portion by the action of the moving member being moved in accordance with a returning operation of the bail support member from the fishing line casting position to the fishing line retrieving position, to thereby permit the spool to rotate.

The present invention provides a spinning reel for fishing of a type that a bail support member is supported on a rotor rotatable in association with operation of a handle in such a manner that the bail support members can be freely reversed between a fishing line retrieving position and a fishing line casting position and that by rotating the rotor a fishing line is wound around a spool supported rotatably on a spool shaft through a drag mechanism, said spinning reel for fishing comprising:

a first lock member axially movably and non-rotatably arranged with respect to the spool, said first lock member being supported rotatably with respect to the spool shaft;

a second lock member non-rotatably supported on the spool shaft;

a connecting member axially movably and non-rotatably mounted on one of the first and second lock members, and adapted to be engaged with and disengaged from the other of the first and second lock members, wherein an engaging portion of the connecting member is brought into engagement with an engaging portion of said the other of the first and second lock members in accordance with reverse operation of the bail support member from the fishing line retrieving position to the fishing line casting position, so that the spool is prevented from rotating at the fishing line casting position of the bail support member, and, wherein by rotating the rotor in a fishing line retrieving direction the bail support member is returned from the fishing line casting position to the fishing line retrieving position through a reverse mechanism so that the spool is permitted to rotate at the fishing line retrieving position of the bail support member.

DETAILED DESCRIPTION OF THE PREFERRED EMBODIMENTS

Figure 1:
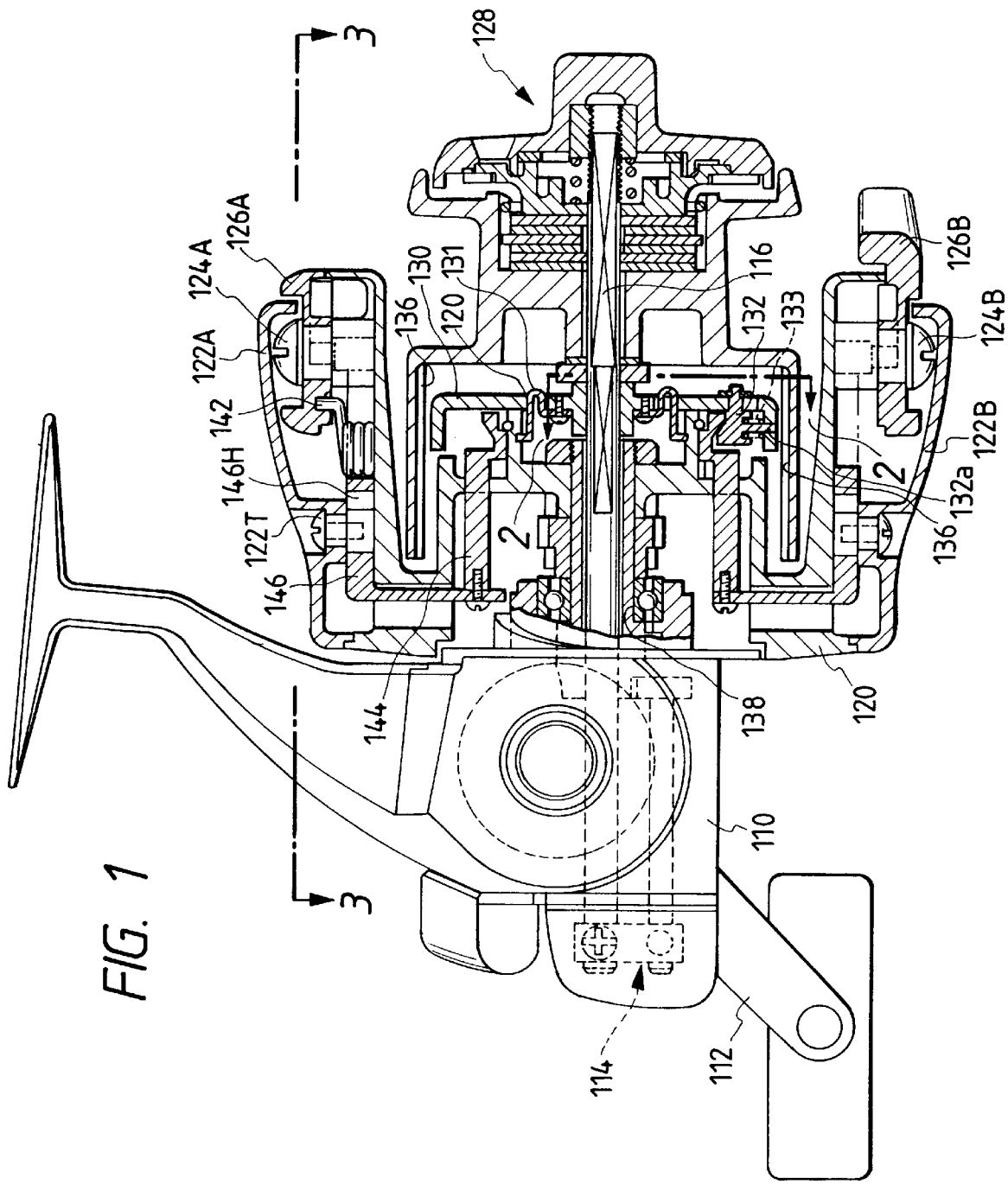
FIG. 1 is a sectional side view of a first embodiment of a spinning reel for fishing according to the invention.
Figure 2:
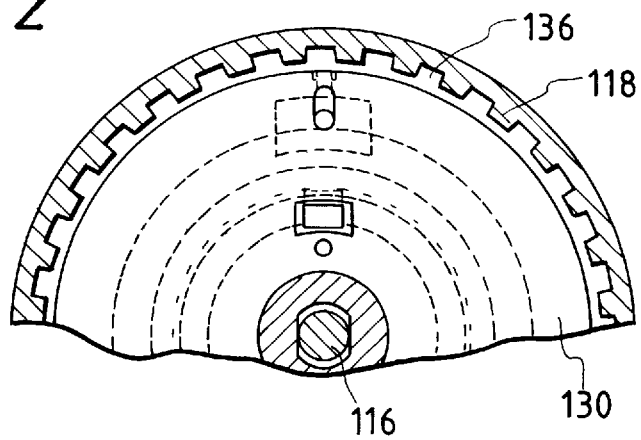
FIG. 2 is a partial section view taken along the line 2—2 shown in FIG. 1.

Now, description will be given below in detail of the embodiments of a spinning reel for fishing according to the invention with reference to the accompanying drawings.

As shown in FIGS. 1 to 5, in a spinning reel for fishing according to a first embodiment of the invention, by operating a handle 112, a spool shaft 116 can be reciprocated back and forth through a spool reciprocating mechanism 114 disposed in the interior of a reel main body 110. The spool shaft 116 includes a well-known drag mechanism 128 in the front portion thereof. Also, a rotary shaft cylinder 138 is slidably fitted with the outside of the spool shaft 116, while the rotary shaft cylinder 138 can be rotated in synchronization with the reciprocating motion of the spool shaft 116 in the back-and-forth direction thereof.

A rotor 120 is mounted such that it can be rotated integrally with the above-mentioned rotary shaft cylinder 138. The rotor 120 includes a pair of support arm portions 122A and 122B which are formed substantially on the opposite side to each other with respect to the spool shaft. 116. On the two support arm portions 122A and 122B, there are installed two bail support members 126A and 126B which are pivotable about pivot shaft members 124A and 124B. A bail 127 is installed in such a manner that it extends between the two bail support members 126A and 126B. Also, there is provided an energizing spring 142 which energizes the bail support member 126A in such a manner that the bail support member 126A can be selectively swiveled between a fishing line retrieving position P1 shown by a solid line in FIG. 3 and a fishing line casting position P2 shown by a two-dot chained line.

Figure 4:
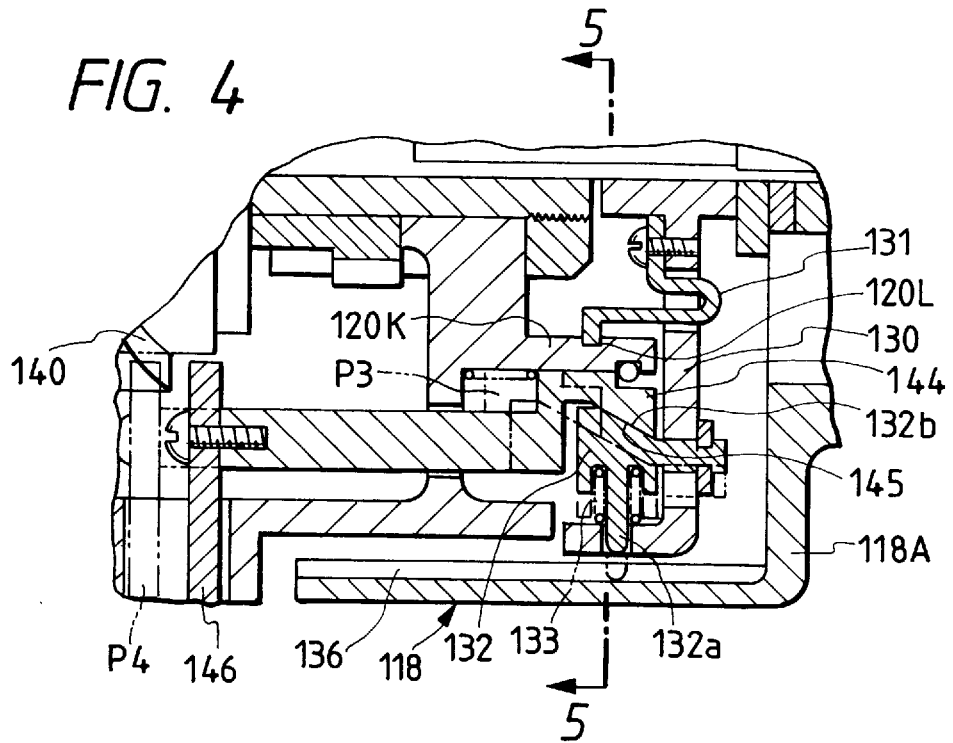
FIG. 4 is an enlarged sectional side view of the main portions the first embodiment of a spinning reel for fishing according to the invention.
Figure 5:
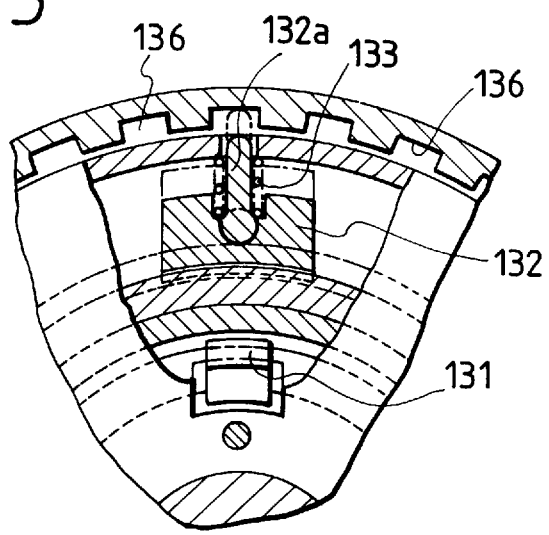
FIG. 5 is a sectional front view of a portion corresponding to the line 5—5 shown in FIG. 4.

On the spool shaft 116, there is attached a support body 130 which extends in the vertical direction intersecting at right angles to the spool shaft 116, is prevented against rotation with respect to the spool shaft 116, and is free from the back-and-forth motion of the spool shaft 116. Back-andforth motion of the support body 130, as can be understood most clearly from FIGS. 4 and 5, is restricted such that the leading end portion of an axial direction restrict member 131 fixedly attached to the support body 130 is engaged with an annular groove portion 120L formed in a wall surface 120K provided in the cylindrical portion of the rotor 120.

On the support body 130, there is attached a securing member 132 which is energized by a spring 133 radially inwardly (that is, in the direction toward the spool shaft 116 from the cylindrical portion (118A) side of a spool 118). The securing member 132 includes a securing claw 132a and a cam surface 132b. The securing claw 132a, due to the energizing force of the spring 133, is normally disengaged from one of a plurality of securing grooves 136 so formed in the inner peripheral surface of the cylindrical portion 118A of the spool 118 as to extend in the longitudinal direction of the cylindrical portion 118A. On the other hand, the cam surface 132b, as an actuator 144 to be described later is moved backwardly, is contacted with and driven by a cam surface 145 of the actuator 144 to move the securing member 132 radially outwardly to thereby bring the securing claw 132a of the securing member 132 into engagement with one of the securing grooves 136 of the spool 118. Here, while the rotor 120 is set in the fishing line retrieving state, the cam surface 132b of the securing member 132 is separated from the cam surface 145 of the actuator 144 and, therefore, the fishing line retrieving operation can be executed rhythmically and smoothly.

Figure 3:
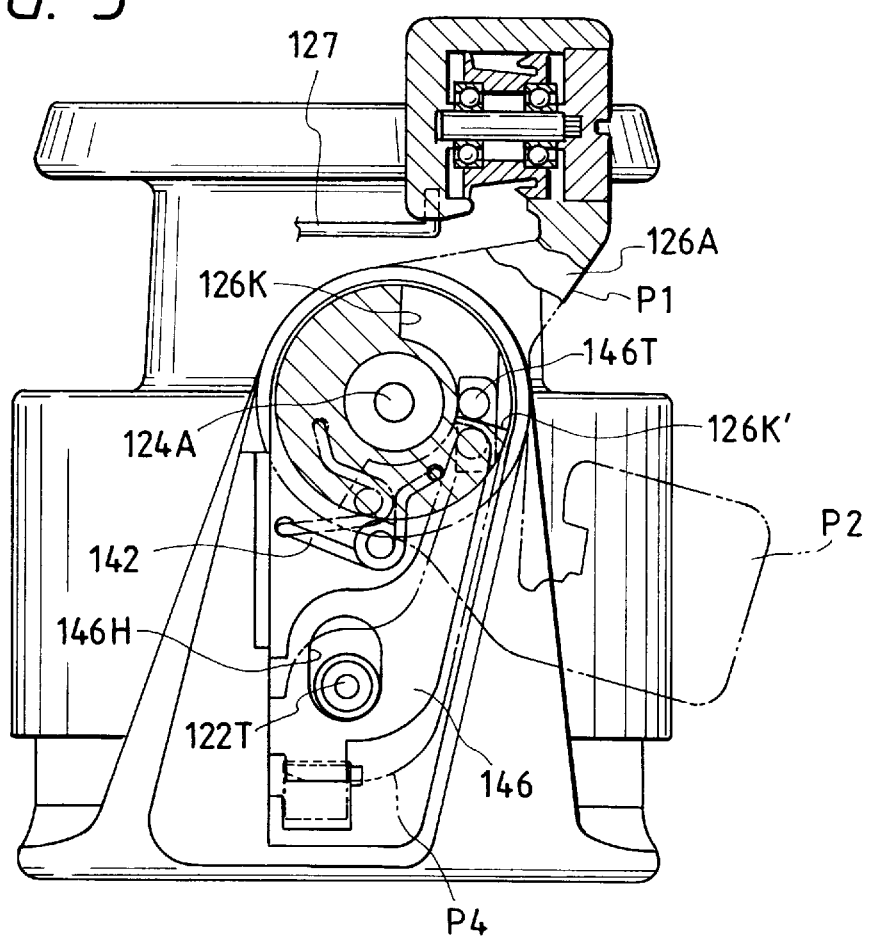
FIG. 3 is a section view taken along the line 3—3 shown in FIG. 1.

Within the support arm portion 122A of the rotor 120, there is incorporated a kick member 146 used as an actuator (144) drive mechanism which includes an elongated hole 146H with a shaft pin 122T inserted therethrough, while the shaft pin 122T is also used to fix a cover member for the support arm portion 122A. The kick member 146 has an L shape in section as shown in FIG. 1, while having a plane shape when viewed from the vantage shown in FIG. 3. With reference to FIG. 3, the kick member 146 includes an engaging projection portion 146T in the tip end portion thereof. Due to mutual interference between the engaging projection portion 146T and an engaging wall portion 126K' or 126K formed in the inner surface of the base portion of the bail support member 126A, the kick member 146 can be selectively moved to either one of a position shown in FIG. 3 or a position P4 shown by a two-dot chained line. Thanks to this, if the bail support member 126A is switched from the fishing line retrieving position P1 shown by the solid line down to the fishing line casting position P2 shown by the two-dot chained line, then the kick member 146 is pressed down to the position P4 rearwardly of the spinning reel.

The kick member 146 is connected integrally with the actuator 144. That is, if the kick member 146 is moved down to the position P4 rearwardly of the reel, then the actuator 144 is moved down to the position P3 shown by a two-dot chained line in FIG. 4, so that the cam surface 145 of the actuator 144 is contacted with the cam surface 132b of the securing member 132 and the securing member 132 is pressed to thereby push out the securing claw 132a outwardly against the energizing force of the spring 133 until the securing claw 132a of the securing member 132 is engaged with the engaging groove 136 of the spool 118. As a result, in an actual fishing operation, when the bail support member 126A (bail 127) is switched over to the fishing line casting position P2 and the fishing line is cast, the spool is prevented from rotating by the securing claw 132a. Therefore, even if the drag mechanism 128 is set to a weak level, the problem of undesired rotation of that the spool 118 can be eliminated.

In this fishing line casting state, the rotation of the rotor 120 is not restricted and, immediately after the fishing line is cast, the rotor 120 can be rotated by operating the handle 112. In the front portion of the reel main body 110, there is formed a cam surface 140 having such a shape as shown in FIG. 4. When the kick member 146 is retreated to and is held at the position P4, the kick member 146 interferes with the cam surface 140 as the rotor 120 is rotated. That is, if the rotor 120 is rotated in the fishing line retrieving direction, then the kick member 146 is pushed by the cam surface 140 so that it is moved to the front portion of the reel. With the forward movement of the kick member 146, the actuator 144 is also moved to a position shown by a solid line to thereby remove the engagement of the actuator 144 with the securing member 132. Consequently, the securing member 132 is allowed to return to its original position due to the energizing force of the spring 133 to thereby remove the engagement of the securing claw 132a with the securing groove 136 of the spool 118.

In accordance with the first embodiment, the above-described cam mechanism is one elegant design of an automatic return mechanism which is able to return the bail support member automatically from the fishing line casting position to the fishing line retrieving position. However, this is not limitative but, for example, there can also be employed a return mechanism which is structured such that a projecting portion is provided on the front side of the leg of the reel and, as the rotor is rotated in the fishing line retrieving direction, the bail support member 126A buts against the projecting portion so that the bail support member 126A can be returned automatically.

Figure 7:
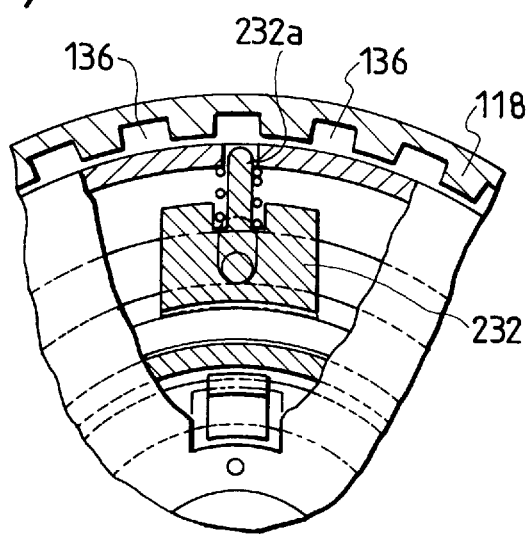
FIG. 7 is a sectional front view of a portion corresponding to the line 7—7 shown in FIG. 6.
Figure 8:
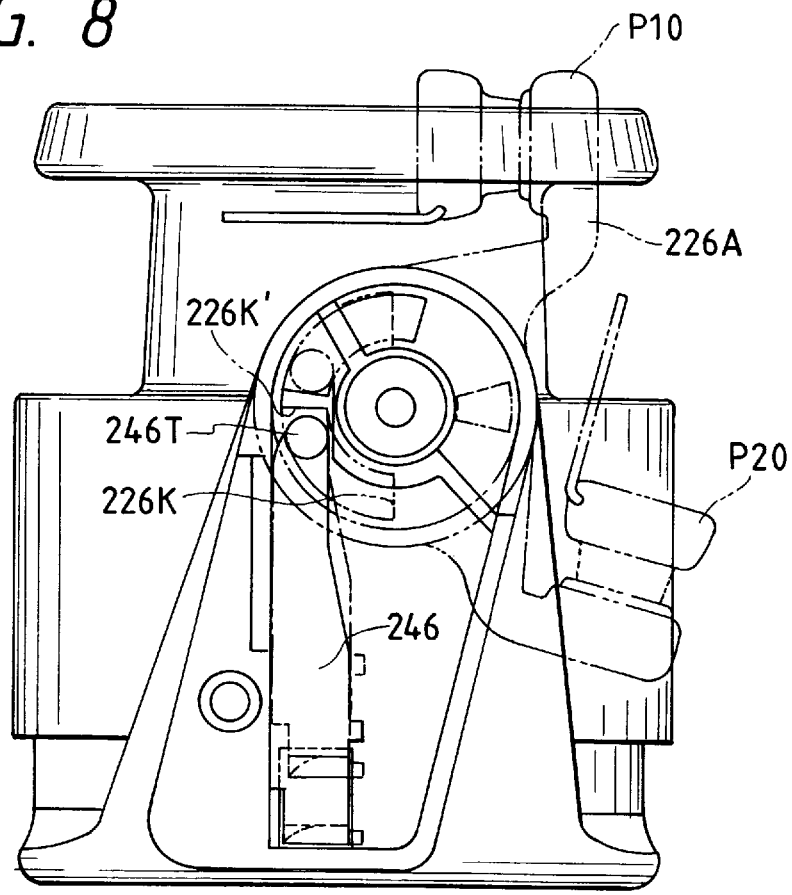
FIG. 8 is a sectional plan view of the second embodiment.

Next, description will be given below of a second embodiment of a spinning reel for fishing according to the invention with reference to FIGS. 6 to 8.

As described above, the spinning reel according to the first embodiment is structured such that, by moving the actuator 144 to the rear side of the reel, the securing claw 132a of the securing member 132 can be advanced toward the engaging groove 136 of the spool 118. Contrary to this, the spinning reel according to the second embodiment is structured such that, by moving an actuator 244 forwardly, a securing claw 232a of a securing member 232 can be advanced toward the securing groove 136 of the spool 118. That is, with the securing member 232 positioned in front of the actuator 244, if the actuator 244 is moved forwardly, a cam surface 245 formed in the actuator 244 contacts with a cam surface 232b formed in the securing member 232 to thereby forcibly move the securing member 232 radially outwardly against the energizing force of the spring 133 in such a manner as shown by a two-dot chained line. With the movement of the securing member 232, as shown by the two-dot chained line, the securing claw 232a of the securing member 232 is caused to go into the securing groove 136 of the spool 119, so that the securing claw 232a engages with the spool 118 to thereby prevent the spool 118 against rotation.

Here, when the actuator 244 is moved to the front portion of the reel, in order to be able to bring the securing claw 232a of the securing member 232 into engagement with the securing groove 136 of the spool 118, a kick member 246 is structured in such a manner that it can be distributed or switched between a position shown by a solid line and a position shown by a two-dot chained line due to mutual interference between an engaging projection portion 246T formed in the front portion of the kick member 246 and an engaging wall portion 226K' or 226K formed in the inner surface of the base portion of a bail support member 226A.

Figure 6:
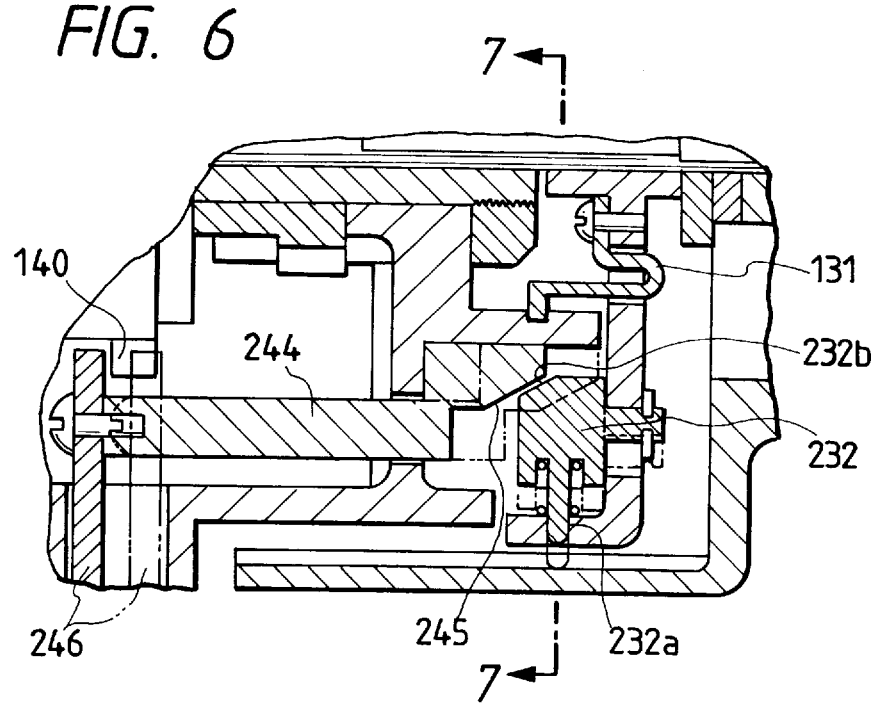
FIG. 6 is an explanatory view of the main portions of a second embodiment of a spinning reel for fishing according to the invention.

Due to this structure, when the bail support member 226A is switched from a fishing line retrieving position P10 down to a fishing line casting position P20, then the kick member 246, as shown by a two-dot chained line in FIG. 6, is pushed forwardly within the reel to thereby move the actuator 244 forwardly, with the result that the securing claw 232a of the securing member 232 moves against the energizing force of the spring 133 and thereby engages with the securing groove 136 of the spool 118.

Figure 9:
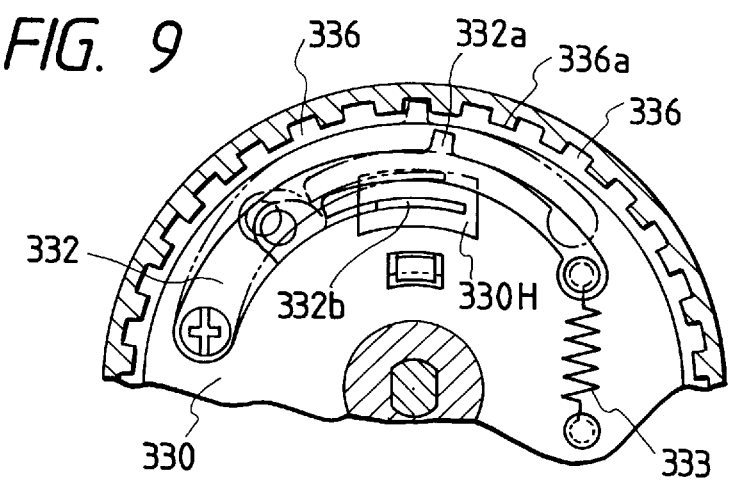
FIG. 9 is an explanatory view of the main portions of a third embodiment of a spinning reel for fishing according to the invention.

Next, description will be given below of a third embodiment of a spinning reel for fishing according to the invention with reference to FIGS. 9 and 10.

In the spinning reel according to the third embodiment, a securing member 332 including a securing claw 332a engageable with a securing groove 336 is disposed on the front surface side of a support body 330.

The securing member 332, which is formed in an arc shape, has one end side mounted fixedly on the support body 330, while the other end side thereof is energized by energizing means 333 such as a spring or the like in a direction to separate the securing claw 332a of the securing member 332 from the securing groove 336 of the spool. Also, the securing member further includes an elastically deforming portion 332b. The elastically deforming portion 332b is structured such that it extends through a hole portion 330H formed in the support body 330 and further extends rearward within the reel. As can be seen from FIG. 10, in the fishing line retrieving operation, the leading end of the elastically deforming portion 332b is opposed to a cam surface 345 formed in the leading end portion of an actuator 344 in such a manner that they are spaced from each other.

Figure 10:
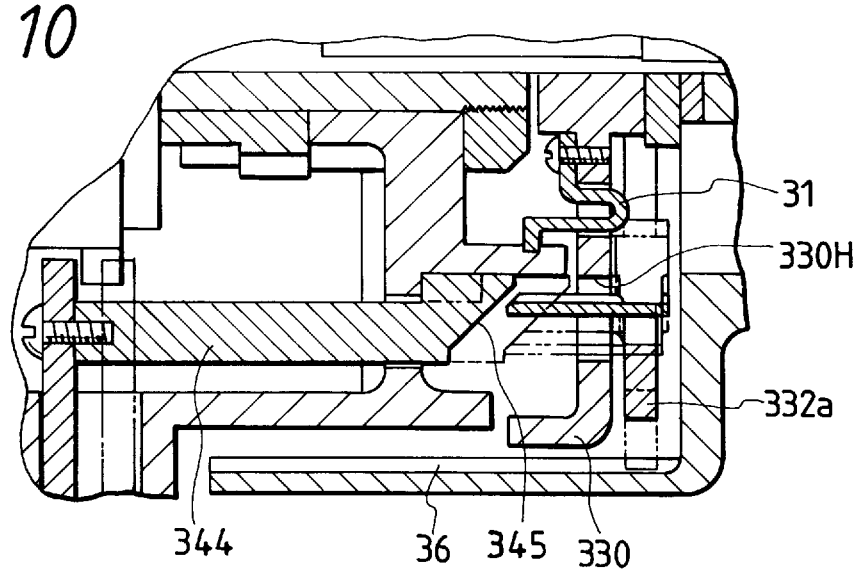
FIG. 10 is an explanatory view of the main portions of a third embodiment of a spinning reel for fishing according to the invention.

During the fishing line casting operation, similarly to the previously-mentioned second embodiment, the actuator 344 is moved forwardly and thus can be situated at a position shown by a two-dot chained line in FIG. 10. In this state, the cam surface 345 formed in the leading end portion of the actuator 344 is pressed forwardly against the end portion of the elastically deforming portion 332b of the securing member 332, so that the elastically deforming portion 332b of the securing member 332 is deformed along the cam surface 345 of the actuator 344. In particular, the elastically deforming portion 332b is deformed radially outwardly in FIG. 9 and, with the deformation of the elastically deforming portion 332b, the securing member 332 is also deformed in such a manner as shown by a two-dot chained line, so that the securing claw 332a formed on the outside of the securing member 332 engages with the securing groove 336 of the spool.

Here, the securing claw 332a of the securing member 332 can be engaged with the securing groove 336 of the spool when the spool is held at a given angle of rotation. On the other hand, when the securing claw 332a faces a projecting portion 336a formed between the two mutually adjoining securing grooves 336, the securing claw 332a cannot be engaged with securing groove 336 properly. However, even if the securing claw 332a abuts against the projecting portion 336a in this manner, the deformation of the elastically deforming portion 332b can absorb this abnormal positional relationship between the securing claw 332a and the securing groove 336 and permits the forward movement of the actuator 344 until it reaches the proper fishing line casting position. Further, due to this deformation, the spool is energized and rotated slightly so that the support body 330 is rotated up to a fishing line casting position, and the securing claw 332a of the securing member 332 is properly engaged with one of the securing grooves 336 of the spool.

Figure 11:
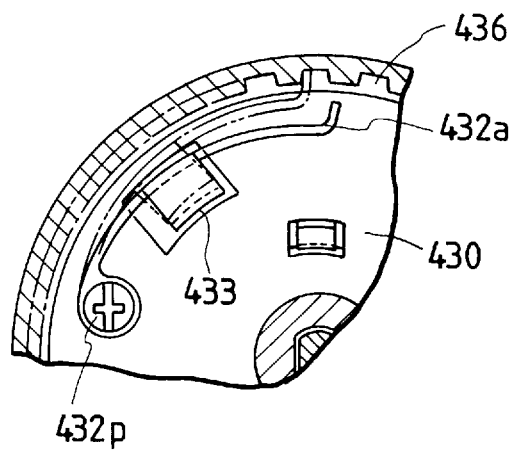
FIG. 11 is an explanatory view of the main portions of a fourth embodiment of a spinning reel for fishing according to the invention.
Figure 12:
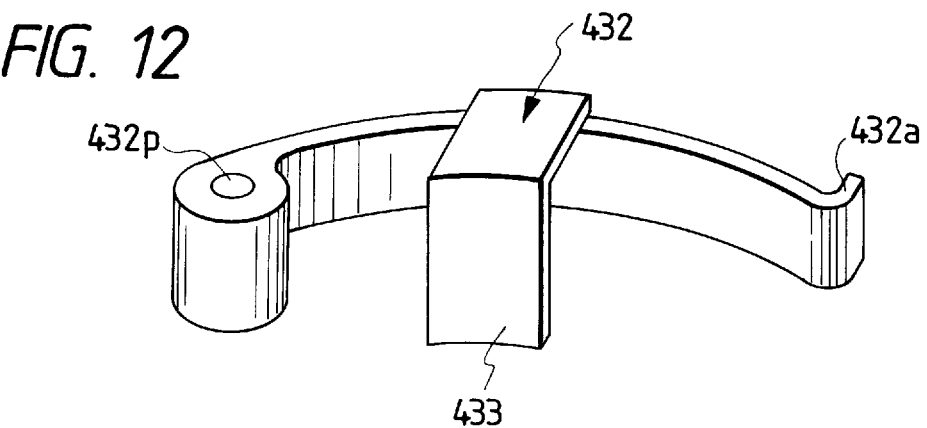
FIG. 12 is a perspective view of a securing member used in the fourth embodiment.

Referring now to FIGS. 11 and 12, there is shown a fourth embodiment of a spinning reel for fishing according to the invention, in which the spring that is employed in the previously described third embodiment to energize the securing member is omitted. In the fourth embodiment, a securing member 432 is structured such that it has a spring property. A support portion 432P formed on one end side of the securing member 432 is securely fixed to a support body 430, and, on the other end side of the securing member 432, there is provided a securing claw 432a which is engageable with one of a plurality of securing grooves 436 formed in the inner peripheral surface of the spool. That is, the securing member 432 is formed as a cantilever type support spring.

In the fourth embodiment as well, there is a pressed portion 433, to be contiguously pressed by a cam surface (not shown) of the actuator tip, which is similar to the elastically deforming portion employed in the previously described third embodiment. When a fishing line is cast, the leading end of the actuator is pressed against the pressed portion 433 to thereby deform the securing member 432 into a position shown by a two-dot chained line in FIG. 11, so that the securing claw 432a of the securing member 432 engages with one of the securing grooves 436 formed on the inside of the spool. Then, if a fishing line retrieving operation is carried out, the interference of the leading end of the actuator with the pressed portion 433 is removed to thereby allow the securing member 432 to return to its original position shown by a solid line due to its own elastic force or spring property, so that the engagement of the securing claw 432a with the securing groove 436 can be removed.

Figure 13:
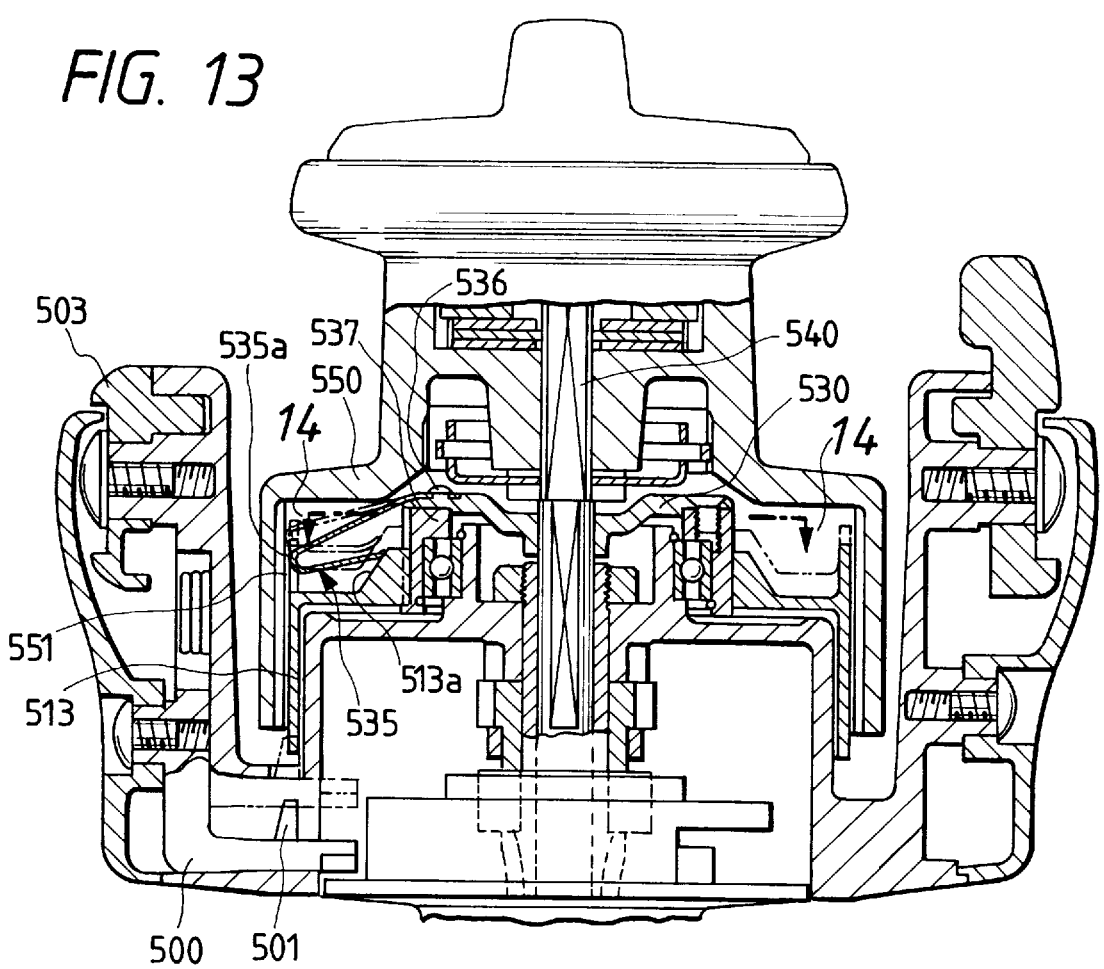
FIG. 13 is a sectional side view of a fifth embodiment of a spinning reel for fishing according to the invention.
Figure 14:
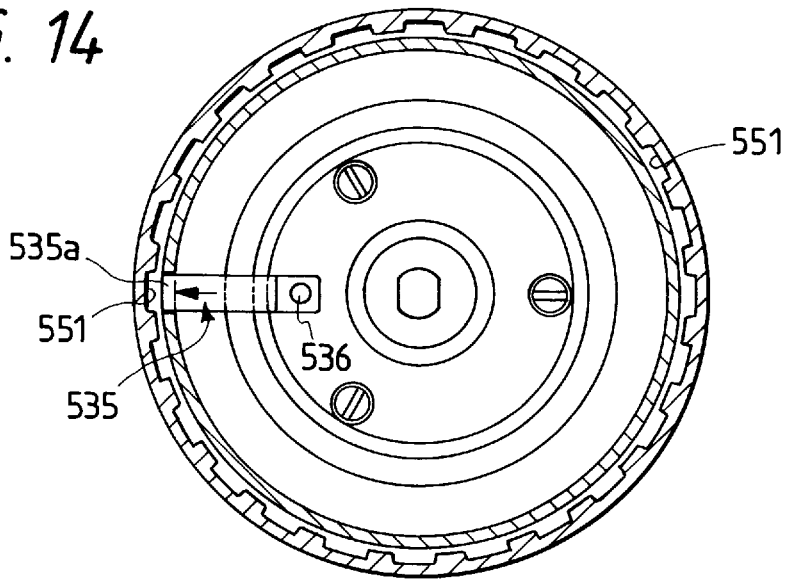
FIG. 14 is a section view taken along the line 14—14 shown in FIG. 13.
Figure 15:
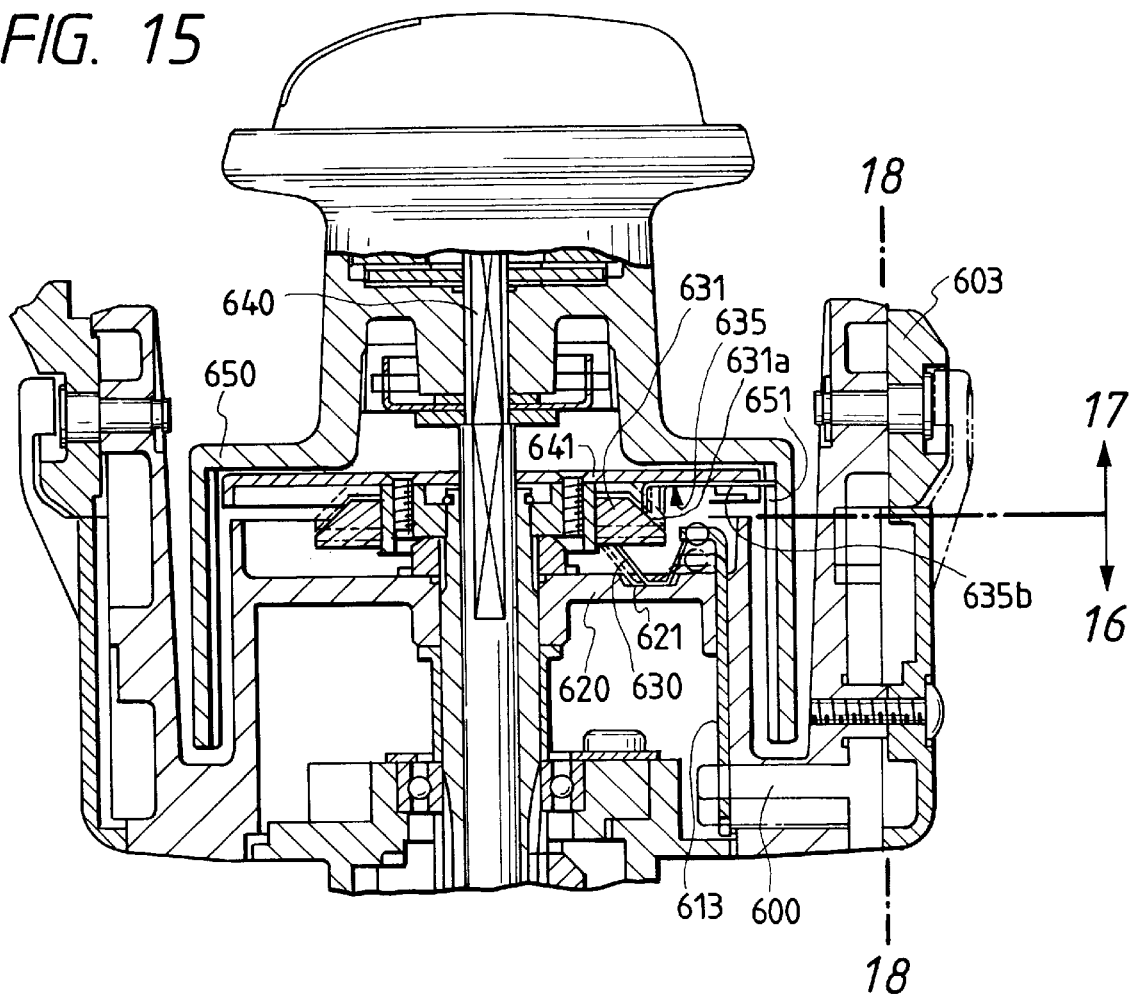
FIG. 15 is a sectional side view of a sixth embodiment of a spinning reel for fishing according to the invention.
Figure 16:
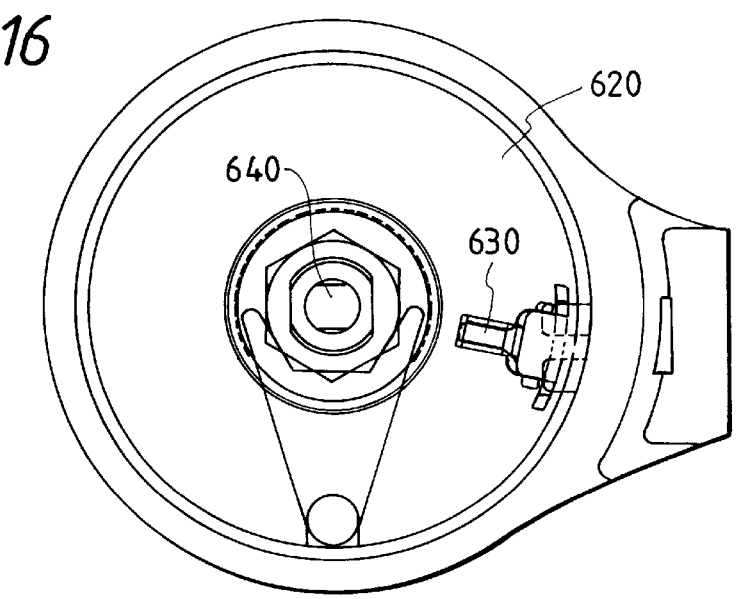
FIG. 16 is a section view of the main portions of the sixth embodiment, taken along the arrow 16 in FIG. 15.
Figure 17:
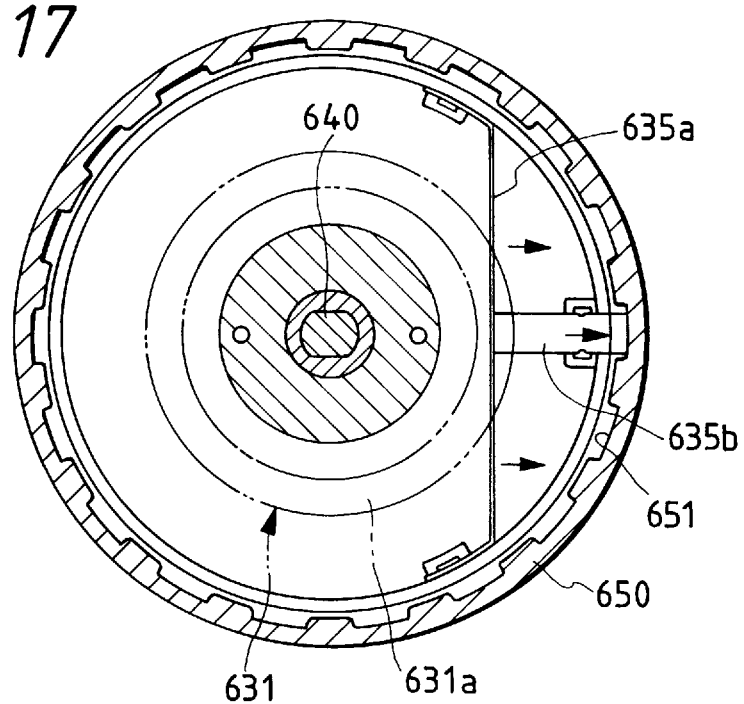
FIG. 17 is a section view of the main portions of the sixth embodiment, taken along the arrow 17 in FIG. 15.
Figure 18:
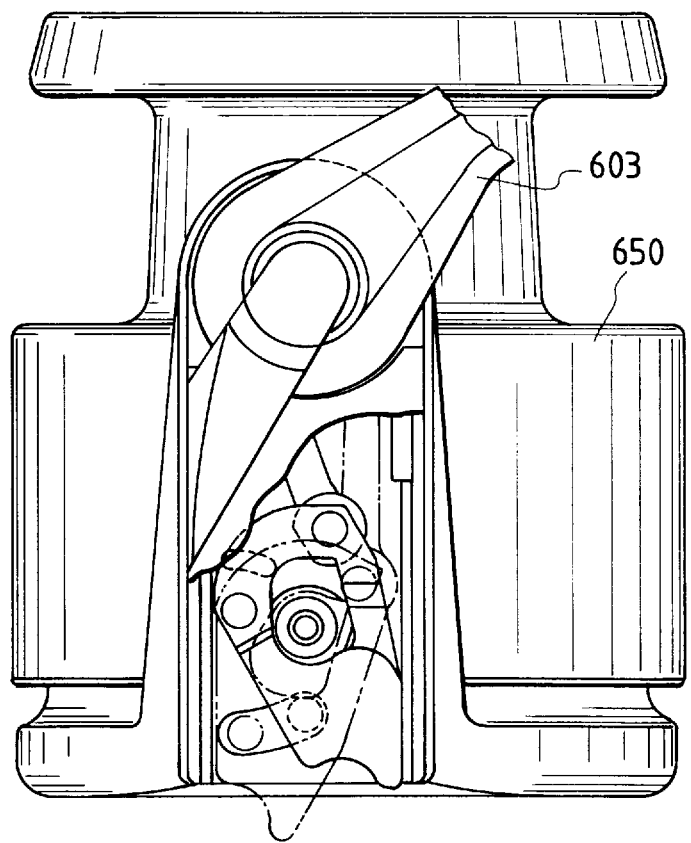
FIG. 18 is a section view, taken along the line 18—18 in FIG. 15.

Now, in FIGS. 13 and 14, there is shown a fifth embodiment of a spinning reel for fishing according to the invention. In the spinning reel according to the fifth embodiment, a kick member 500 is formed bent perpendicularly, that is, it is formed in a substantially L shape. On the leading end face side of the portion of the kick member 500 that extends perpendicularly with respect to a spool shaft 540, there is provided a projection portion 501 which can be operatively connected with or linked to the rear end portion of an actuator 513 to be discussed later. In this embodiment, the kick member 500 is so designed as to be brought into abutment with the rear end portion of the actuator 513 through the projection portion 501, but the kick member 500 may be directly or indirectly coupled to the actuator 513 for operative connection. When a bail support member 503 is switched down to its fishing line casting state, the kick member 500 is displaced or moved to the position shown by a two-dot chained line to thereby cause the actuator 513 to rise or move up to the position shown by a two-dot chained line.

A support body 530 is structured such that it is prevented against rotation with respect to the spool shaft 540 and is free from the back-and-forth movement of the spool shaft 540. A spring-like securing member (equivalent to a securing claw) 535, the section of which is bent in a hairpin shape, is fixedly mounted on the upper end face of the support body 530 by a screw 536. The bent portion 535a of the spring-like securing member 535 is formed so that it is opposed to a plurality of securing grooves 551 respectively formed on the inner peripheral surface of the cylindrical portion of a spool 550. The securing grooves 551, similarly to those in the previously described respective embodiments, are formed at a given interval in the peripheral direction of the inner periphery of the spool 550, so that, at whichever angle of rotation the spool 550 is held, the spring-like securing member 535 can engage with one of the securing grooves 551 that exists close by the securing member 535 with the aid of the spring property of the securing member 535.

On the support body 530, there is mounted a restrict member 537 in such a manner that it is prevented against rotation with respect to the support body 530. The actuator 513 is in engagement with the restrict member 537 in such a manner that it is prevented against rotation with respect to the restrict member 537 but is movable in the longitudinal direction of the spool 550.

The actuator 513 includes, on the outside of the engaging portion thereof that is in engagement with the restrict member 537, a conical-shaped cam surface 513a which gradually increases in diameter from the leading end side thereof toward the rear end thereof, while the free end of the spring-like securing member 535 is in pressure-contact with the cam surface 513a of the actuator 513. In a fishing line retrieving state, the actuator 513 is situated at a position shown by a solid line and, in this state, the bent portion 535a of the spring-like securing member 535 is not in engagement with any one of the securing grooves 551 so that the spool 550 is allowed to rotate.

Now, if the bail support member 503 is reversed to a fishing line casting state, then the kick member 500 is raised and moved up to a position shown by a two-dot chained line in FIG. 13 to thereby move up the actuator 513. With the upward movement of the actuator 513, the spring-like securing member 535 is elastically deformed such that the free end of the spring-like securing member 535 slides along the cam surface 513a of the actuator 513 and is displaced to the position as shown by a two-dot chained line. Consequently, the bent portion 535a of the spring-like securing member 535 engages with one of the securing grooves 551 to thereby lock the rotation of the spool 550. Since the spring-like securing member 535 to be engaged with the securing groove 551 has a spring property, when the spring-like securing member 535 is to be engaged with the securing groove 551, even if it abuts against the projecting portion existing between the two mutually adjoining securing grooves 551, the spring property of the spring-like securing member 535 is able to absorb the misingagement, such that the kick member 500 and thus the actuator 513 may nonetheless to respective proper positions.

Here, if the handle is operated or rotated in the fishing line retrieving direction from the position for the above-mentioned fishing line casting state, then the kick member 500 is returned from the position shown by the two-dot chained line to the position shown by the solid line, thereby allowing the bail support member 503 to return back to the fishing line retrieving position. With this operation, not only the actuator 513 but also the spring-like securing member 535 are returned to the position shown by the solid line with the aid of the spring-property of the securing member 535. This removes the engagement of the bent portion 535a of the spring-like securing member 535 with the securing groove 551 to thereby allow the spool 550 to rotate.

Now, FIGS. 15 to 18 show a sixth embodiment of a spinning reel for fishing according to the invention, in which a kick member 600 is bent at right angles, that is, it is formed in an substantially L shape, while the leading end side of the kick member 600 that extends perpendicularly with respect to a spool shaft 640 can be operatively connected with the rear end portion of an actuation rod 613 to be discussed later. When a bail support member 603 is switched down to a fishing line casting state, the kick member 600 is moved down to such a lower position as shown by a one-dot chained line. Thus the actuation rod 613 is moved downwardly or rearwardly since it is operatively connected with the kick member 600.

The actuation rod 613 extends in parallel to the spool shaft 640, one end (in FIG. 15, the lower end) of the actuation rod 613 can be operatively connected with the kick member 600 as described above, and the other end (in FIG. 15, the upper end) thereof is used to fix and hold one end of a spring body 630 which has a V-shaped section.

The spring body 630 includes in the central portion thereof a bent portion which is supported by a recessed portion 621 formed on a support body 620, while the free end portion of the spring body 630 is in contact with the bottom surface of an actuator 631 which will be discussed later. In this embodiment, the support body 620 is located rearwardly relative to the actuator 631.

The actuator 631 is formed in a wide ring shape and is structured such that it is prevented against rotation with respect to the spool shaft 640 but is free from the back-and-forth movement of the spool shaft 640.

The side surface of the actuator 631 is formed in a tapered or conical surface which converges toward the leading end side thereof, while this tapered surface provides a cam surface 631a with which a spring portion 635a of a securing member 635 is to be contacted.

The securing member 635 includes a spring portion 635a provided on and suspended by a support body 641, and a securing claw 635b. The spring portion 635a is disposed such that it is situated above the cam surface 631a. Also, securing claw 635b extends from the central portion of the spring portion 635a in such a manner that it opposes securing grooves 651 formed in the inner peripheral surface of the spool 650.

Referring now to the operation of the spinning reel according to the sixth embodiment, at first, in the fishing line retrieving state, the kick member 600 is situated at a position shown by a solid line and, in this state, if the bail is reversed, then the actuation rod 613 is lowered to thereby cause the free end side of the spring body 630 to be moved in such a manner as shown by a one-dot chained line with the supported portion thereof as a fulcrum, so that the actuator 631 is moved upwardly. With the upward movement of the actuator 631, the spring portion 635a of the securing member 635 is forcibly moved outwardly (in FIG. 17, the spring portion 635a is flexed in a direction of the arrows) by the cam surface 631a of the actuator 631 to thereby cause the leading end portion of the securing claw 635b to advance into one of the securing grooves 651 formed in the inner periphery of the spool 650, so that they are engaged with each other to thereby lock the rotation of the spool 650. In this operation, even if the leading end portion of the securing claw 635b abuts against a projecting portion formed between two mutually adjacent securing grooves 651, an operation failure caused by this abnormal positional relationship can be absorbed by the spring property of the spring portion 635b of the securing member 635 as well as by the spring property of the spring body 630. In other words, with this positional relationship being absorbed in this manner, the spool 650 is rotated so that the securing claw 635b of the securing member 635 can be secured to the securing groove 651 situated downstream in the rotational direction of the spool 650.

Figure 19:
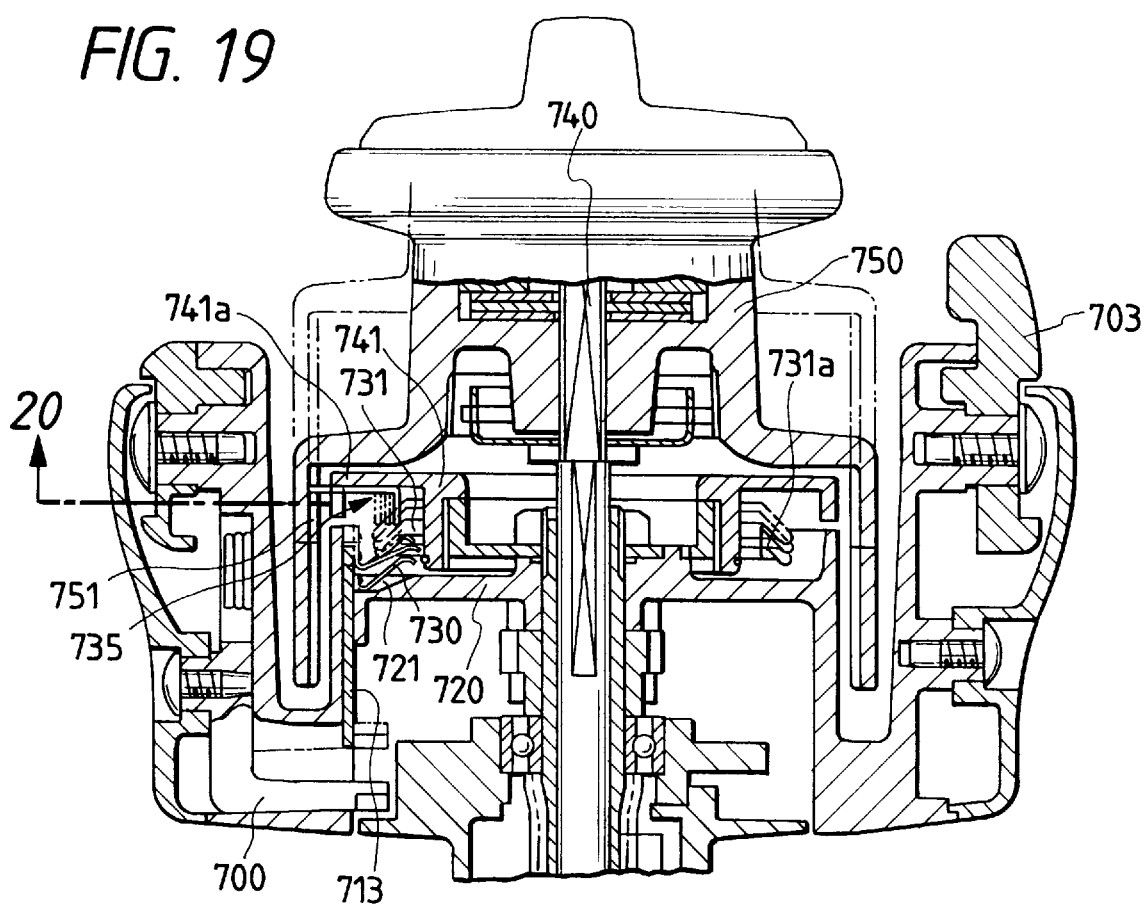
FIG. 19 is a sectional side view of a seventh embodiment of a spinning reel for fishing according to the invention.

Next, description will be given below of a seventh embodiment of a spinning reel for fishing according to the invention with reference to FIGS. 19 and 20.

In the seventh embodiment, a kick member 700 is similarly formed in a substantially L shape which is bent at right angles, while the leading end side of the portion of the kick member 700 that extends perpendicularly with respect to a spool shaft 740 is operatively connected with the rear end portion of an actuation rod 713. The kick member 700, when a bail support member 703 is switched down to a fishing line casting state, moves the actuator rod 713 up to a position shown by a two-dot chained line.

On the inner wall surface of the leading end portion of the actuation rod 713, there is mounted a spring body 730 having a V-shaped section in such a manner that one side (one end side) of the spring body 730 is in close contact with the leading end inner wall surface of the actuation rod 713. On the other hand, the free end (the other end) of the spring body 730 is in contact with the bottom surface of an actuator 731 which is mounted on a support body 741 in such a manner that it is prevented against rotation with respect to the spool shaft 740 but is movable in the vertical direction thereof.

Figure 20:
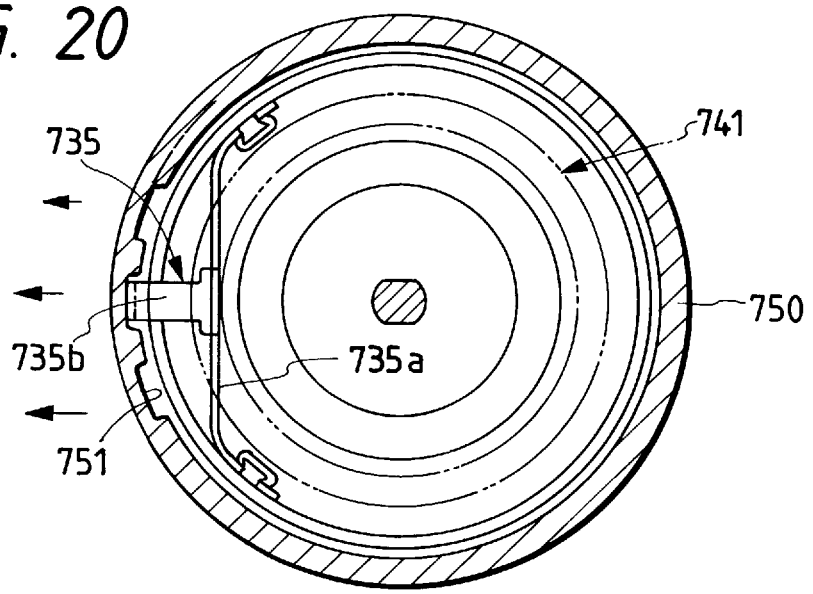
FIG. 20 a section view of the main portions of the seventh embodiment, taken along the arrow 20 in FIG. 19.

The support body 741 includes a disc-shaped plate portion 741a in the upper portion thereof and, on the back surface side (the rear end surface side) of the plate portion 741a there is mounted a securing member 735 as can be seen from FIG. 20.

The securing member 735, similarly to the previously described sixth embodiment, includes a spring portion 735a provided on and suspended by the support body 741, and a securing claw 735b. The spring portion 735a is disposed such that it is situated above a cam surface 731a of the actuator 731. Also, the securing claw 735b is disposed such that it extends from the central portion of the spring portion 735a and is opposed to securing grooves 751 formed in the inner peripheral surface of a spool 750.

The side surface of the actuator 731 is formed in a tapered surface which converges toward the leading end side thereof and this tapered surface provides a cam surface 731a with which the spring portion 735a of the securing member 735 is to be contacted.

Describing now the operation of the above-mentioned seventh embodiment, at first, in a fishing line retrieving state, the kick member 700 is situated at a position shown by a solid line and, in this state, if the bail is reversed, then the actuation rod 713 is raised up. As the actuation rod 713 is raised up, the spring body 730 is moved upwardly to thereby raise the actuator 731. As a result, the spring portion 735a of the securing member 735 is forcibly moved outwardly by the cam surface 731a of the actuator 731 (that is, in FIG. 20, the spring portion 735a is flexed in a direction of the arrows), which in turn causes the leading end portion of the securing claw 735b to advance into one of the securing grooves 751 formed in the inner periphery of the spool 750, thereby bringing the securing claw 735b into engagement with the securing groove 751. That is, the rotation of the spool 750 can be locked in this manner.

Figure 21:
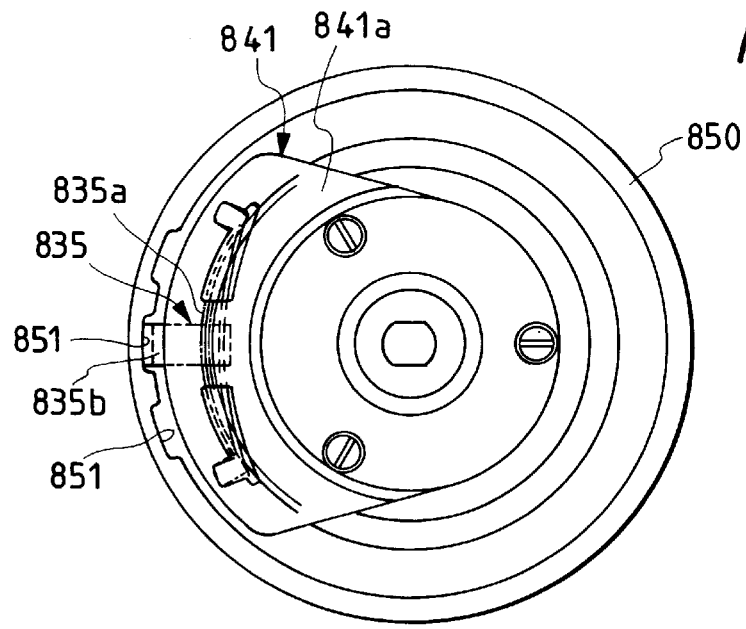
FIG. 21 is an explanatory view of an eighth embodiment of a spinning reel for fishing and is section view of the main portions corresponding to the portions shown by the arrow 20 in FIG. 19.

Referring now to an eighth embodiment of a spinning reel for fishing according to the invention, as shown in FIG. 21, a plate portion 841a of a support body 841 is formed in a fan shape so that it occupies only the area needed for supporting the spring portion 835a of a securing member 835. In FIG. 21, reference number 850 designates a spool, while 851 stands for a plurality of securing grooves with which a securing claw 835b of the securing member 835 can be engaged.

Figure 22:
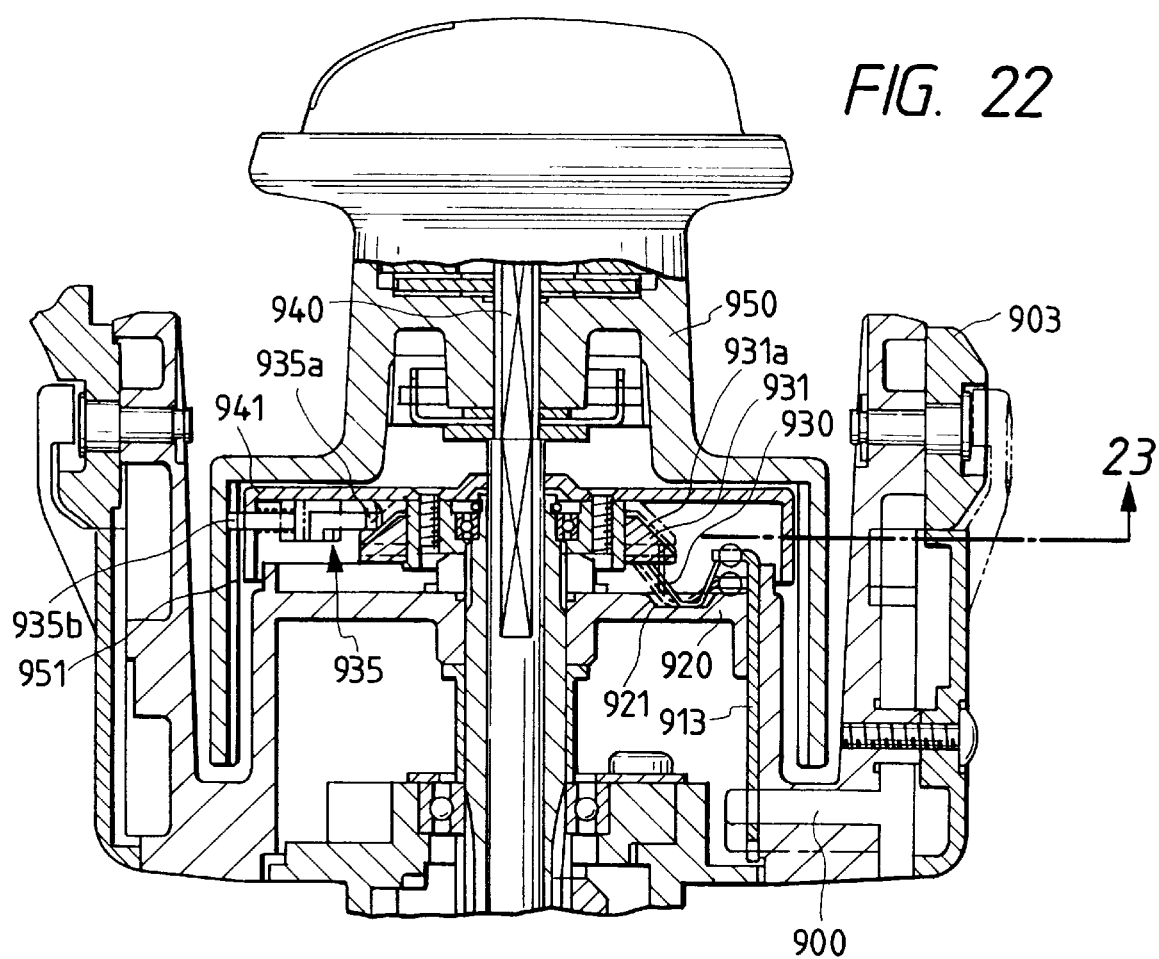
FIG. 22 is a sectional side view of a ninth embodiment of a spinning reel for fishing according to the invention; and, FIG. 23 is a section view taken along the line 23 in FIG. 22.
Figure 23:
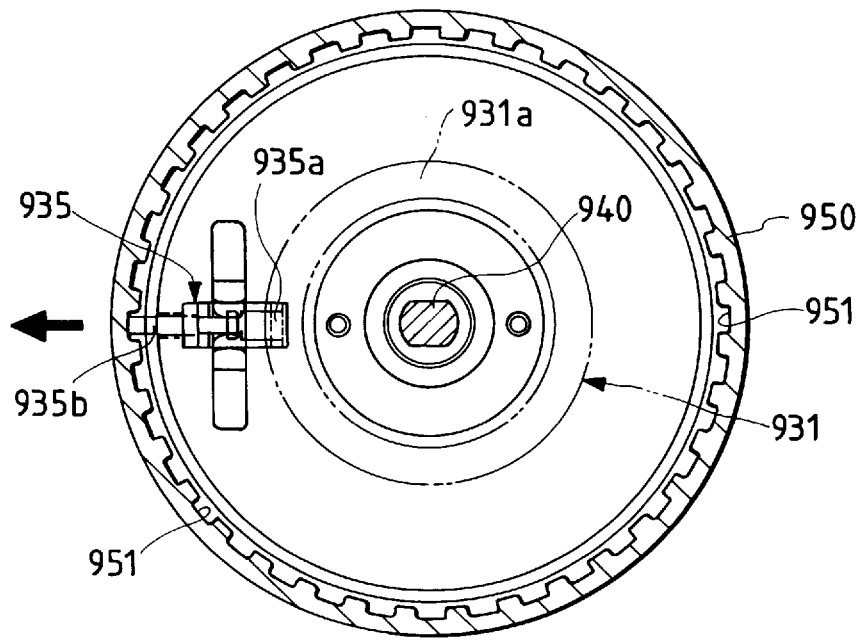
Figure 25:
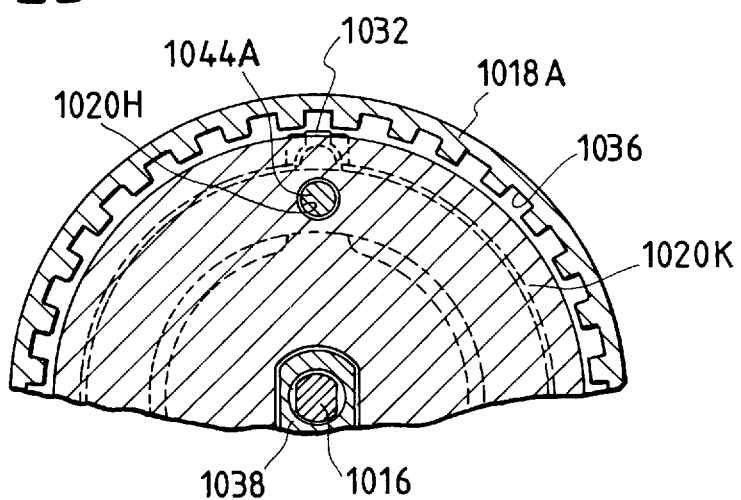
FIG. 25 is a partial section view taken along the arrow line 25—25 shown in FIG. 24.

Next, description will be given below of a ninth embodiment of a spinning reel for fishing according to the invention with reference to FIGS. 22 and 23.

In the ninth embodiment, a kick member 900 is formed in a substantially L shape which is bent at right angles in the intermediate portion thereof, while the leading end side of the portion of the kick member 900 that extends at right angles to a spool shaft 940 is operatively connected with the rear end portion of an actuation rod 913 to be discussed later. When a bail support member 903 is switched down to a fishing line casting state, the kick member 900 is moved down to a lower position as shown by a one-dot chained line. Thus, the actuation rod 913, which is operatively connected with the kick member 900 moves downward as well.

The actuation rod 913 extends in parallel to the spool shaft 940 in such a manner that one end (in FIG. 22, the lower end) of the actuation rod 913 is operatively connected with the kick member 900, while the other end (in FIG. 22, the upper end) thereof is used to fix and hold one end of a spring body 930 having a V shaped section.

The spring body 930 is structured such that the central bent portion thereof is supported and carried by a recessed portion 921 formed on a support body 920 and the free end portion thereof is in contact with the bottom surface of an actuator 931.

The actuator 931 is formed in a wide ring shape, is prevented against rotation with respect to the spool shaft 940, and is free from the back-and-forth movement of the spool shaft 940.

The side surface of the actuator 931 is formed in a tapered surface which converges toward the leading end thereof, and this tapered surface provides a cam surface 931a with which one end of a securing member 935 to be discussed later can be contacted.

The securing member 935 is positioned diametrically opposite from the kick member 900 with respect to the spool shaft 940. The securing member 935 includes a pressure portion 935a on the spool shaft (940) side and an engaging portion 935b on the side opposed to securing grooves 951 formed in the inner peripheral surface of a spool 950. Also, the securing member 935 is mounted on a support body 941 in such a manner that it is slidable in the radial direction thereof. Further, the pressure portion 935a of the securing member 935 is situated so that it can be contacted with the cam surface 931a.

Referring now to the operation of the spinning reel according to the ninth embodiment, in a fishing line retrieving state, the kick member 900 is situated at a position shown by a one-dot chained line. In this state, if the bail is reversed, then the actuator rod 913 is lowered. As the actuator is lowered in this manner, the spring body 930 is operated in such a manner as shown by a one-dot chained line, that is, the free end portion of the spring body 930 is moved as shown by a one-dot chained line with the supported portion thereof by the recessed portion 921 as a fulcrum, thereby causing the actuator 931 to move upwardly. With the upward motion of the actuator 931, the cam surface 931a of the actuator 931 is forcibly pressed against the pressure portion 935a of the securing member 935 to thereby move the same in the outward direction (in FIG. 23, in a direction of the darkened arrow). As the pressure portion 935a is moved in this manner, the leading end of the engaging portion 935b of the securing member 95 is advanced into and is thereby engaged with one of the securing grooves 951 formed in the inner peripheral surface of the spool 950, so that the rotation of the spool 950 can be locked.

Now, description will be given below of a tenth embodiment of a spinning reel for fishing according to the present invention with reference to FIGS. 24 to 29.

On the spool shaft 1016, there is mounted a support body 1030 in such a manner that it extends in the vertical direction, i. e. the perpendicular direction with respect to the spool shaft 1016. The support body 1030 is prevented against rotation with respect to the spool shaft 1016, and is free from the back-and-forth movement of the spool shaft 1016. An annular member 1030A is fixed to the support body 1030 and is also attached to the outer race of a ball bearing 1031.

Also, in the neighborhood of the upper end portion of the support body 1030, there is installed a securing claw 1032 in such a manner that it can be displaced in the vertical direction. As shown clearly in FIGS. 27 to 29, the securing claw 1032 includes an elongated hole 1032H which is long in the vertical direction, while a pin member 1033 is inserted through the elongated hole 1032H. That is, the securing claw 1032 is held by the wide head portion of the pin member 1033 such that it is prevented from being removed out of place.

Also, the securing claw 1032 is always energized upwardly by a coil spring 1034 which is held in the upper end portion of the annular member 1030A.

Now, the spool 1018 includes, in the inner peripheral surface of the cylindrical portion 1018A thereof, a plurality of securing portions 1036, each in the form of a groove extending longitudinally of the cylindrical portion 1018A, while the coil spring 1034 energizes the securing claw 1032 to bring the same into engagement with one of the securing portions 1036. A rod member 1044A is inserted through a hole 1020H formed in the wall surface 1020K of the rotor 1020. An actuator 1044, which is a disc-shaped cam attached to the leading end portion of the rod member 1044A, is inclined in such a manner that a cam surface 1044K formed on the leading end side of the actuator 1044 is lowered toward the central portion thereof. Due to this structure, if the actuator 1044 is moved forwardly to thereby press against a projecting portion 1032T which is formed integral with the securing claw 1032, then not only the projecting portion 1032T but also the securing claw 1032 are pushed down against the energizing force of the coil spring 1034, thereby releasing the engagement of the securing claw 1032 with the securing portion 1036. During the rotation of the rotor 1020, the cam surface 1044K is always in sliding contact with the projecting portion 1032T and thus the leading end portion of the projecting portion 1032T is subjected to wear. For this reason, the projecting portion 1032T may be preferably formed of wear resisting material.

Figure 24:
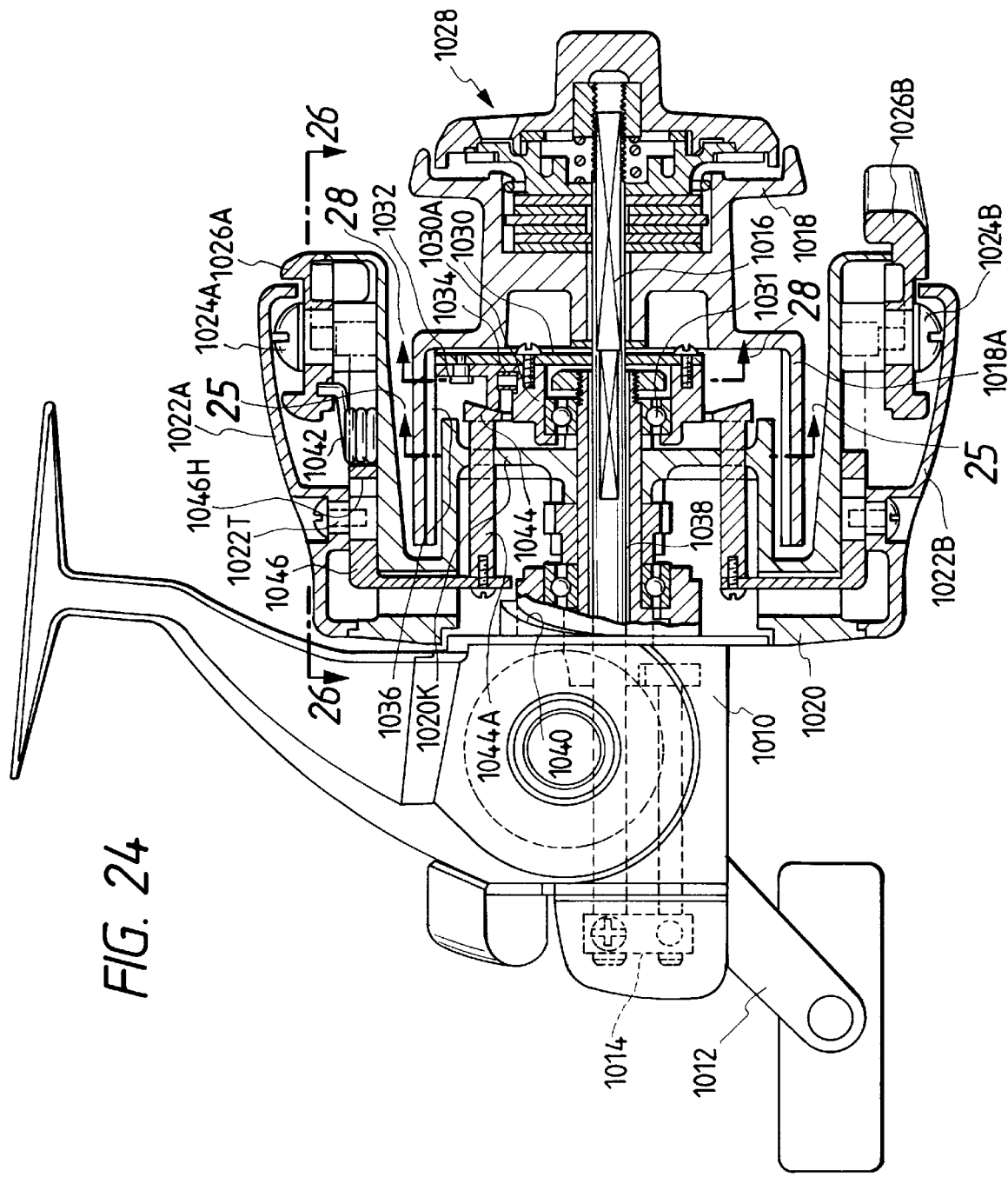
FIG. 24 is a longitudinal section view of a tenth embodiment of a spinning reel for fishing according to the invention.
Figure 26:
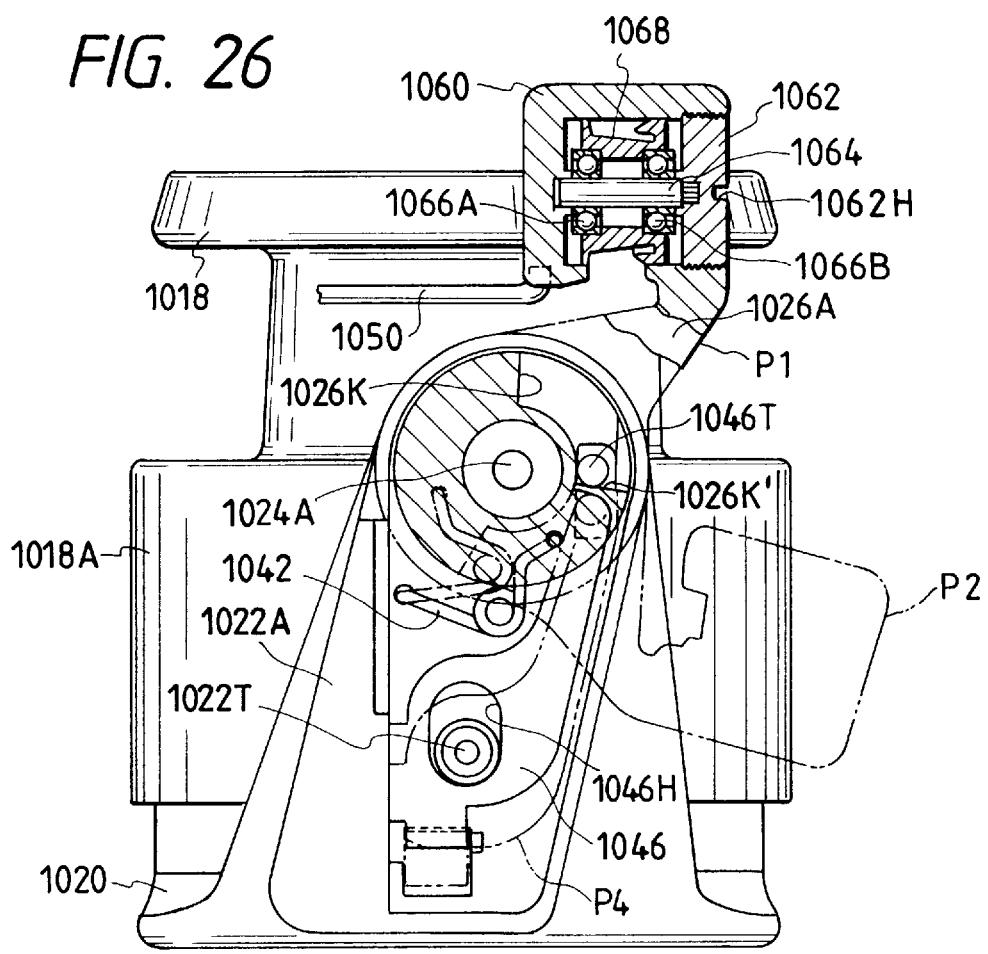
FIG. 26 is a partial section view taken along the arrow line 26—26 shown in FIG. 24.

Within the support arm portion 1022A of the rotor 1020, there is incorporated a component member 1046, which forms part of an actuator drive mechanism, including an elongated hole 1046H with a shaft pin 1022T inserted therethrough, while the shaft pin 1022T is also used to fix a cover member for the support arm portion 1022A. The component member 1046 has an L shape in section as shown in FIG. 24 and such a plane shape as shown in FIG. 26. With reference to FIG. 26, the component member 1046 includes an engaging projection portion 1046T in the leading end portion thereof. That is, due to the interference of the engaging projection portion 1046T with an engaging wall portion 1026K' or 1026K formed in the inner surface of the base portion of the bail support member 1026A, the component member 1046 can be switched to a position shown by a solid line in FIG. 26 or a position P4 shown by a two-dot chained line in FIG. 26. Therefore, if the bail support member 1026A is switched from the fishing line retrieving position P1 shown by a solid line down to the fishing line casting position P2 shown by a two-dot chained line, then the component member 1046 of the actuator drive mechanism can be pushed down to a position P4 rearwardly of the spinning reel.

Referring now to FIGS. 24 and 27 again, as the component member 1046 of the actuator drive mechanism is moved down to the rearward position P4, the actuator 1044 also retreats to a position P3 together with the rod member 1044A integral with the component member 1046. Due to this, the restriction of the motion of the securing claw 1032 by the actuator 1044 is removed, so that the securing claw 1032 can be engaged with the securing portion 1036. On the other hand if the bail support member 1026A is returned from the fishing line casting position P2 shown by a two-dot chained line in FIG. 26 to the fishing line retrieving position P1 shown by a solid line in FIG. 26, then the component member 1046 of the actuator drive mechanism is moved from the position P4 to the forward portion, so that the actuator 1044 is moved forward together with the rod member 1044A. As a result, the actuator 1044 separates the securing claw 1032 from the securing portion 1036 against the energizing force of the coil spring 1034.

In a fishing operation, when the bail support member 1026A (bail 1050) is switched over to the fishing line casting position P2 and the fishing line is cast, since the securing claw 1032 is in engagement with the securing portion 1036 of the spool 1018 due to the energizing force of the coil spring 1034, even if the drag mechanism 1028 is set to a weak level, the spool 1018 can be prevented against rotation when the fishing line is cast.

Figure 27:
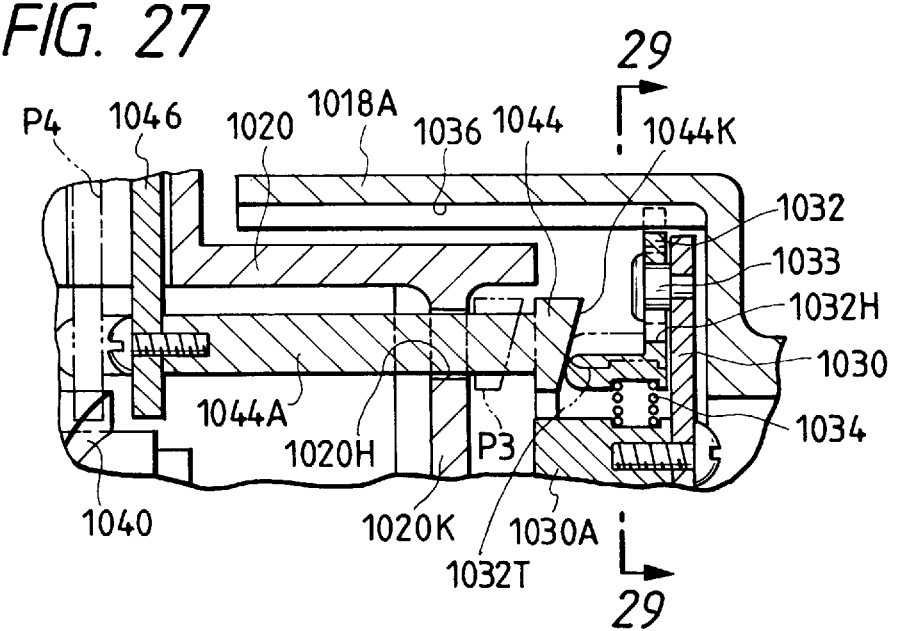
FIG. 27 is an enlarged view of the main portions of FIG. 24.
Figure 28:
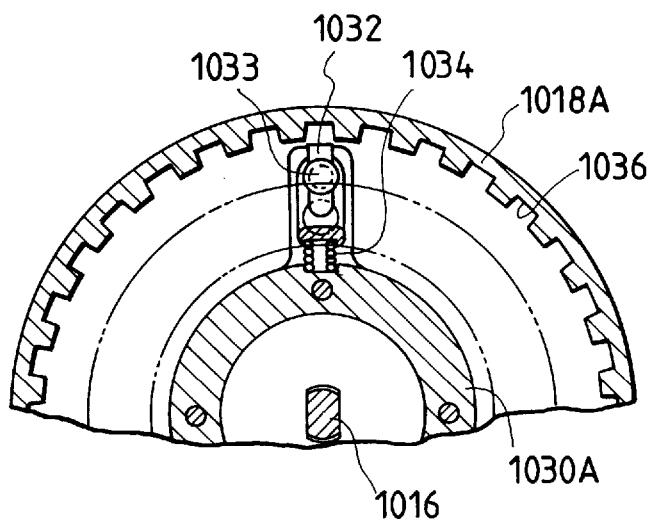
FIG. 28 is a partial section view taken along the arrow line 28—28 shown in FIG. 24.
Figure 29:
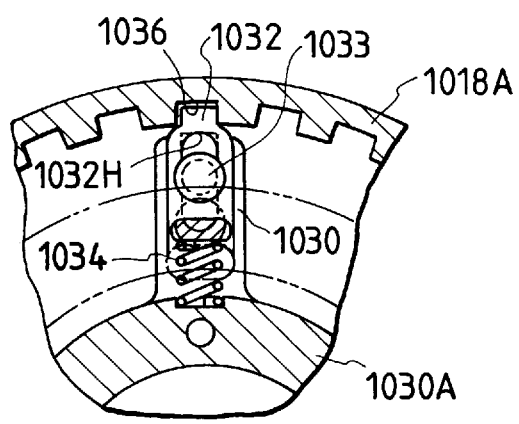
FIG. 29 is a section view taken along the arrow line 29—29 shown in FIG. 27, showing a different state from that of FIG. 27.

In this fishing line casting state, the rotation of the rotor 1020 is not restricted and, therefore, just after the fishing line is cast, the rotor 1020 can be rotated by operating the handle 1012. In the front portion of the reel main body 1010, there is formed a cam surface 1040 which is inclined as shown in FIG. 24. As shown in FIG. 27, if the component member 1046 of the actuator drive mechanism is retreated to the position P4, then the component member 1046 is caused to interfere with the cam surface 1040 as the rotor 1020 is rotated. That is, if the rotor 1020 is rotated in the fishing line retrieving direction, then the component member 1046 of the actuator drive mechanism is pressed by the cam surface 1040 and is thereby moved to the forward portion. With the forward movement of the component member 1046, the actuator 1044 is also moved to the position shown by a solid line in FIG. 27 to thereby release the engagement of the securing claw 1032 with the securing portion 1036.

As a result, the spool 1018 can be rotated according to the fastening force of the drag mechanism 1028 to thereby prevent the fishing line from being cut. Also, as can be seen from FIG. 26, if the component member 1046 of the actuator drive mechanism is moved to the forward portion, then the engaging projection portion 1046T of the component member 1046 is pressed against the engaging wall portion 1026K of the bail support member 1026A to thereby rotate the bail support member 1026A and, due to the energizing action of the switchingly energizing spring (dead-point-action spring) 1042, the bail support member 1026 is returned to and maintained at the fishing line retrieving position P1 shown by a solid line automatically. In the present embodiment, as an automatic return mechanism which is able to return the bail support member from the fishing line casting position to the fishing line take-out position, there is employed the above-mentioned cam mechanism. However, this is not limitative but, for example, it is also possible to employ another mechanism in which there is provided a projecting portion on the front side of the leg of the reel. With the rotation of the rotor in the fishing line retrieving direction, the bail support member 1026A buts against the present projecting portion of the reel leg and is thereby returned to the fishing line retrieving position automatically.

Also, in the above-mentioned tenth embodiment, there is employed a structure wherein the support body 1030 is not moved (free) with respect to the back-and-forth movement of the spool shaft 1016. However, it is also possible to employ a different structure wherein the support body 1030 can be moved back and forth together with the spool shaft 1016 by adjusting the size or inclination angle of the cam surface 1044K of the actuator 1044.

Referring again to FIG. 26 in which the tenth embodiment is shown, not only is there a bail 1050 attached to the leading end portion of the bail support member 1026A, but also there is arranged in an integral manner a mounting portion 1060 which is formed in a cylindrical shape so that it can hold a line roller 1068. The cylindrical mounting portion 1060 of the bail support member 1026A is opened in the lower portion thereof as well as on the one end side (in FIG. 26, the right side) thereof, while an internal thread is formed on the inner surface of the present one end side of the cylindrical mounting portion 1060. There is provided a screw member 1062 which includes on the outer periphery thereof an external thread threadedly engageable with the internal thread of the mounting portion 1060. A shaft pin 1064 can be erected on and held by the central portion of the screw member 1062. A ball bearing 1066B, the line roller 1068 and a ball bearing 1066A are sequentially assembled around the periphery of the shaft pin 1064 in this order to thereby provide a unit part. The unit part can be incorporated into the cylindrical mounting portion 1060 from the above-mentioned one end side thereof by use of a screw driver or the like as easily as it can be incorporated with one hand. Alternatively, the unit part may be assembled in such a manner that the line roller 1068 and ball bearings 1066A, 1066B are previously assembled together and, after that, the previously assembled components are attached to the shaft pin 1064 at the same time.

The outside dimension of the line roller 1068 is set slightly smaller than the cylindrical inside diameter of the mounting portion 1060, while the space between the line roller 1068 and the inner periphery of the cylindrical mounting portion 1060 is set smaller than the diameter of a fishing line to be used. The line roller 1068 is journaled by two right and left bearings and, therefore, even if the force of the fishing line acts on the line roller 1068, the line roller 1068 is prevented from being inclined. This in turn prevents the fishing line from biting at the line roller 1068 as well as prevents the end portion of the outer periphery of the line roller 1068 from touching the inner peripheral surface of the mounting portion 1060.

Also, since the two end portions of the line roller 1068 are journaled by their respective bearings (ball bearings), the line roller 1068 is prevented from getting loose in the thrust direction thereof, so that the line roller 1068 can be rotated smoothly with the side surface of the line roller 1068 not in touch with any portion of the inner peripheral surface of the mounting portion 1060.

Figure 30:
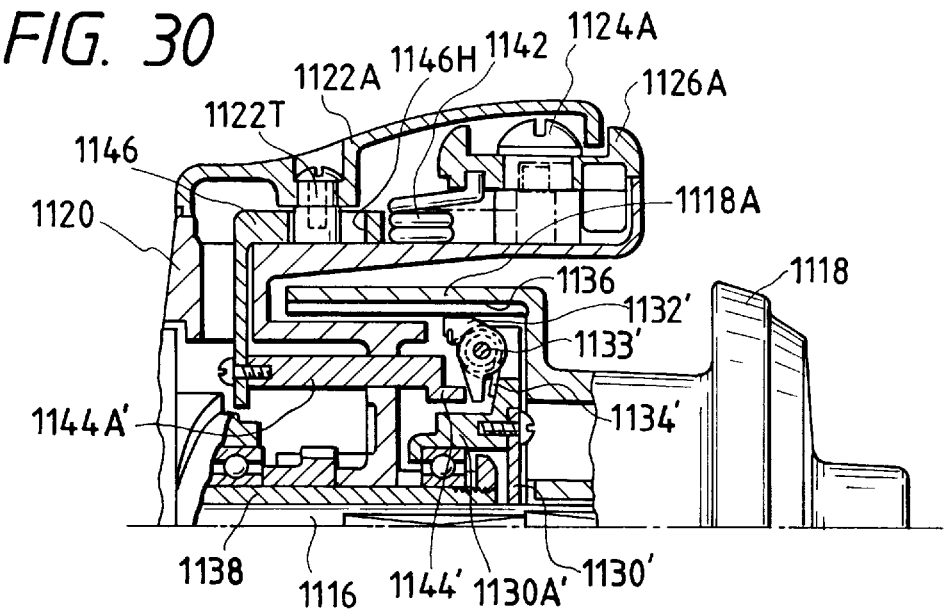
FIG. 30 is a partially longitudinal section view of an eleventh embodiment of a spinning reel for fishing according to the invention.
Figure 31:
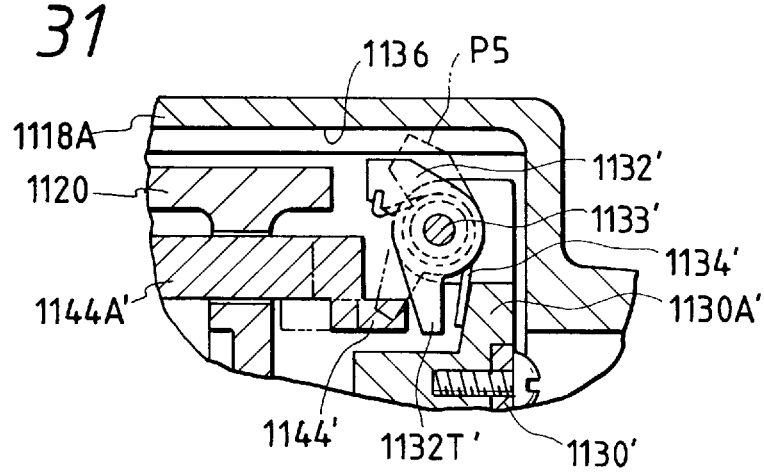
FIG. 31 is an enlarged view of the main portions of FIG. 30.
Figure 32:
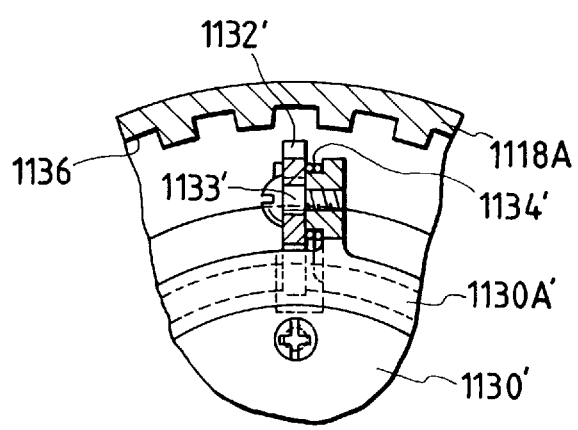
FIG. 32 is a side view of FIG. 31.

Now, FIGS. 30 to 32 show an eleventh embodiment of a spinning reel for fishing according to the invention. In the eleventh embodiment, a shaft pin member 1133' is mounted on the upper end portion of an annular member 1130A' fixed to a support body 1130' which is installed on the spool shaft 1116 in such a manner that it extends in the vertical direction, i. e. perpendicular to the spool shaft 1116. A securing claw 1132' is mounted rotatably about the pin member 1133'. A spring member 1134' is mounted over the securing claw 1132' and annular member 1130A' so that the securing claw 1132' is always energized by the energizing force of the spring member 1134' toward a position P5 at which the securing claw 1132' is engaged with one of securing portions 1136 formed in the inner peripheral surface of the cylindrical portion 1118A of the spool 1118.

An actuator 1144', which is disposed on the leading end portion of a rod member 1144A' is structured similarly to the actuator 1144 in the tenth embodiment. That is, if the actuator 1144' is moved to the forward portion with respect to the reel, then the actuator 1144' is pressed against a projecting portion 1132T' formed integral with the securing claw 1132' to rotate and displace the securing claw 1132', to thereby remove the engagement of the securing claw 1132' with the securing portion 1136 of the cylindrical portion of the spool. The other remaining structures and operations of the eleventh embodiment are similar to those of the tenth embodiment.

Now, description will be given below in detail of a twelfth embodiment of a spinning reel for fishing according to the invention with reference to FIGS. 33 to 40.

Figure 34:
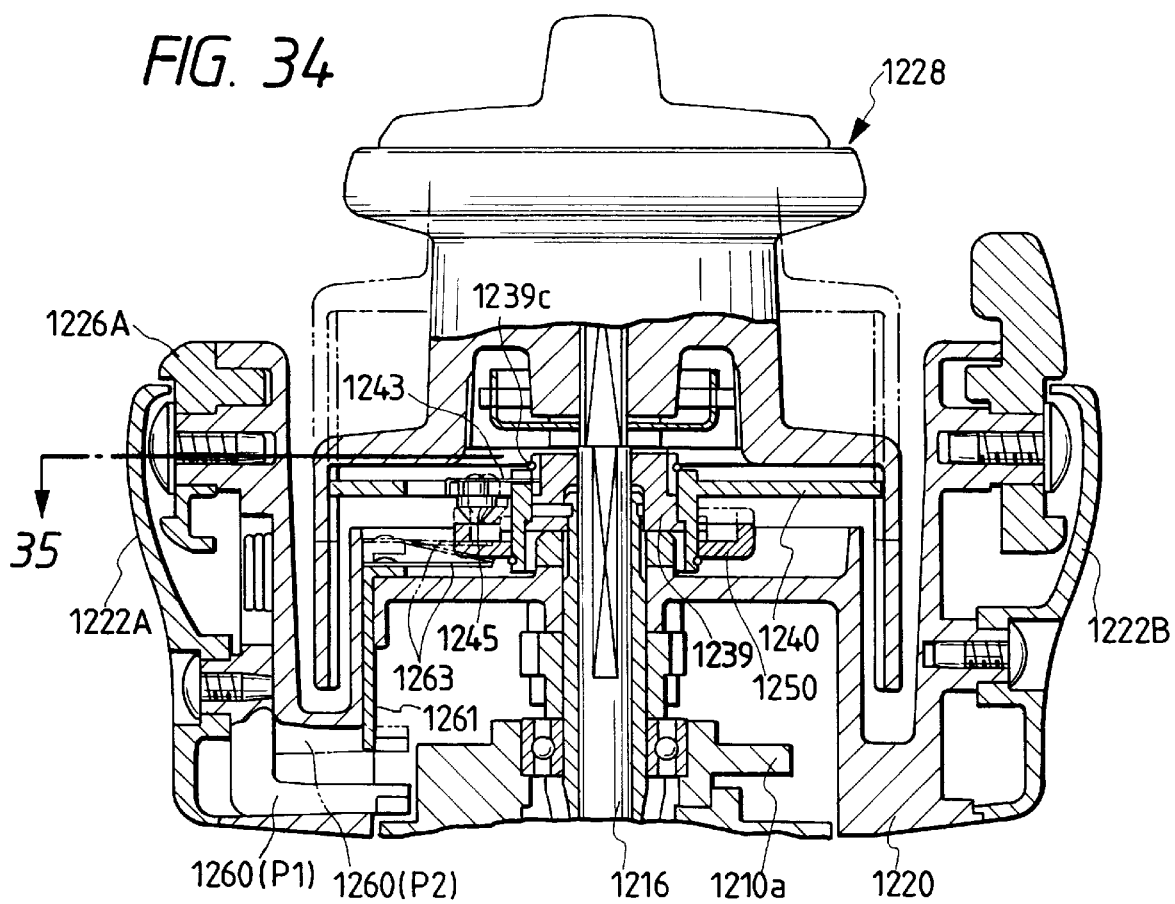
FIG. 34 is an enlarged sectional side view of the spinning reel for fishing according to the twelfth embodiment of the invention.
Figure 35:
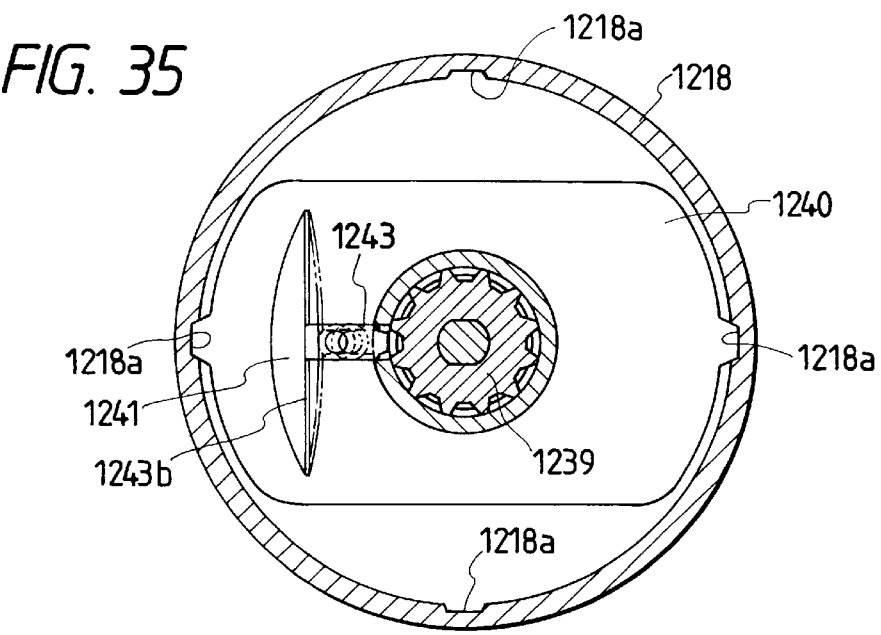
FIG. 35 is a section view of taken along the arrow line 35 shown in FIG. 34.
Figure 36:
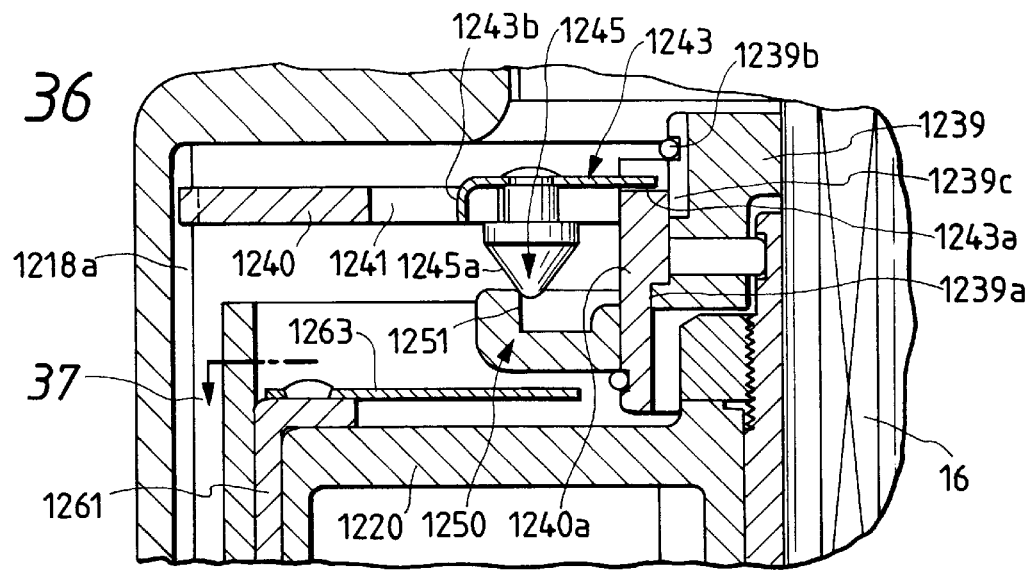
FIG. 36 is an enlarged sectional view of the main portions of the spinning reel for fishing according to the twelfth embodiment of the invention.

In the substantially central portion of the spool shaft 1216 in the longitudinal direction thereof, which is situated on the leading end side of the rotary shaft cylinder 1238, an engaging body 1239 is mounted in such a manner that it is prevented against rotation with respect to the spool shaft 1216. And, a support body 1240 is attached to the engaging body 1239. As shown in FIGS. 34 and 36, the support body 1240 is formed in a flat plate which includes a hollow boss portion 1240a around the spool shaft 1216. The support body 1240 further includes two end portions engaged with engaging portions 1218a formed in the inner cylindrical wall surface of the spool 1218 so as to be rotated integrally with the spool 1218. The support body 1240 can be rotated with respect to the spool shaft 1216 while it is prevented against movement in the axial direction thereof. The prevention of the movement of the support body 1240 in the axial direction is achieved in such a manner that the hollow cylindrical boss portion 1240a formed in the central portion of the support body 1240 is secured by a securing portion 1239a and a C-ring 1239b respectively formed in the engaging body 1239.

The engaging body 1239 includes in the outer periphery thereof a plurality of securing grooves (securing portions) 1239c which are so formed at a given pitch as to extend in the axial direction of the engaging body 1239. When a securing projection portion 1243a formed in a securing body 1243 to be discussed later is engaged with one of the securing grooves 1239c, the spool 1218 can be prevented against rotation.

On the front surface side (in FIGS. 34 and 36, on the upper side) of the support body 1240, there is disposed the securing body 1243. The securing body 1243 extends toward the axis of the spool shaft 1216 and includes, in one end portion thereof that is situated on the spool shaft (1216) side, a securing projection portion 1243a which can be moved into and engaged with one of the securing grooves 1239c of the engaging body 1239. Also, the securing body 1243 includes, in the other end portion thereof that is situated on the outside in the radial direction thereof, a support plate portion 1243b which is fixed to and supported by a space portion 1241 formed in the support body 1240 and has an elastic property.

The space portion 1241 includes a peripheral surface which extends in a direction extending at right angles to the diametrical direction of the spool shaft 1216 and in parallel to the peripheral direction of the spool 1218, while the dimension of the space portion 1241 in the diametrical direction thereof is set so that the support plate portion 1243b of the securing body 1243 can be flexed. That is, the support plate portion 1243b can be flexed in such a manner that the central portion thereof can be reciprocated in the radial direction thereof, which allows the securing projection portion 1243a of the securing body 1243 to move in the radial direction, that is, the securing projection portion 1243a is allowed to advance to and retreat from the securing groove 1239c.

Also, in the portion of the securing body 1243 that is situated in the space portion 1241, there is disposed a moving member 1245 which includes a conical portion 1245a in the lower portion thereof. The conical portion 1245a of the moving member 1245, as can be seen most clearly from FIG. 36, is so situated as to project out on the back surface side of the support body 1240, while the conical surface of the conical portion 1245a can be contacted by a sliding contact portion 1251 formed in an annular actuator 1250 to be discussed later.

On the lower end side of the hollow boss portion 1240a of the support body 1240, there is provided the annular actuator 1250 in such a manner that it can be moved in the axial direction thereof. In the periphery of the annular actuator 1250, there is formed a flange-like sliding contact portion 1251 which projects toward the leading end side (front side) of the annular actuator 1250. The sliding contact 1251 is in contact with the conical portion 1245a of the moving member 45. In FIG. 36, if the annular actuator 1250 is moved upward, then the sliding contact portion 1251 moves or pushes the moving member 1245 toward the central portion of the spinning reel (in FIG. 36, in the right direction). With this movement of the moving member 1245, the securing body 1243 is also moved in the same direction to thereby bring the securing projection portion 1243a into engagement with one of the securing grooves 1239c of the engaging body 1239. Then, if the moving force applied to the annular actuator 1250 is removed, then the moving member 1245 is moved outwardly in the radial direction in FIG. 36 due to the elastic return force of the support plate portion 1243b of the securing body 1243, thereby causing the annular actuator 1250 to be pressed downward.

Now, within the support arm portion 1222A of the rotor 1220, there is incorporated a kick member 1260 which serves as a drive mechanism. The present kick member 1260, similarly to a well-known kick member, has a substantially L shape in section as shown in FIG. 34. The kick member 1260 is switched from a fishing line retrieving position P1 shown by a solid line to a fishing line casting position P2 shown by a two-dot chained line and vice versa under energized state.

The reel main body 1210 includes in the front portion thereof a return cam portion 1210a, as well known, that is, when the handle 1212 is rotated in the fishing line retrieving direction under the fishing line casting state to rotate the rotor 1220, the leading end portion of the kick member 1260 is caused to come into contact with the return cam portion 1210a and is thereby allowed to return to the fishing line retrieving state.

Figure 33:
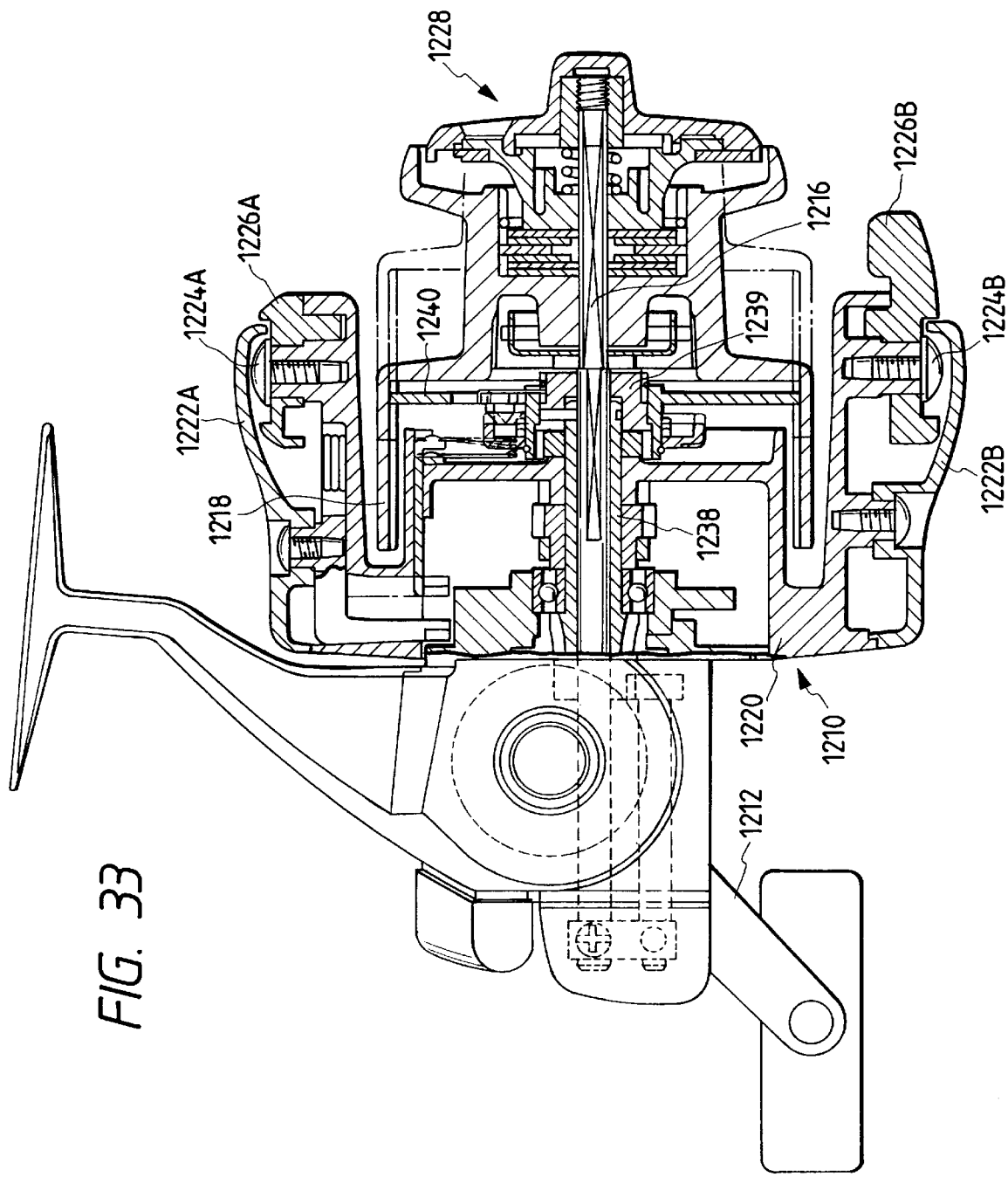
FIG. 33 is a sectional side view of a twelfth embodiment of a spinning reel for fishing according to the invention.

As shown in FIGS. 33 and 34, there is provided an actuation rod 1261 which is so supported on the rotor 1220 as to be able to move back and forth and extends in parallel to the axial direction of the rotor 1220, while one end of the actuation rod 1261 is operatively connected or linked to the leading end of the lower end side of the kick member 1260. A plate-like spring piece 1263 is supported in a cantilevered manner on the other end of the actuation rod 1261 in such a manner that the spring piece 1263 faces toward the central portion of the reel, that is, toward the spool shaft 1216, while the free end side of the spring piece 1263 is situated below the annular actuator 1250. If the actuation rod 1261 is moved upward, then the spring piece 1263 pushes up the annular actuator 1250 and thus the sliding contact portion 1251 of the annular actuator 1250 moves the conical portion 1245a of the moving member 1245 upward to thereby push the moving member 1245 toward the central portion of the reel. That is, as the moving member 1245 is pushed toward the central portion of the reel, the securing body 1243 is also moved following this, thereby causing the securing projection portion 1243a of the securing body 1243 to advance into one of the securing grooves 1239c of the securing body 1239, so that the securing projection portion 1243a can be engaged with the securing groove 1239c.

Next, description will be given below of the operation of the present embodiment.

Figure 37:
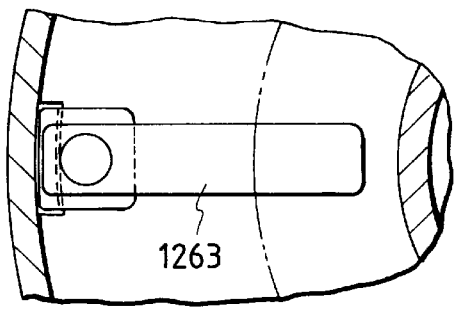
FIG. 37 is a section view taken along the arrow line 37 shown in FIG. 36.
Figure 38:
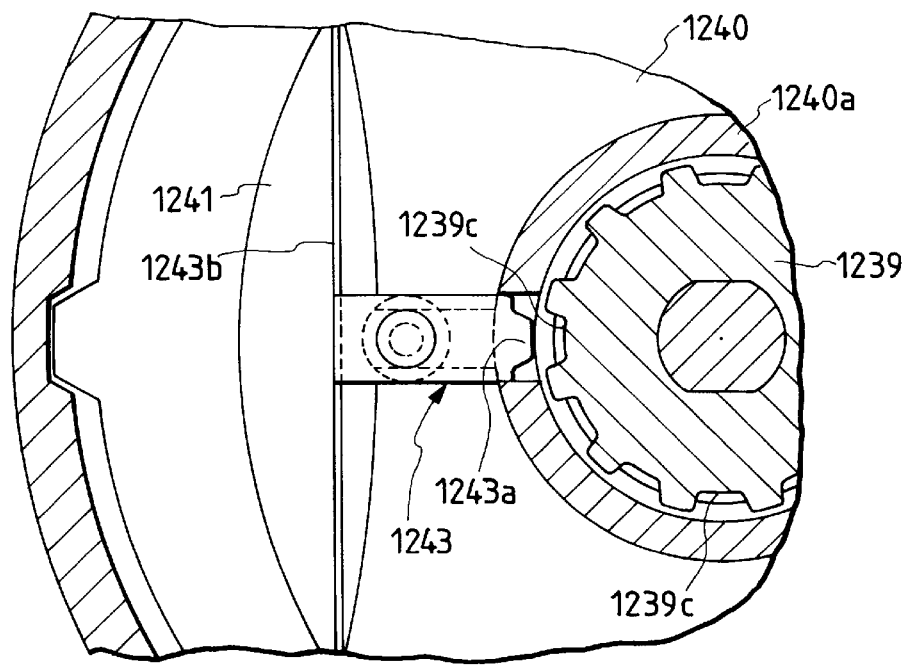
FIG. 38 is an enlarged sectional view of the main portions of the spinning reel for fishing according to the twelfth embodiment of the invention.
Figure 39:
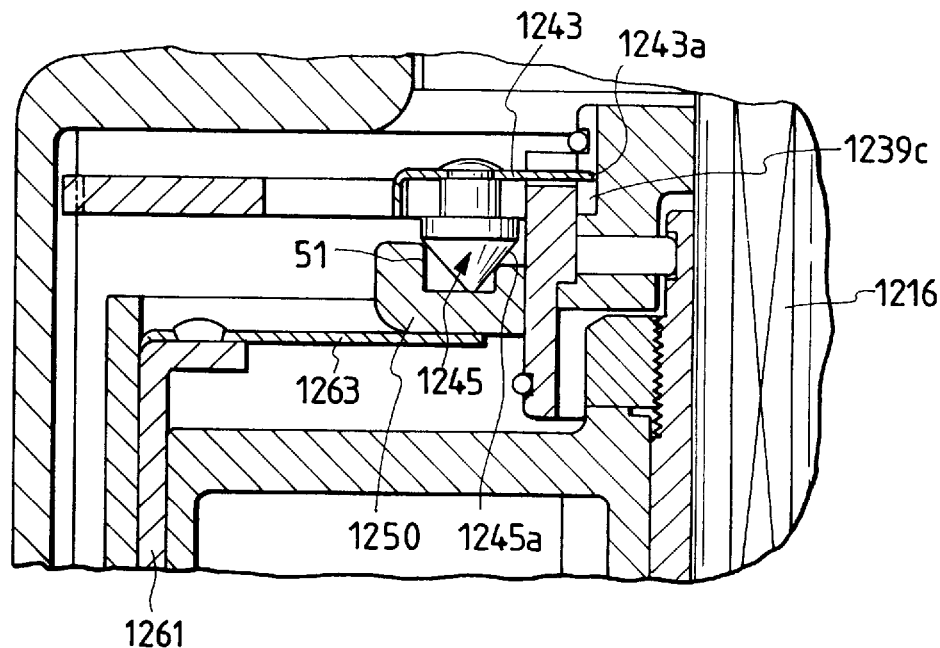
FIG. 39 is an enlarged section view of the main portions of the spinning reel for fishing according to the twelfth embodiment of the invention, showing the operation state of the invention.
Figure 40:
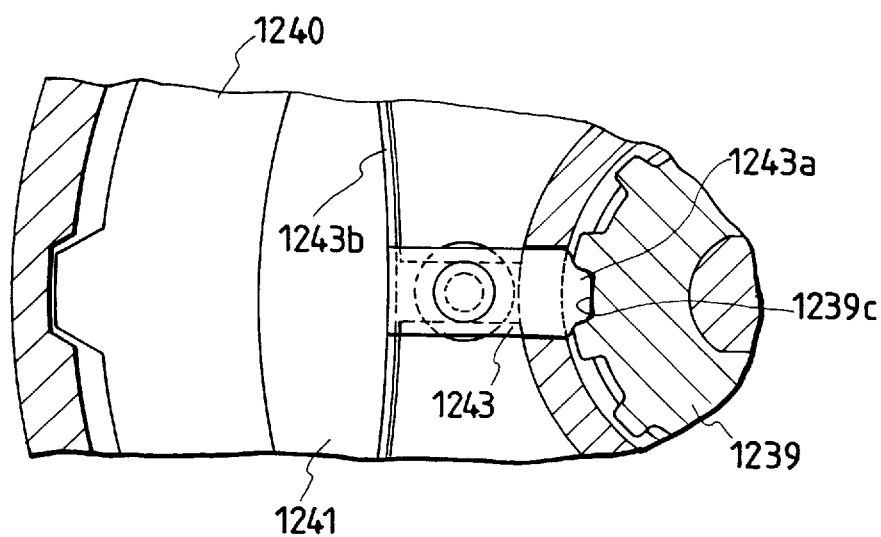
FIG. 40 is an enlarged section view of the main portions of the spinning reel for fishing according to the twelfth embodiment of the invention, showing the operation state of the invention.

In the fishing line retrieving state, the respective mechanisms of the present embodiment are held in such a position relation as shown in FIGS. 36 to 38. From this retrieving state, to cast the fishing line, if the bail support members 1226A and 1226B are rotated in order to reverse the bail, then the kick member 1260 is moved upward, as shown in FIG. 34. With the upward movement of the kick member 1260, the actuation rod 1261 is moved upward to thereby cause the spring piece 1263 to push up the annular actuator 1250. Due to this, as shown in FIGS. 39 and 40, the sliding contact portion 1251 of the annular actuator 1250 raises the conical portion 1245a of the moving member 1245 relatively upward to thereby push the moving member 1245 toward the central portion of the reel, so that the securing body 1243 is moved. As the securing body 1243 moves in this manner, the securing projection portion 1243a of the securing body 1243 is advanced into one of the securing grooves 1239c of the engaging body 1239 so that the securing projection portion 1243a is engaged with the securing groove 1239c. Thanks to this, in the operation of the spinning reel in actual fishing, when the bail support member 1226A (bail) is switched over to the fishing line casting position and the fishing line is cast, because the spool is prevented against rotation, even if the drag mechanism 1228 is set in a weak level, it is possible to prevent the spool from being rotated. Also, an operation to return the bail to the fishing line retrieving state after the fishing line is cast can also be carried out automatically and smoothly by rotating the rotor in the fishing line retrieving direction by means of the operation of the handle.

In the fishing line casting state, since the rotation of the rotor 1220 is not restricted at all, just after the fishing line is cast, the handle 1212 can be operated to thereby rotate the rotor 1220, that is, the bail can be returned to the fishing line retrieving position immediately.

Now, description will be given below of a thirteenth embodiment of a spinning reel for fishing according to the invention with reference to FIGS. 41 to 48.

In the present spinning reel for fishing, a cover body 1310 is mounted on one side of a reel main body 1301, and the two end portions of the rotary shaft 1302a of a drive gear 1302 are respectively journaled by the bearing 1311 of the reel main body 1301 and the bearing 1312 of the cover body 1310.

A handle shaft 1314 with a handle 1313 fixed thereto is inserted into and fitted with a central polygonal hole formed in the rotary shaft 1302a in such a manner that the handle shaft 1314 can be freely switched over right and left.

In the front portion of the reel main body 1301, a rotary shaft cylinder 1303 is rotatably journaled by a bearing 1315 and is also projected out forwardly.

A reversal preventive ratchet wheel 1316 and a rotor 1304 are fitted with the outer peripheral portions of the rotary shaft cylinder 1303 that are situated forwardly of the bearing 1315 in such a manner that they are respectively prevented against rotation with respect to the rotary shaft cylinder 1303, while the reversal preventive ratchet wheel 1316 and rotor 1304 are respectively fixed by a nut 1317.

The base end portion of the rotary shaft cylinder 1303 is rotatably journaled by a bearing portion 1*a* and the drive gear 1302 is in mesh with a pinion 1303*a* formed integral with the front side of the base end portion of the rotary shaft cylinder 1303, whereby the rotor 1304 is supported in such a manner that it can be rotated in linking with the rotation of the handle 1313.

A spool shaft 1306 with a spool 1305 mounted on the leading end portion thereof is slidably inserted into the central hole of the rotary shaft cylinder 1303 in such a manner that it can be reciprocated back and forth, while a connecting body 1318 is attached to the rear end portion 6*a* of the spool shaft 1306 by a screw 1319.

Inside the reel main body 1301, a gear 1320 is journaled on a shaft portion 1301*b* of the reel main body 1301 and is also in mesh with a gear 1302*b* formed on the rotary shaft 1302*a* of the drive gear 1302.

The gear 1320 includes a projection in an eccentric position thereof, while the projection is inserted into a hole formed in the connecting body 1318.

The rotary shaft cylinder 1303 includes a peripheral groove 1303*b* (FIG. 42) formed forwardly of the portion of the rotary shaft cylinder 1303 with which the nut 1317 is threadedly engaged.

The rotor 1304, which is installed on the rotary shaft cylinder 1303 through the cylindrical portion 1304*a* thereof, comprises the cylindrical portion 1304*a*, a front wall portion 1304*b*, a large-diameter cylindrical portion 1304*c*, and a pair of bail support arms 1304*f* and 1304*g* respectively projected out forwardly from the respective outer peripheries of the base portions 1304*d* and 1304*e* of the large-diameter cylindrical portion 1304*c*.

Figure 46:
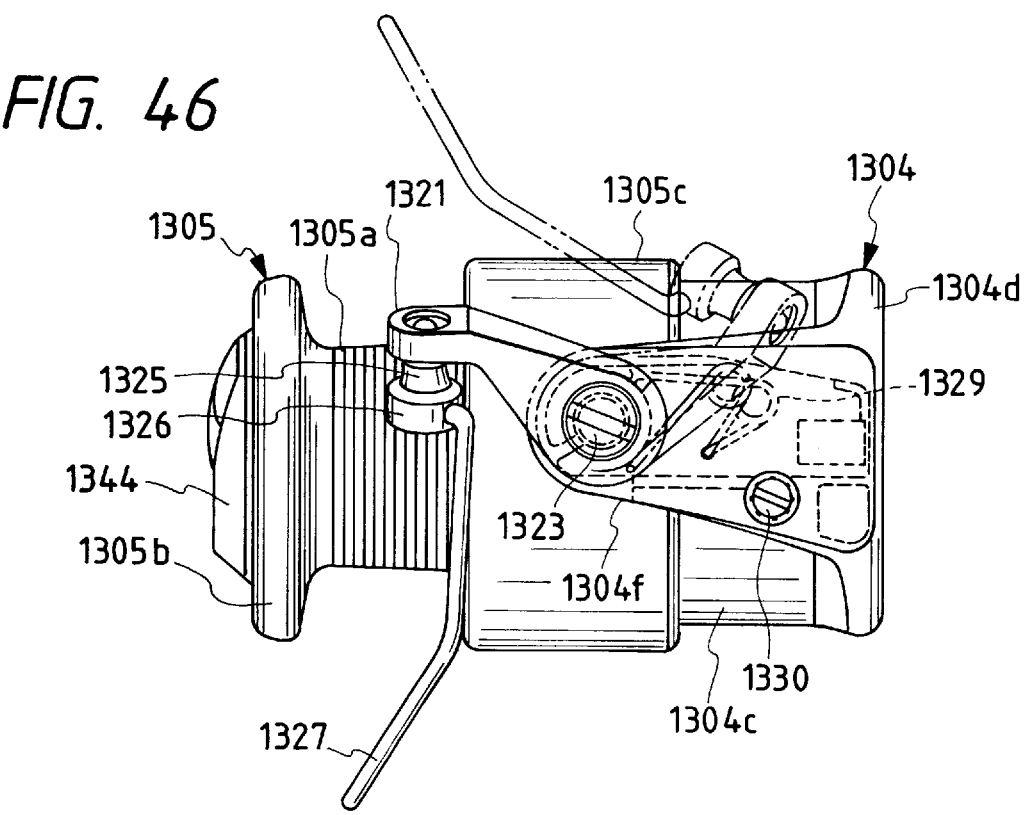
FIG. 46 is a side view of one bail support member with a fishing line guide roller mounted thereon, a rotor, and a spool respectively employed in the thirteenth embodiment.
Figure 47:
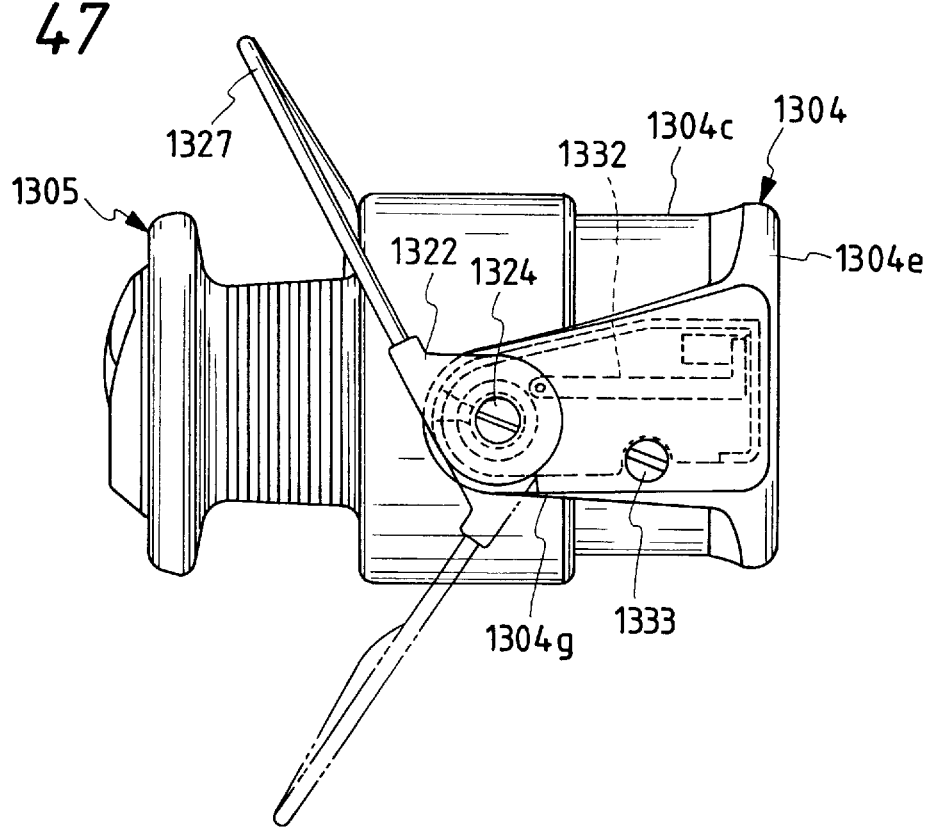
FIG. 47 is a side view of the other bail support member, the rotor and the spool in the thirteenth embodiment.

One bail support member 1321 and the other bail support member 1322 are respectively journaled on the outside of the leading end portions of the two bail support arms 1304*f* and 1304*g* by screws 1323 and 1324 in such a manner that they can be freely reversed between their respective fishing line retrieving positions shown by solid lines and their respective fishing line casting positions shown by two-dot chained lines, as shown in FIGS. 46 and 47.

The mounting portion 1326 for a fishing line guide roller 1325 is mounted on one bail support member 1321.

A bail 1327 is installed between the other bail support member 1322, and the mounting portion 1326 for the fishline guide roller 1325.

On the inner side of the large-diameter cylindrical portion 1304*c* of the rotor 1304, there are formed a recessed groove and a through hole 1304*h* which respectively extend in the axial direction of the rotor 1304 and also with which a butting rod 1328 is fitted in such a manner that it can be freely moved back and forth.

Figure 41:
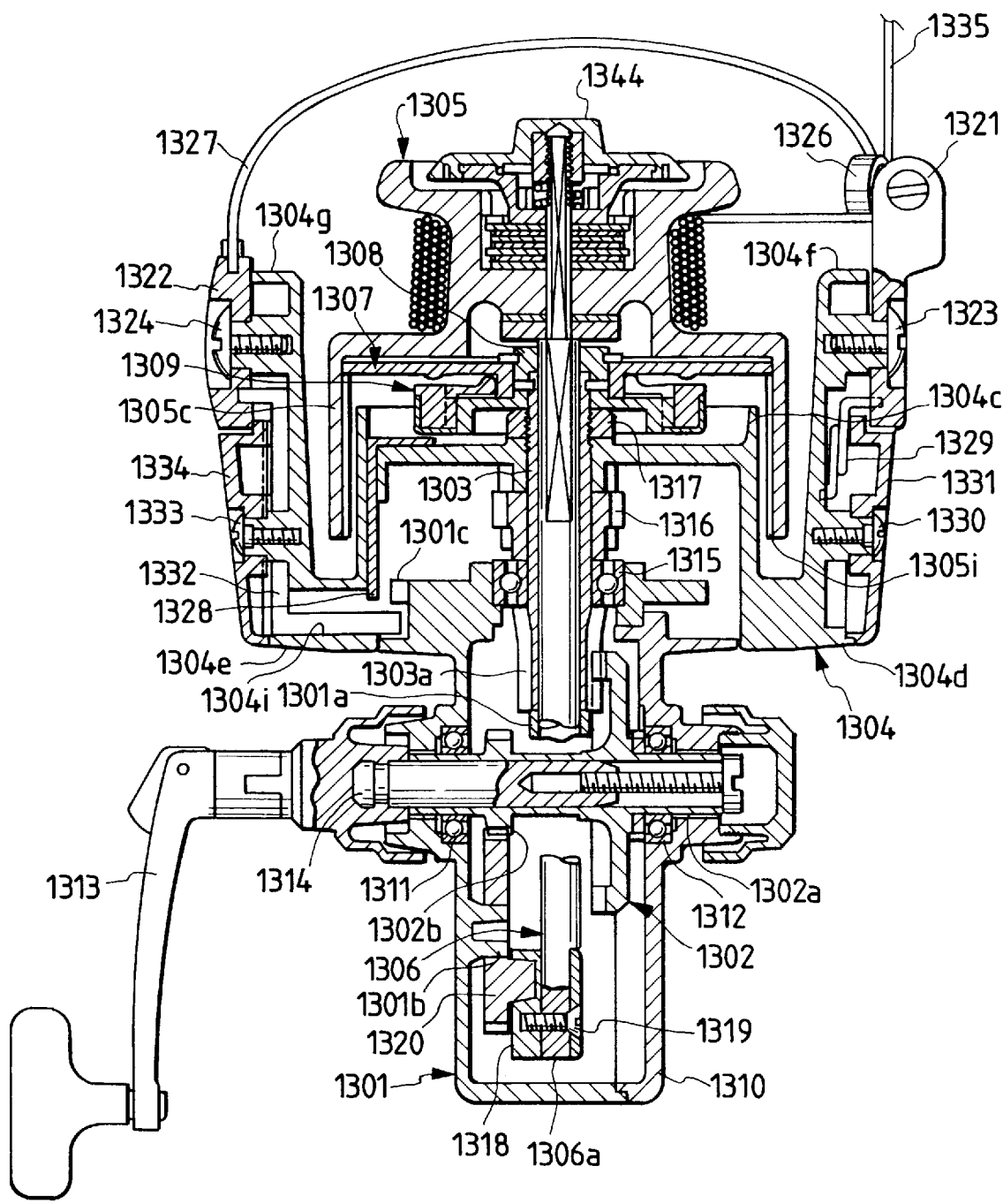
FIG. 41 is a sectional plan view of the main portions of a thirteenth embodiment of a spinning reel for fishing according to the invention.

Within one bail support arm 1304*f* of the rotor 1304, as shown in FIGS. 41 and 46, there is provided a torsion spring 1329 in such a manner that one end thereof is secured to the interior of the support arm 1304*f* and the other end is secured to the bail support member 1321. The torsion spring 1329 energizes one bail support member 1321. To switch the one bail support member 1321, the other bail support member 1322, the mounting portion 1326, the fishing line guide roller 1325, and the bail 1327 all together from their respective fishing line retrieving positions to their respective fishing line casting positions and vice versa. Also, the torsion spring 1329 is covered with a cover 1331 which is fixed by a screw 1330.

On the other hand, within the other bail support arm 1304*g*, as shown in FIGS. 41 and 47, there is disposed an L-shaped reverse-function lever 1332 which is used to reverse one bail support member 1321, the other bail support member 1322, the mounting portion 1326, the fishing line guide roller 1325, and the bail 1327 all together from their respective fishing line casting positions shown by the two-dot chained lines to their respective fishing line retrieving positions shown by the solid lines.

The reverse-function lever 1332 located within the other bail support arm 1304*g* is covered with a cover 1334 which is fixed by a screw 1333.

One end portion of the reverse-function lever 1332 is engaged with the other bail support member 1322, whereas the other end portion thereof is inserted through a through hole 1304*i* so formed in the base portion 1304*e* of the large-diameter cylindrical portion 1304*c* of the rotor 1304 as to extend toward the central portion of the rotor 1304 and is further projected inwardly of the large-diameter cylindrical portion 1304*c* of the rotor 1304.

The other end portion of the reverse-function lever 1332 is disposed such that it can be butted against a cam 1301*c* formed in the reel main body 1301 and it also can push up the butting rod 1328.

Now, the spool 1305 includes a fishing line winding barrel portion 1305*a* which is formed in the outer periphery of the spool 1305 and around which a fishing line 1335 is to be wound, a flange portion 1305*b* formed in the front portion of the spool 1305, a large-diameter cylindrical portion 1305*c* formed in the rear portion of the spool 1305, a through hole 1305*d* which is formed in the central portion of the spool 1305 and into which the leading end small-diameter portion 1306*b* of the spool shaft 1306 is to be fitted, a recessed portion 1305*e* which is formed in the front portion of the spool 1305 and in which a brake plate 1336, a brake plate 1337 and a friction plate 1338 respectively forming the brake means of a drag mechanism are to be stored, and a shaft cylinder portion 1305*f* formed in the rear portion of the spool 1305.

Within the recessed portion 1305*e*, there are formed a two-strip recessed portion 1305*g* with which a projecting portion formed in the outer periphery of the brake plate 1337 can be engaged, and a securing stepped portion 1305*h* consisting of a recessed portion which is so formed in the front inner periphery of the recessed portion 1305*e* as to extend outwardly in the diametrical direction thereof from the present inner periphery and to which a slippage preventive stop ring 1339 of the brake means can be secured.

In the inner periphery of the large-diameter cylindrical portion 1305*c* of the spool 1305, there are formed a plurality of grooves 1305*i* which respectively extend in the axial direction of the spool 1305.

On the other hand, in the outer periphery of the leading end small-diameter portion 1306*b* of the spool shaft 1306, there is provided a rotation preventive portion 1306*c*, while a threaded portion 1306*d* is formed in the leading end portion of the small-diameter portion 1306*b*.

In the large-diameter portion 1306*e* of the spool shaft 1306, there is formed a rotation preventive portion 1306*f*.

The brake plate 1336, brake plate 1337 and friction plate 1338 respectively forming the brake means of the drag mechanism are respectively fitted with the outer periphery of the leading end small-diameter portion 1306b of the spool shaft 1306, while the brake plate 1336 is prevented against rotation by the rotation preventive portion 1306c.

The brake plate 1337A includes in the outer periphery thereof a projecting portion which is engaged with the two-strip recessed portion 1305g of the spool 1305 and is thereby prevented against rotation.

When the spool 1305 is fitted with the leading end small-diameter portion 1306b of the spool shaft 1306, a friction plate 1340 and a brake plate 1341 are interposed between the stepped portion of the leading end small-diameter portion 1306b of the spool shaft 1306 and the shaft cylindrical portion 1305f of the spool 1305.

The drag mechanism further includes a pressure member 1342 in which there is formed a rotation preventive hole 1342a. The rotation preventive hole 42a is fitted with the outer periphery of the rotation preventive portion 1306c of the leading end small-diameter portion 1306b of the spool shaft 1306 in such a manner that it is prevented against rotation, while a spring 1343 is inserted into the rotation preventive hole 1342a.

A nut 1345, which is installed within a recessed portion 1344a formed in a knob 1344 forming a part of the drag mechanism, is threadedly engaged with the threaded portion 1306d of the leading end small-diameter portion 1306b of the spool shaft 1306.

Figure 42:
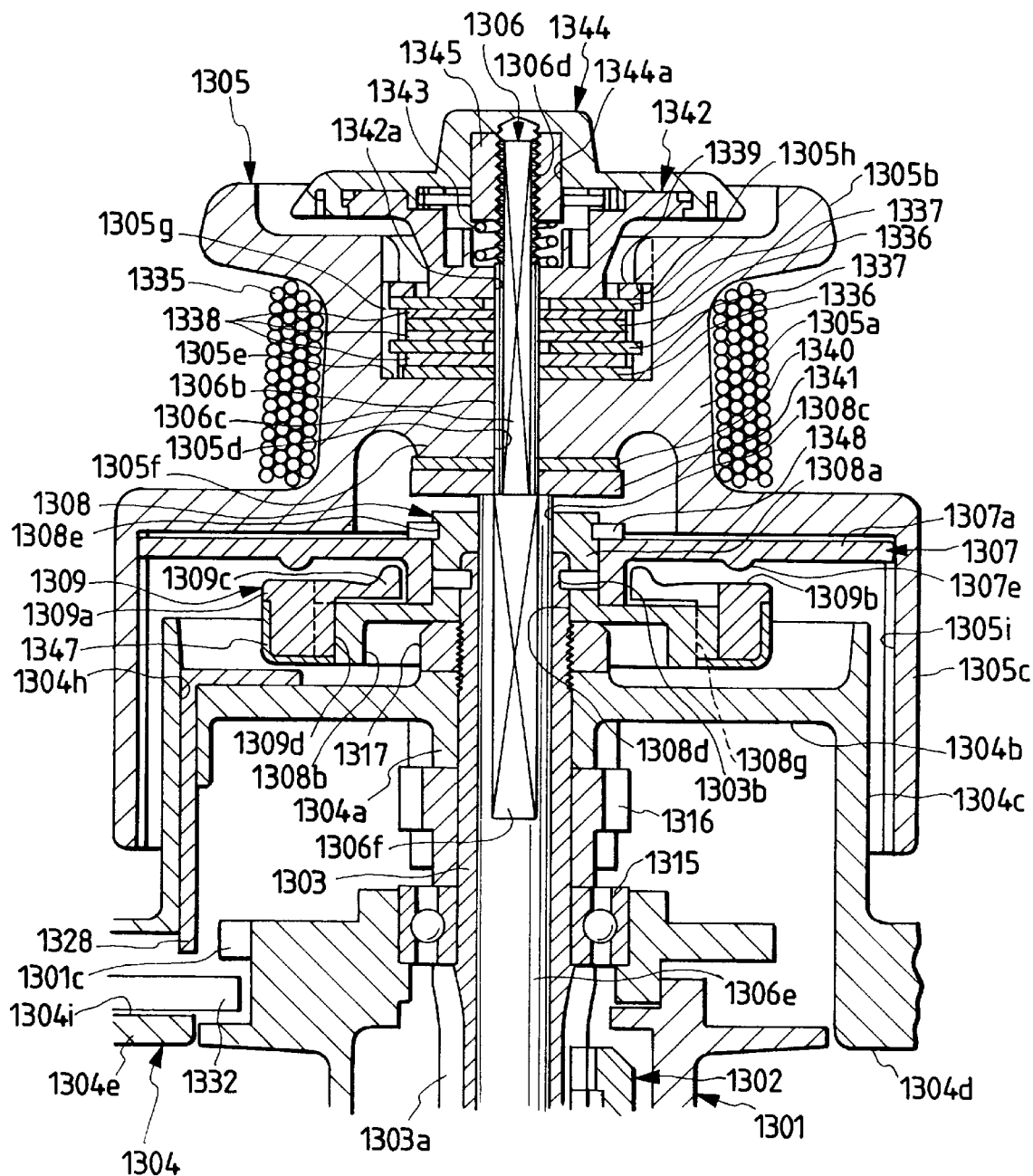
FIG. 42 is an enlarged sectional plan view of the main portions of the above-mentioned thirteenth embodiment.

Between the front portion of the reel main body 1 and the spool 1305, as shown in FIGS. 41 and 42, there are interposed a first lock member 1307, a second lock member 1308, and a connecting member 1309.

Figure 43:
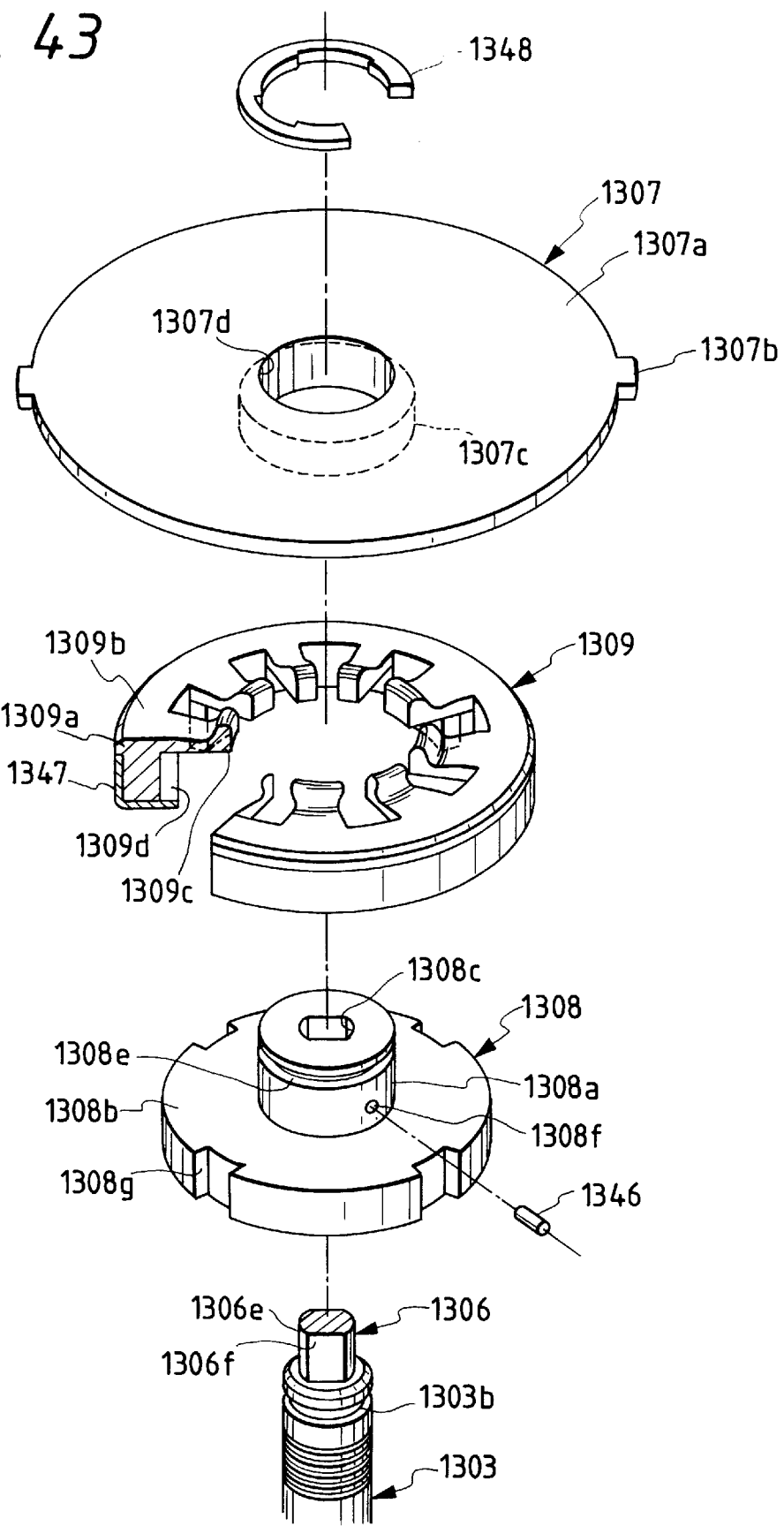
FIG. 43 is an exploded perspective view of a first lock member, a connecting member, a second lock member and a spool shaft respectively employed in the thirteenth embodiment.

The first lock member 1307, as shown in FIG. 43, includes a disc portion 1307a, a pair of projections 1307b respectively formed in the outer periphery of the disc portion 1307a, and a cylindrical portion 1307c and a through hole 1307d respectively formed on the reel main body (1301) side of the central portion of the first lock member 1307.

Figure 44:
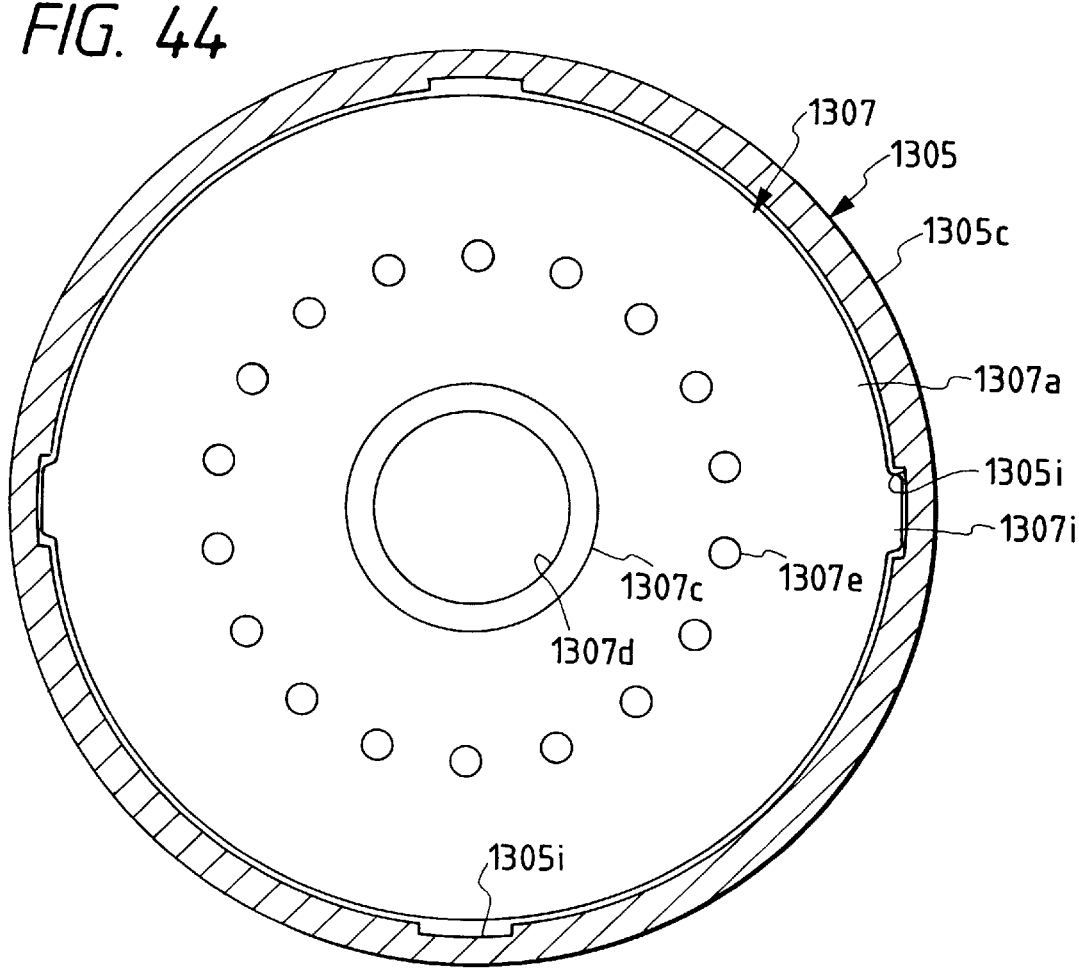
FIG. 44 is a sectional back view of a spool together with a back view of the first lock member in the thirteenth embodiment.

On the reel main body (1301) side of the disc portion 1307a of the first lock member 1307, as shown in FIG. 44, there is provided an engaging portion 1307e formed by a plurality of projections. The second lock member 1308 includes a central cylinder portion 1308a and a disc portion 1308b.

In the cylinder portion 1308a, there are formed a rotation preventive through hole 1308c and a large-diameter cylindrical hole 1308d and, in the outer periphery of the cylinder portion 1308a, there are formed a peripheral groove 8e and a fixing hole 1308f for fixing a pin 1346.

In the outer periphery of the disc portion 1308b, there are formed a plurality of recessed portions 1308g.

The connecting member 1309 is formed of hard rubber or the like in a ring shape.

The connecting member 1309 includes an annular portion 1309a one side surface of which is structured as an engaging portion 1309b. In the annular portion 1309a of the connecting member 1309, there are provided a plurality of elastic arm portions 1309c which respectively extend toward the center of the annular portion 1309a while the central portion of each of the arm portion 1309c is projected upward.

Figure 45:
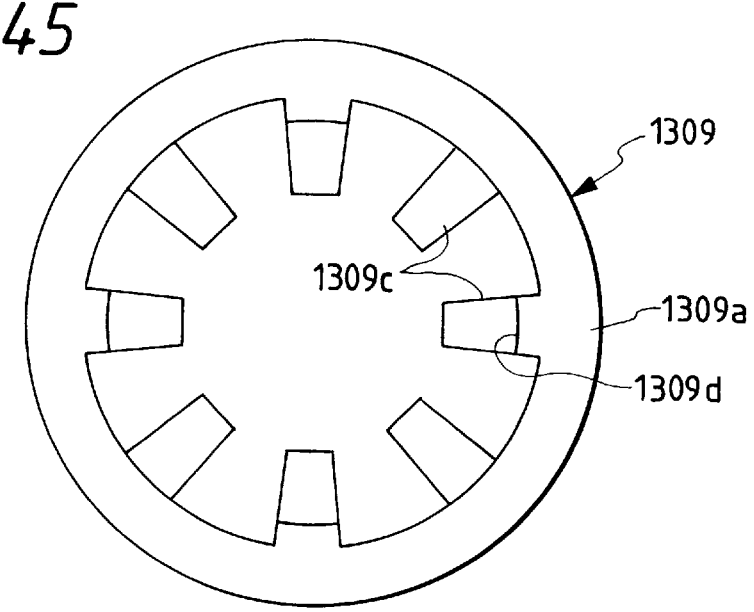
FIG. 45 is a bottom view of the above-mentioned connecting member.

In the inner periphery of the annular portion 1309a, as shown in FIG. 45, there are provided a plurality of projecting portions 1309d.

A hard cap 1347, which is formed of metal or synthetic resin, is fitted with and fixed not only to the bottom surface and but also to the outer periphery of the annular portion 1309a, while a plurality of projecting portions are provided in the portions of the hard cap 1347 that correspond in position to the projecting portions 1309d of the annular portion 1309a.

When the first lock member 1307, second lock member 1308 and connecting member 1309 are assembled together, the pair of projections 1307b of the first lock member 1307 are respectively engaged with the axially extending grooves 1305i of the inner periphery of the large-diameter cylindrical portion 1305c of the spool 1305 in such a manner that the first lock member 1307 is movable in the axial direction thereof and is prevented against rotation in the peripheral direction thereof.

The central cylinder portion 1308a of the second lock member 1308 is fitted into the through hole 1307d of the cylindrical portion 1307c of the first lock member 1307 and is prevented against removal by an E ring 1348.

The connecting member 1309 is fitted with the disc portion 1308b of the second lock member 1308 and the projecting portion 1309d is engaged with the recessed portion 1308f, so that the connecting member 1309 is movable in the axial direction thereof but is prevented against rotation in the peripheral direction thereof.

The rotation preventive portion 1306f of the large-diameter portion 1306e of the spool shaft 1306 is inserted into the rotation preventive through hole 1308c of the central cylinder portion 1308a of the second lock member 1308 in such a manner that it is movable in the axial direction thereof but is prevented against rotation in the peripheral direction thereof, the leading end portion of the rotary shaft cylinder 1303 is rotatably fitted into the large-diameter cylindrical hole 1308d, and the pin 1346 is inserted into the peripheral groove 1303b to thereby prevent the rotary shaft cylinder 1303 against removal.

The engaging portion 1307e of the first lock member 1307 in the form of a plurality of projections is disposed such that it can be contacted with the engaging portion 1309b of the annular portion 1309a of the connecting member 1309.

Referring now to the operation of the above-mentioned spinning reel for fishing, when one bail support member 1321 and the other bail support member 1322 are respectively held at their respective fishing line retrieving positions, if the handle 1313 is rotated in a direction in which the fishing line 1335 can be wound around the spool 1305, then the drive gear 1302 is rotated and the rotary shaft cylinder 1303 and rotor 1304 are thereby rotated forwardly through the pinion 1303a.

Further, as the drive gear 1302 is rotated, the gear 1302b rotates the gear 1320 to thereby reciprocate the spool shaft 1306 and spool 1305.

Referring here to an operation to adjust the brake force of the brake means of the drag mechanism, if the knob 1344 is rotated, then the pressure member 1342 is moved back and forth in the axial direction thereof. In particular, when the pressure member 1342 is moved forward, it presses against the brake plate 1336, brake plate 1337, friction plate 1338, friction plate 1340 and brake plate 1341 of the brake means to thereby adjust, that is, increase the brake force of the brake means of the drag mechanism.

To prevent the rotor 1304 from being rotated reversely, if an operation knob, an operation rod, and a reversal preventive claw (which are not shown) are rotated, then the reversal preventive claw is engaged with the reversal preventive ratchet wheel 1316.

After the rotor 1304 is locked and is thereby prevented against reverse rotation, in an actual fishing operation, if the fishing line 1335 is pulled out by fish hitting the bait to thereby cause the spool 1305 to attempt to rotate reversely, then the brake force of the drag mechanism will be applied between the spool 1305 and spool shaft 1306.

If the fishing line 35 with the terminal tackles is to be cast out a long distance, the two bail support members 21 and 22 are reversed to their respective fishing line casting positions and the fishing rod is swung down vigorously.

If the bail support members 1321 and 1322 are reversed to the fishing line casting positions, then the other end portion of the reverse-function lever 1332 is moved forward and, with the forward movement of the other end portion of the reverse-function lever 1332, the other end portion of the lever 1332 is set at a position where it can be butted against the cam 1301c provided in the reel main body 1301.

Figure 48:
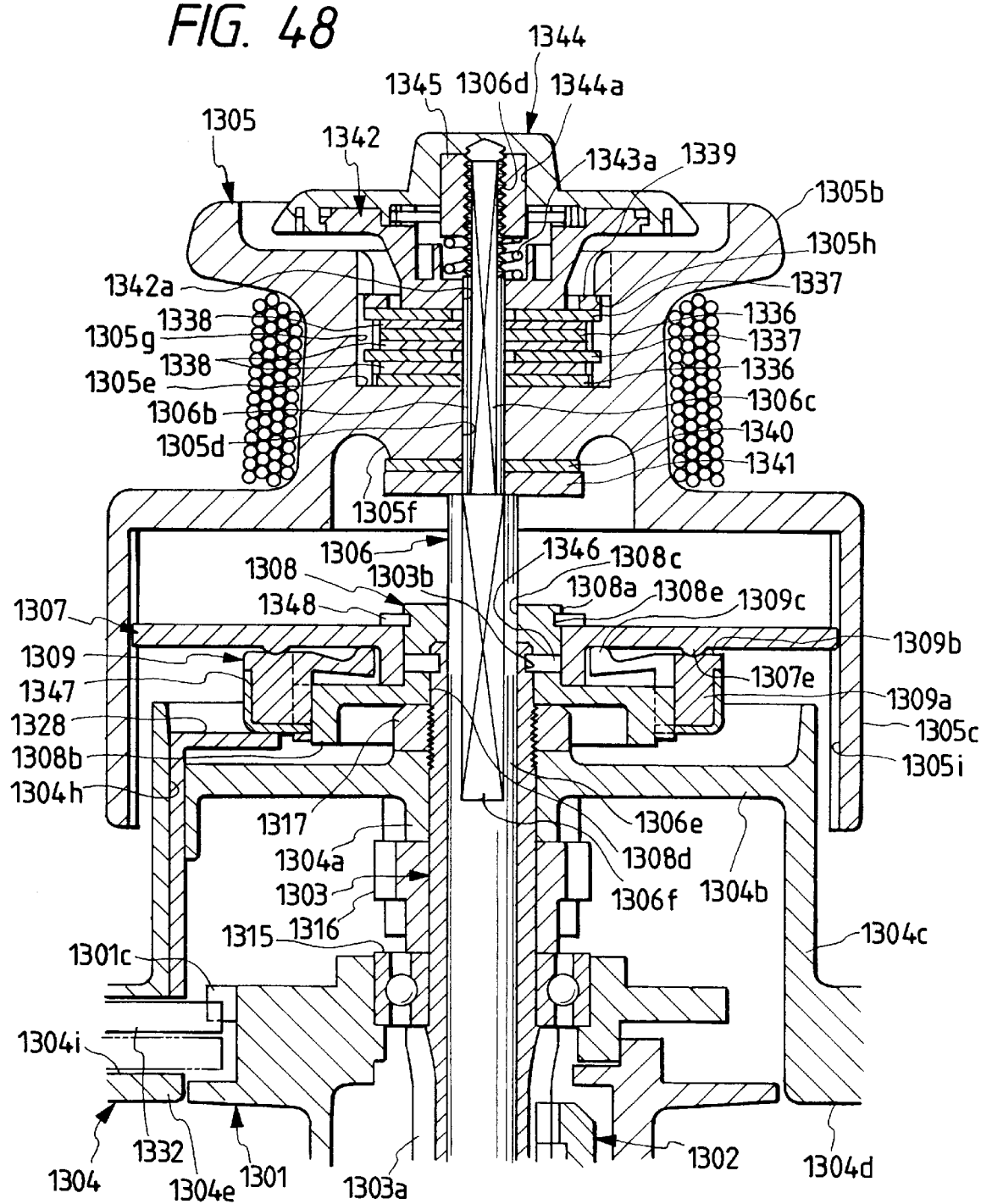
FIG. 48 is an enlarged sectional plan view of the main portions of the spinning reel for fishing according to the thirteenth embodiment, when the spool is prevented against rotation.

Further, as shown in FIG. 48, with the forward movement of the other end portion of the reverse-function lever 1332, the butting rod 1328 is moved forward and thus butted against the hard cap 1347 of the connecting member 1309, so that the connecting member 1309 is moved forward.

As the connecting member 1309 is moved forward, the engaging portion 1309b of the annular portions 1309a of the connecting member 1309 is contacted and engaged with the engaging portion 1307e of the first lock member 1307.

The engagement between the engaging portion 1309b and the engaging portion 1307e brings the first lock member 1307, which is engaged with the spool 1305 and is thereby prevented against rotation, into engagement with the connecting member 1309 prevented against rotation by the second lock member 1308 which is in turn prevented against rotation by the spool shaft 1306, thereby locking or preventing the spool 1305 against rotation.

After the fishing line is cast, if the handle 1313 is rotated in a direction in which the fishing line 1335 can be wound around the spool 1305, then the drive gear 1302 is rotated so that the rotary shaft cylinder 1303 and rotor 1304 are respectively rotated forward through the pinion 1303a.

With the forward rotation of the rotor 1304, the other end portion of the reverse-function lever 1332 is butted against the cam 1c of the reel main body 1301 and is further pushed backward, thereby reversing the two bail support members 1321 and 1322 to their respective fishing line retrieving positions.

As the other end portion of the reverse-function lever 1332 is pushed backward, the butting rod 1328 and connecting member 1309 are retreated with the aid of elastic property of the arm portions 9c so that the engaging portion 1309b of the connecting member 1309 is removed from the engagement with the engaging portion 1307e of the first lock member 1307, thereby allowing the spool 1305 to be rotated freely.

As described above, the thirteenth embodiment of the invention is structured such that the first lock member 1307, which is in engagement with the spool 1305 in such a manner that it is movable in the axial direction thereof but is prevented against rotation, is supported in such a manner that it can be rotated with respect to the spool shaft 1306; the second lock member 1308 is supported on the spool shaft 1306 in such a manner that it is prevented against rotation; the connecting member 1309, which is connected with the second lock member 1308 in such a manner that it is movable in the axial direction thereof but is prevented against rotation, is so disposed as to be engageable with and removable from the first lock member 1307; and, the engaging portion 1309b of the connecting member 1309 can be engaged with the engaging portion 1307e of the first lock member 1307 in linking with the reversal operation of the two bail support members 1321 and 1322 from their respective fishing line retrieving positions to their respective fishing line casting positions.

If the spool 1305 is prevented against rotation in the casting operation, when the casting operation is carried out while the drag force of the drag mechanism is set to a weak level in order to prevent the fishing line from being cut by fish hitting the bait, there can be eliminated the possibility that the spool can be rotated due to the weight of the terminal tackles at the initial motion to cast the fishing line. Thus, the invention makes it possible not only to prevent the fingers of the angler from being damaged but also to cast the fishing line securely.

Since the present spinning reel for fishing is structured in the above-mentioned manner, when the two bail support members 1321 and 1322 are reversed to their respective fishing line casting positions to cast the fishing line the spool 1305 is prevented from being rotated with respect to the spool shaft 1306, which makes it possible not only to prevent the rotation of the spool 1305 due to the weight of the terminal tackles even if the drag force of the drag mechanism is set in a weak level to thereby protect the fingers against damage, but also to assure the secure throwing of the terminal tackles.

Also, after the casting operation, if the handle 1313 is rotated in a direction in which the fishing line 1335 can be wound around the spool 1305, then the rotor 1304 is rotated forward and the other end portion of the reverse-function lever 1332 is thus butted against and is further pushed backward to thereby reverse the two bail support members 1321 and 1322 to their respective fishing line retrieving positions, so that an operation to return the bail to its fishing line retrieving position after casting of the fishing line can be carried out automatically.

Further, as the other end portion of the reverse-function lever 1332 is pushed backward in this manner, the connecting member 1309 is retreated, that is, the engaging portion 1309e of the connecting member 1309 is removed from the engagement with the engaging portion 1307e of the first lock member 1307, so that the rotation prevention of the spool 1305 can be removed automatically and easily to thereby allow the spool 1305 to be rotated freely.

Now, FIGS. 49 to 53 show a fourteenth embodiment of a spinning reel for fishing according to the invention.

Figure 49:
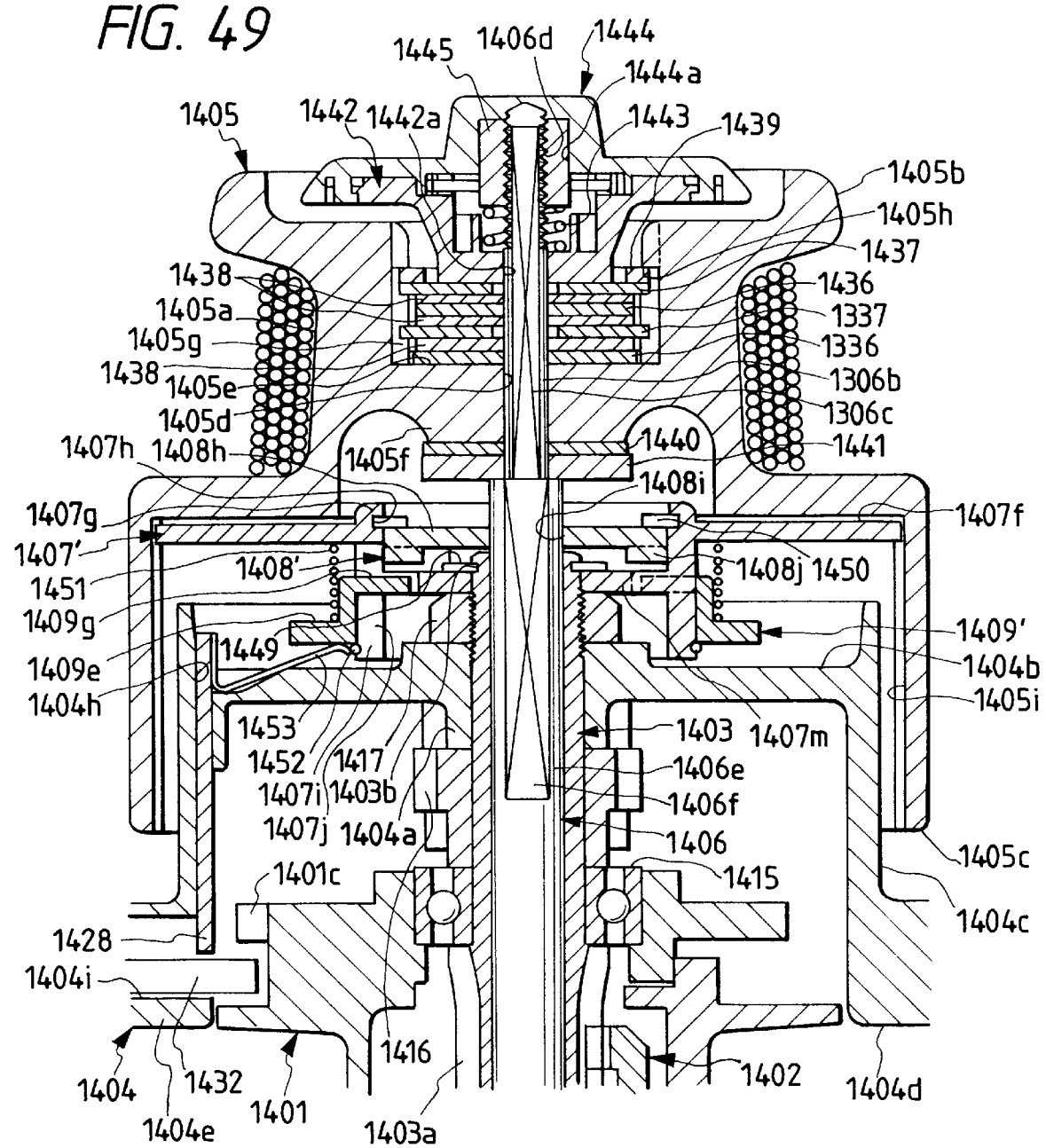
FIG. 49 is an enlarged sectional plan view of a fourteenth embodiment of a spinning reel for fishing according to the invention.

In the fourteenth embodiment, between the front portion of a reel main body 1401 and a spool 1405, as shown in FIG. 49, there are interposed a first lock member 1407', a second lock member 1408', and a connecting member 1409'.

Figure 51:
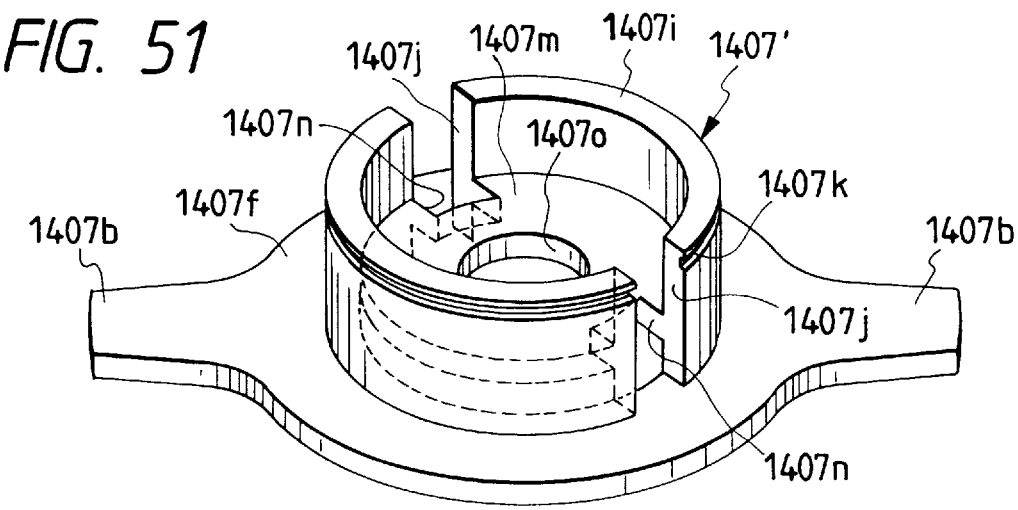
FIG. 51 is a perspective view of a first lock member employed in the fourteenth embodiment, when viewed from the reel main body side.
Figure 52:
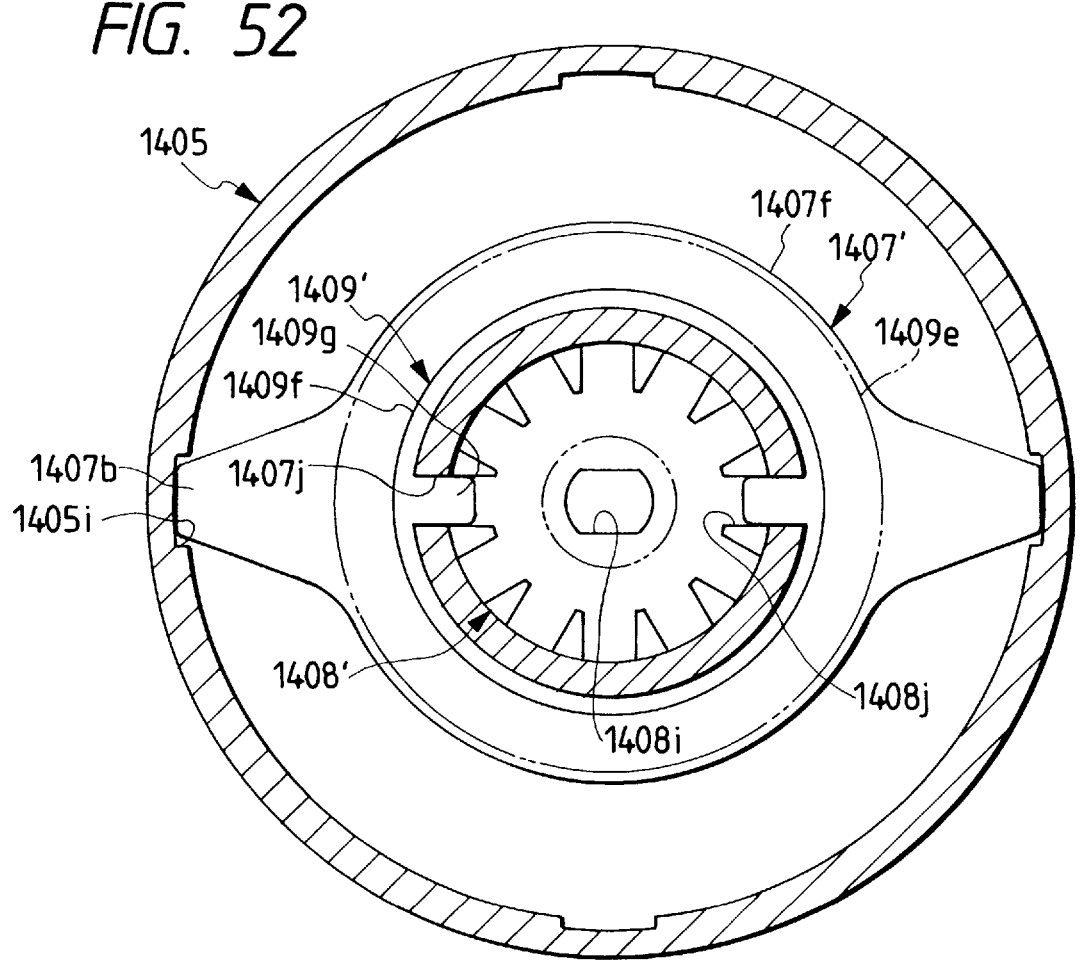
FIG. 52 is a back view of a spool, a first lock member and a connecting member employed in the fourteenth embodiment, in which the connecting member is shown in section.

The first lock member 1407' includes a plate portion 1407f which, as shown in FIGS. 51 and 52, is formed in a modified oval shape.

The two end portions 1407b and 1407b of the plate portion 1407f are respectively in engagement with grooves 1405i respectively so formed in the inner periphery of the large-diameter cylindrical portion 1405c of the spool 1405 as to extend in the axial direction of the spool, while the two end portions 1407b are movable in the axial direction of the spool 1405 but are prevented against rotation in the peripheral direction of the spool 1405.

The plate portion 11407f of the first lock member 1407' includes on the upper surface thereof a cylindrical portion 1407g which has a large diameter and is short in the axial direction thereof, while the cylindrical portion 1407g includes a peripheral groove 1407h formed in the inner periphery thereof.

The plate portion 1407f further includes a large-diameter cylindrical portion 1407i on the lower surface thereof. In the two portions of the outer periphery of the cylindrical portion 1407i, there are formed two slits 1407j and 1407j which respectively extend in the axial direction of the cylindrical portion 1407i, while a peripheral groove 1407k is formed in the lower end portion of the outer periphery of the cylindrical portion 1407i.

Within the cylindrical portion 1407i, there is formed a partition portion 1407m and, in the partition portion 1407m, there are formed two notches 1407n and 1407n which are respectively in communication with the slits 1407j and 1407j, and a central through hole 1407o.

The second lock member 1408', as shown in FIGS. 49 and 52, includes a disc portion 1408h which has a rotation preventive through hole 1408i formed in the central portion thereof. In the periphery of the lower surface of the disc portion 1408h, there are provided a plurality of projections defining recessed portions between them, the recessed portions serving as an engaging portion 1408j.

Figure 50:
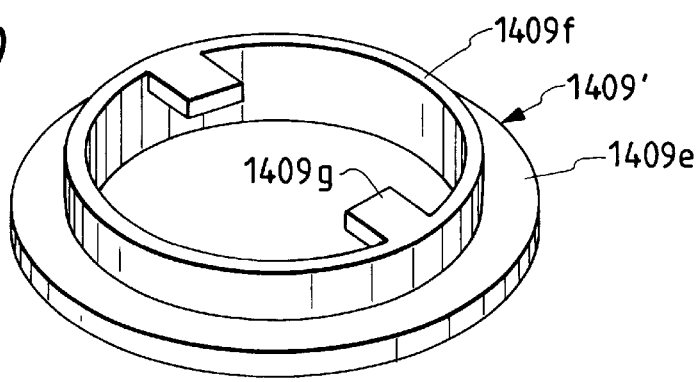
FIG. 50 is a perspective view of a connecting member employed in the fourteenth embodiment.

The connecting member 1409' is formed of metal or synthetic resin and, as shown in FIGS. 49 and 50, includes a ring-shaped plate portion 1409e which in turn includes a large-diameter cylindrical portion 1409f on one side thereof and, in the inner periphery of the cylindrical portion 1409f, there are formed two tongue-like engaging portions 1409g which respectively extend toward the center of the connecting member 1409'.

When the first lock member 1407', second lock member 1408' and connecting member 1409' are assembled together, the two end portions of the first lock member 1407' are engaged with the axial grooves 1405i of the inner periphery of the large-diameter cylindrical portion 1405c of the spool 1405, so that the first lock member 1407' is free to move in the axial direction of the spool 1405 but is prevented against rotation in the peripheral direction of the spool 1405.

Further, the leading end portion of the rotary shaft cylinder 1403 is rotatably fitted into the central through hole 1407o of the partition portion 1407m of the first lock member 1407' and an E ring 1449 is fitted into the peripheral groove 1403b of the rotary shaft cylinder 1403 to thereby prevent the rotary shaft cylinder 1403 against removal.

The second lock member 1408' is inserted into the cylindrical portion 1407g formed in the upper surface of the first lock member 1407' and an E ring 1450 is fitted into the peripheral groove 1407h to thereby prevent the second lock member 1408' against removal.

The rotation preventive portion 1406f of the large-diameter portion 1406e of the spool shaft 1406 is inserted into the rotation preventive through hole 1408i of the second lock member 1408' in such a manner that it is free to move in the axial direction but is prevented against rotation in the peripheral direction.

The connecting member 1409' is fitted with the outer periphery of the large-diameter cylindrical portion 1407i formed in the lower surface of the first lock member 1407' in such a manner that it is free to move in the axial direction but is prevented against rotation in the peripheral direction.

In this state, the two tongue-like engaging portions 1409g of the connecting member 1409' are respectively inserted into the slits 1407j, 1407j and notches 1407n, 1407n of the first lock member 1407'.

A spring 1451 is inserted between the plate portion 1407f of the first lock member 1407' and the plate portion 1409e of the connecting member 1409', and the connecting member 1409' is prevented against removal by an O ring 1452 which is fitted into the peripheral groove 1407k of the first lock member 1407'.

On the inside of the large-diameter cylindrical portion 1404c of the rotor 1404, there are formed a recessed groove and a through hole 1404h which respectively extend in the axial direction of the rotor 1404, a butting rod 1428 is fitted into the recessed groove and the through hole 1404h in such a manner that it is free to move back and forth, and one end of a dogleg-shaped or V-shaped spring 1453 is fixed to the leading end portion of the butting rod 1428.

The other end of the spring 1453 is in contact with the back surface of the plate portion 1409e of the connecting member 1409'.

The rotor 1404 includes in the front wall portion 1404b a recessed portion which is so formed as to have a proper depth.

The remaining portions of the structure of the fourteenth embodiment are substantially the same as those of the previously described thirteenth embodiment.

In the fourteenth embodiment, when the fishing line 1435 with the terminal tackles is cast a long distance, the two bail support members 1421 and 1422 are reversed to their respective fishing line casting positions and the fishing rod is swung down vigorously.

In particular, if the two bail support members 1421 and 1422 are reversed to their respective fishing line casting positions, then the other end portion of the reverse-function lever 1432 is moved forward and, with the forward movement of the other end portion of the reverse-function lever 1432, the other end portion of the reverse-function lever 1432 is set at a position where it can be butted against the cam 1401c provided in the reel main body 1401.

Figure 53:
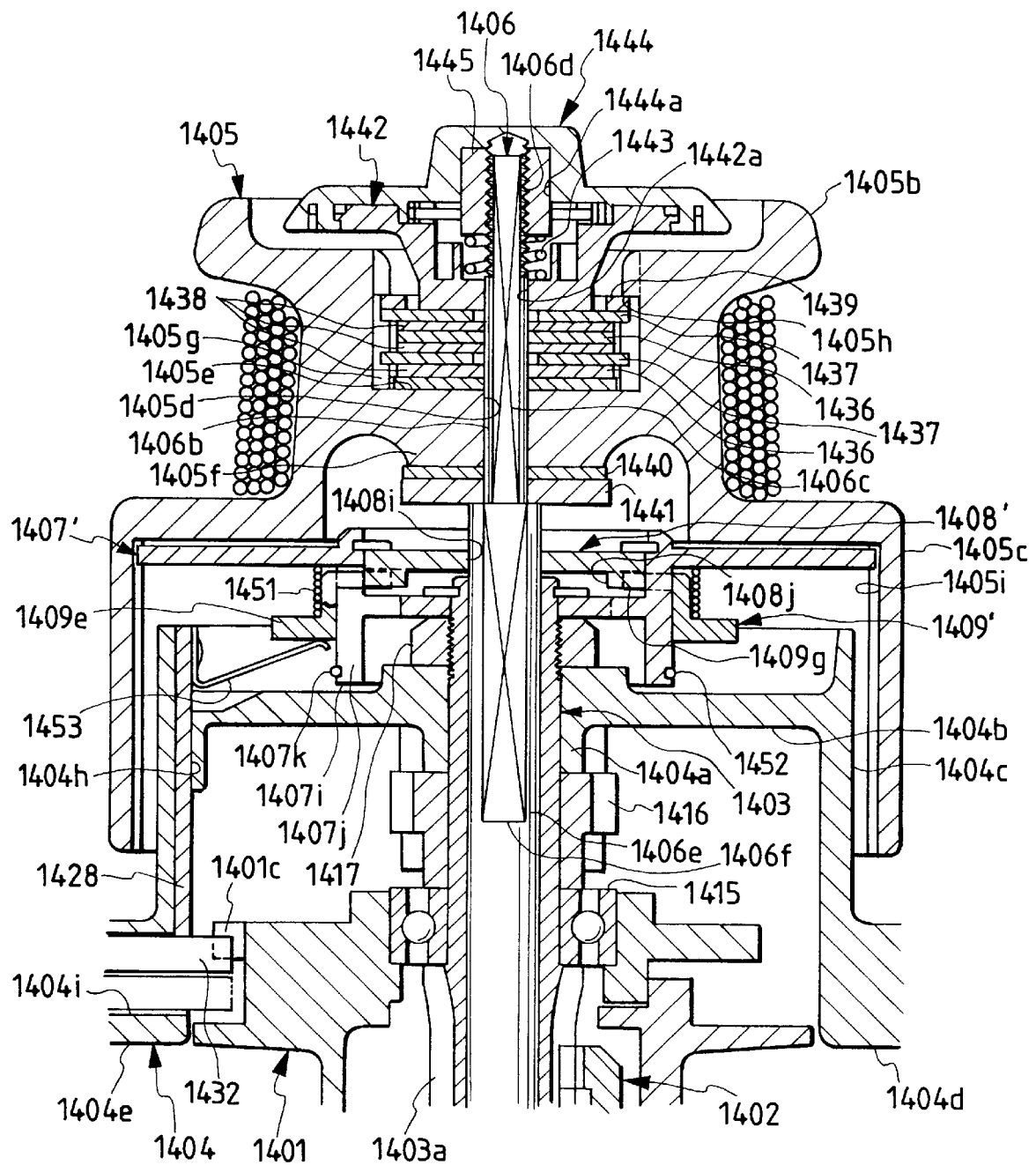
FIG. 53 is an enlarged sectional side view of the main portions of the spinning reel for fishing according to the fourteenth embodiment, when the spool is prevented against rotation.

Further, as shown in FIG. 53, due to the forward movement of the other end portion of the reverse-function lever 1432, the butting rod 1428 is moved forward so that the connecting member 1409' is moved forward by the spring 1453 fixed to the butting rod 1428.

As the connecting member 1409' is moved forward, the pair of engaging portions 1409g of the connecting member 1409' are engaged with the pair of engaging portions 1408j of the second lock members 1408', respectively.

Due to the engagement between the engaging portions 1409g and the engaging portions 1408j, the connecting member 1409', which is prevented against rotation by the first lock member 1407' engaged with the spool 1405 in such a manner that it is prevented against rotation, is brought into engagement with the second lock member 1408' which is prevented against rotation by the spool shaft 1406, thereby preventing the spool 1405 against rotation.

As described above, the spinning reel according to the fourteenth embodiment is structured in the following manner: that is, the first lock member 1407', which is installed on the spool 1405 in such a manner that it is movable in the axial direction but is prevented against rotation, is supported in such a manner that it can be rotated with respect to the spool shaft 1406; the second lock member 1408' is supported on the spool shaft 1406 in such a manner that it is prevented against rotation; the connecting member 1409', which is connected with the first lock member 1407' in such a manner that it is movable in the axial direction but is prevented against rotation, is disposed such that it can be engaged with and removed from the second lock member 1408'; and, the engaging portions 1409g of the connecting member 1409' can be engaged with the engaging portions 8j of the second lock member 1408' in linking with the reversal operation of the bail support members 1421 and 1422 from their respective fishing line retrieving positions to their respective fishing line casting positions.

If the spinning reel is structured such that the spool 1405 can be prevented against rotation in the casting operation, when the the casting operation is carried out while the drag force of the drag mechanism is set to a weak level in order to prevent the fishing line from being cut by fish hitting the bait, there is eliminated the problem that the spool 1405 can be rotated due to the weight of the terminal tackles at the initial motion to cast the fishing line. The structure of the embodiment not only protects the fingers against damage but also assures the secure throwing of the terminal tackles.

Figure 54:
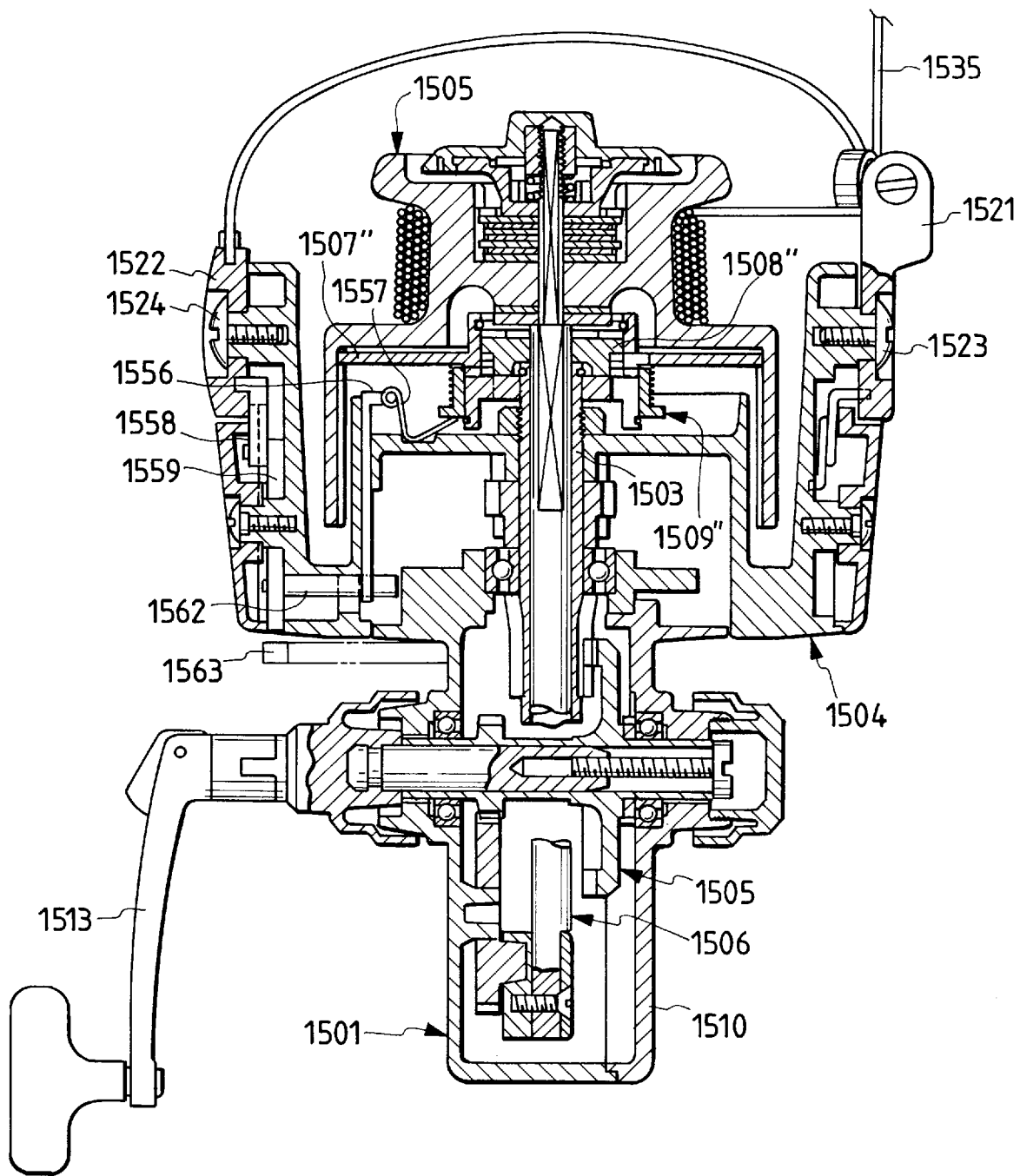
FIG. 54 is a sectional plan view of a fifteenth embodiment of a spinning reel for fishing according to the invention.
Figure 55:
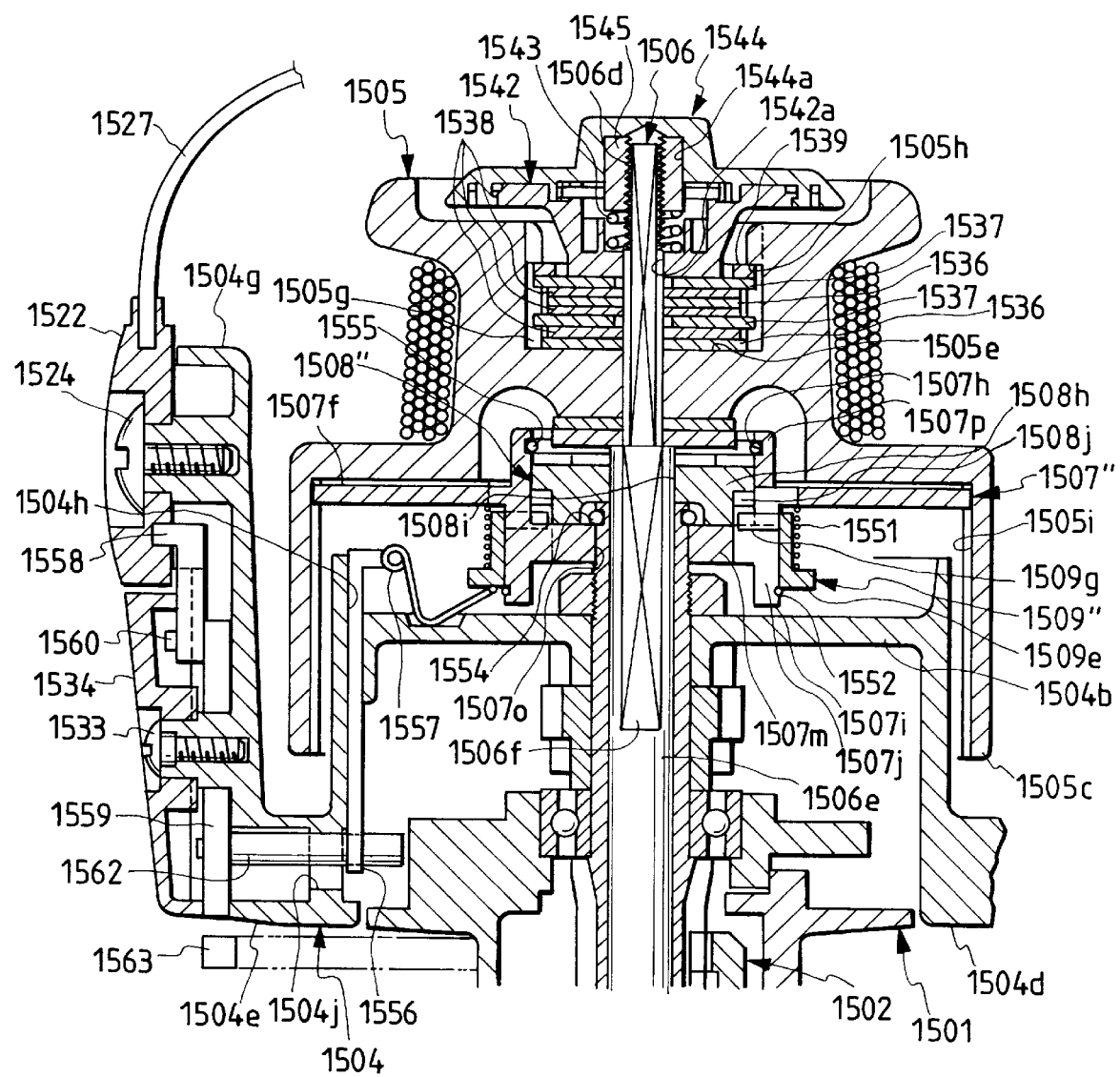
FIG. 55 is a partially enlarged sectional plan view of FIG. 54.

Now, FIGS. 54 to 60 show a fifteenth embodiment of a spinning reel for fishing according to the invention. In the spinning reel according to the fifteenth embodiment, between the front portion of a reel main body 1501 and a spool 1505, as shown in FIGS. 54 and 55, there are interposed a first lock member 1507", a second lock member 1508", and a connecting member 1509".

The first lock member 1507" includes a plate portion 1507*f*, while the two end portions of the plate portion 1507*f* are respectively in engagement with axial grooves 1505*i* formed in the inner periphery of the large-diameter cylindrical portion 1505*c* of the spool 1505 in such a manner that they are free to move in the axial direction but are prevented against rotation in the peripheral direction.

The plate portion 1507*f* includes a large-diameter cylindrical portion 1507*p* on the upper surface thereof, while a peripheral groove 1507*h* is formed in the inner periphery of the large-diameter cylindrical portion 1507*p*.

Figure 56:
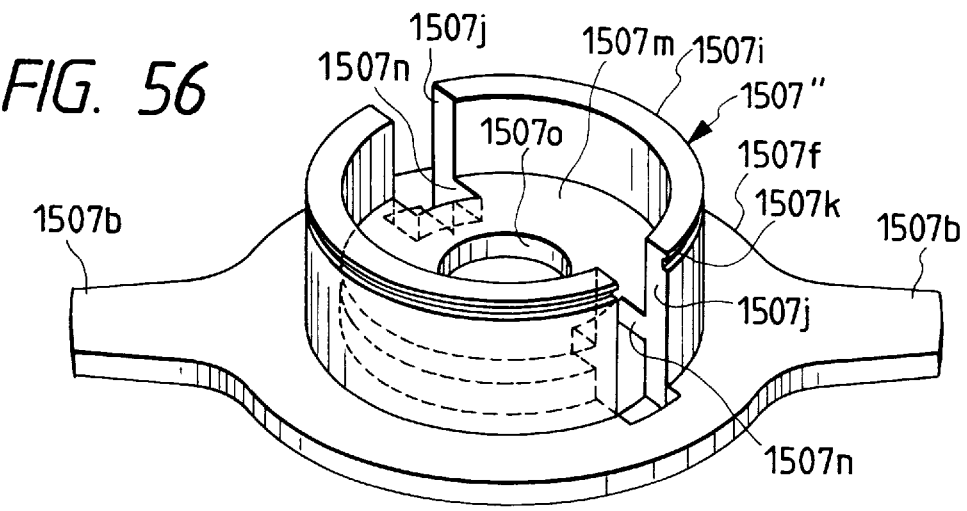
FIG. 56 is a perspective view of the first lock member employed in the fifteenth embodiment, when viewed from the reel main body side.

In the lower surface of the plate portion 1507*f*, as shown in FIGS. 55 and 56, there is formed a large-diameter cylindrical portion 1507*i*. Also, in the two portions of the outer periphery of the cylindrical portion 1507*i*, there are formed two slits 1507*j* and 1507*j* which respectively notch into the plate portion 1507*f* and extend in the axial direction thereof. Further, in the lower end portion of the outer periphery of the plate portion 1507*f*, there is formed a peripheral groove 1507*k*.

The cylindrical portion 1507*i* includes a partition portion 1507*m* therein and, in the partition portion 1507*m*, there are formed notches 1507*n*, 1507*n* which are respectively in communication with the slits 1507*j* and 1507*j* and, a central through hole 1507*o*.

Figure 57:
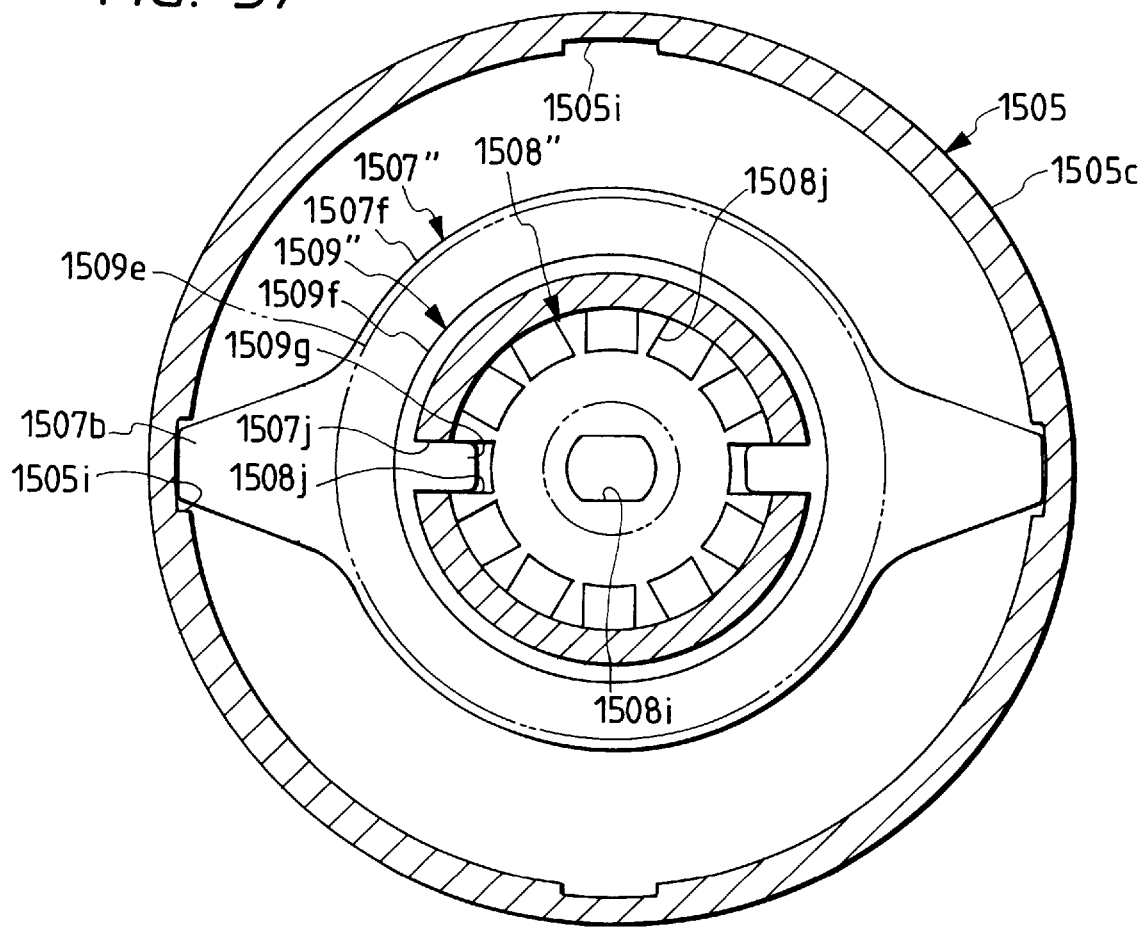
FIG. 57 is a back view of a spool, a first lock member and a connecting member respectively employed in the fifteenth embodiment, in which the connecting member is shown in section.

The second lock member 1508", as shown in FIGS. 55 and 57, includes a disc portion 1508*h* which in turn has a rotation preventive through hole 1508*i* formed in the central portion thereof. Also, in the periphery of the lower surface of the disc portion 1508*h*, there is formed an engaging portion 1508*j* in the form of a plurality of recessed portions.

On the other hand, the connecting member 1509" formed of metal or synthetic resin, as shown in FIGS. 55 and 57, comprises a ring-like plate portion 1509*e* which in turn includes a large-diameter cylindrical portion 1509*f* on one side thereof and, in the inner periphery of the cylindrical portion 1509*f*, there are provided two tongue-like engaging portions 1509*g* which respectively extend toward the central portion of the cylindrical portion 1509*f*.

When the first lock member 1507", second lock member 1508" and connecting member 1509", are assembled together, the two end portions of the first lock member 1507" are respectively engaged with axial grooves 1505*i* respectively formed in a large-diameter cylindrical portion 1505*c* of the spool 1505 in such a manner that they are free to move in the axial direction but are prevented against rotation in the peripheral direction.

Further, the leading end portion of a rotary shaft cylinder 1503 is rotatably fitted into a central through hole 1507*o* formed in a partition portion 1507*m* of the first lock member 1507" and an E ring 1554 is fitted into a peripheral groove 1503*b* of the rotary shaft cylinder 1503 to thereby prevent the rotary shaft cylinder 1503 against removal.

The second lock member 1508" is inserted into the large-diameter cylindrical portion 1507*p* in the upper surface of the first lock member 1507" and an O ring 1555 is fitted into the peripheral groove 1507*h* of the large-diameter cylindrical portion 157*p* to thereby prevent the second lock member 1508" against removal.

A rotation preventive portion 1506*f*, which is formed in a large-diameter portion 1506*e* of a spool shaft 1506 is inserted into the rotation preventive through hole 1508*i* of the second lock member 1508" in such a manner that it is free to move in the axial direction but is prevented against rotation in the peripheral direction.

The connecting member 1509" is fitted with the outer periphery of the large-diameter cylindrical portion 1507*i* provided in the lower surface of the first lock member 1507" in such a manner that it is free to move in the axial direction but is prevented against rotation in the peripheral direction.

The two tongue-like engaging portions 1509*g* of the connecting member 1509" are respectively inserted into the slits 1507*j*, 1507*j* and notches 1507*n*, 1507*n* of the first lock member 1507".

A spring 1551 is inserted between the plate portion 1507*f* of the first lock member 1507" and the plate portion 1509*e* of the connecting member 1509", while the connecting member 1509" is prevented against removal by an O ring 1552 which is fitted into the peripheral groove 1507*k* of the first lock member 1507".

On the inner side of a large-diameter cylindrical portion 1504*c* of a rotor 1504, there are formed a recessed groove and a through hole 1504*h* which respectively extend in the axial direction of the cylindrical portion 1504*c*, and a pull plate 1556 is fitted into the axial recessed groove and through hole 1504*h* in such a manner that it is free to move back and forth, while one end of a dogleg-shaped spring 1557 is rotatably mounted on the leading end portion of the pull plate 1556.

The other end portion of the spring 1557 is in contact with the back surface of the plate portion 1509*e* of the connecting member 1509".

In the front wall portion 1504*b* of the rotor 1504, there is formed a recessed portion which has a proper depth.

Figure 58:
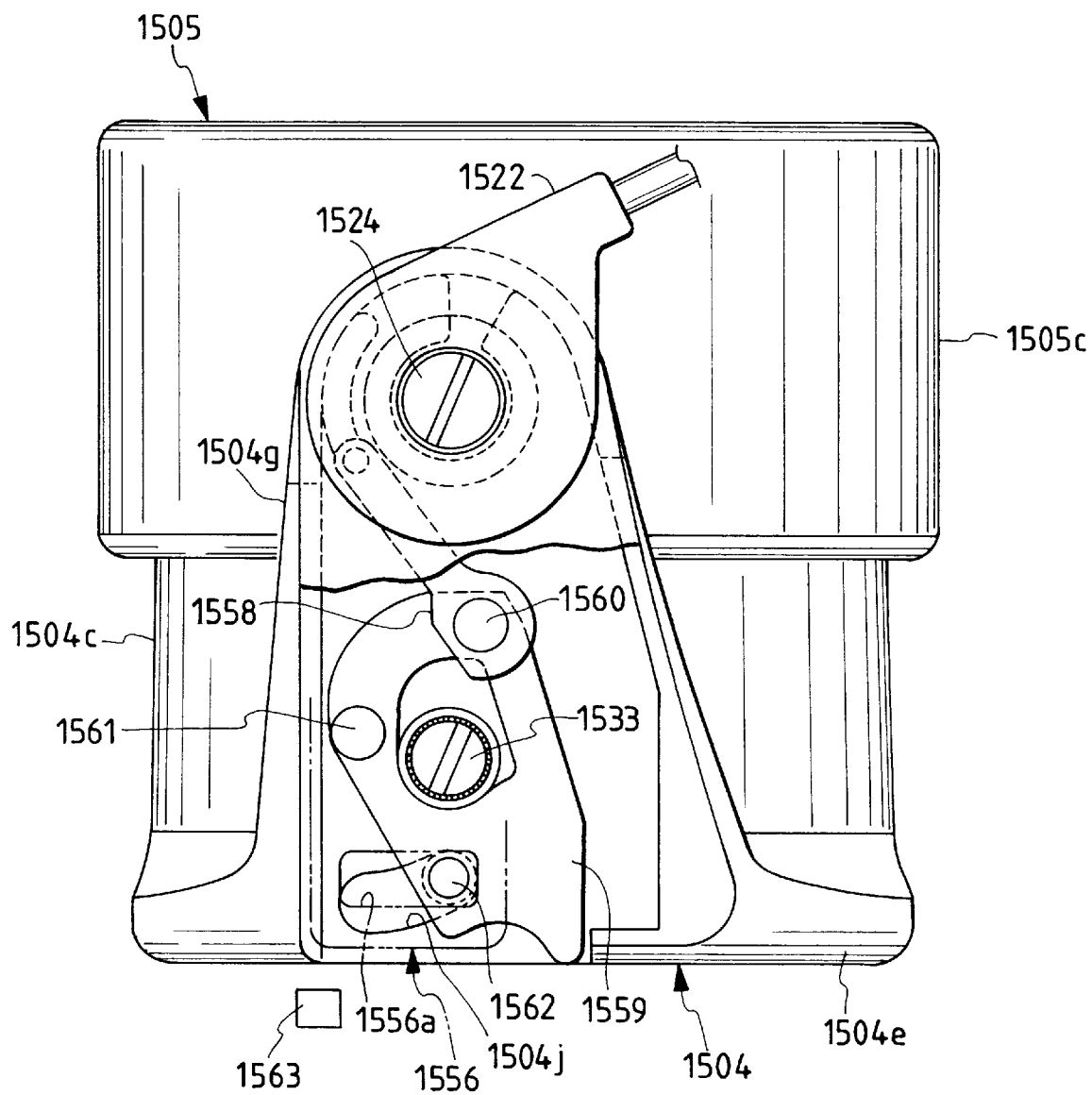
FIG. 58 is an enlarged side view of the other bail support member and the other support arm of the rotor in the fifteenth embodiment, in which the main portions of the other support arm of the rotor are shown in section.

A reverse-function lever 1558 and a rotation lever 1559 are respectively accommodated within the other bail support arm 1504*g* of the rotor 1504 as shown in FIG. 55 and 58, and covered with a cover 1534 which is fixed by a screw 1533.

One end of the reverse-function lever 1558 is engaged with the other bail support member 1522, whereas the other end is connected to the rotation lever 1559 through a pin 1560.

One side portion of the rotation lever 1559 is rotatably journaled on the other support arm 1504*g* of the rotor 1504 through a pin 1561.

One end portion of a thick pin shaft 1562 is fixed to the other side portion of the rotation lever 1559, while the other end portion of the pin shaft 1562 is projected toward the central portion of the rotor 1504 through an arc-shaped through hole 1504*j* formed in the rotor 1504 and is then inserted into a rectangular through hole 1556a which is formed in the pull plate 1556.

The other end portion of the rotation lever 1559 can be projected outwardly and rearwardly from the base portion 1504e of the other bail support arm 1504g so that when it is projected outwardly the other end portion of the rotation lever 1559 is positioned to abut against a butting contact member 1563 disposed on a reel leg (not shown) which is provided in the upper portion of the reel main body 1501.

The remaining portions of the structure of the fifteenth embodiment are substantially the same as those of the previously described thirteenth embodiment.

According to the fifteenth embodiment, when the fishing line 1535 with the terminal tackles is cast a long distance, the two bail support members 1521 and 1522 are respectively reversed to their respective fishing line casting positions and the fishing rod is swung down vigorously.

Figure 59:
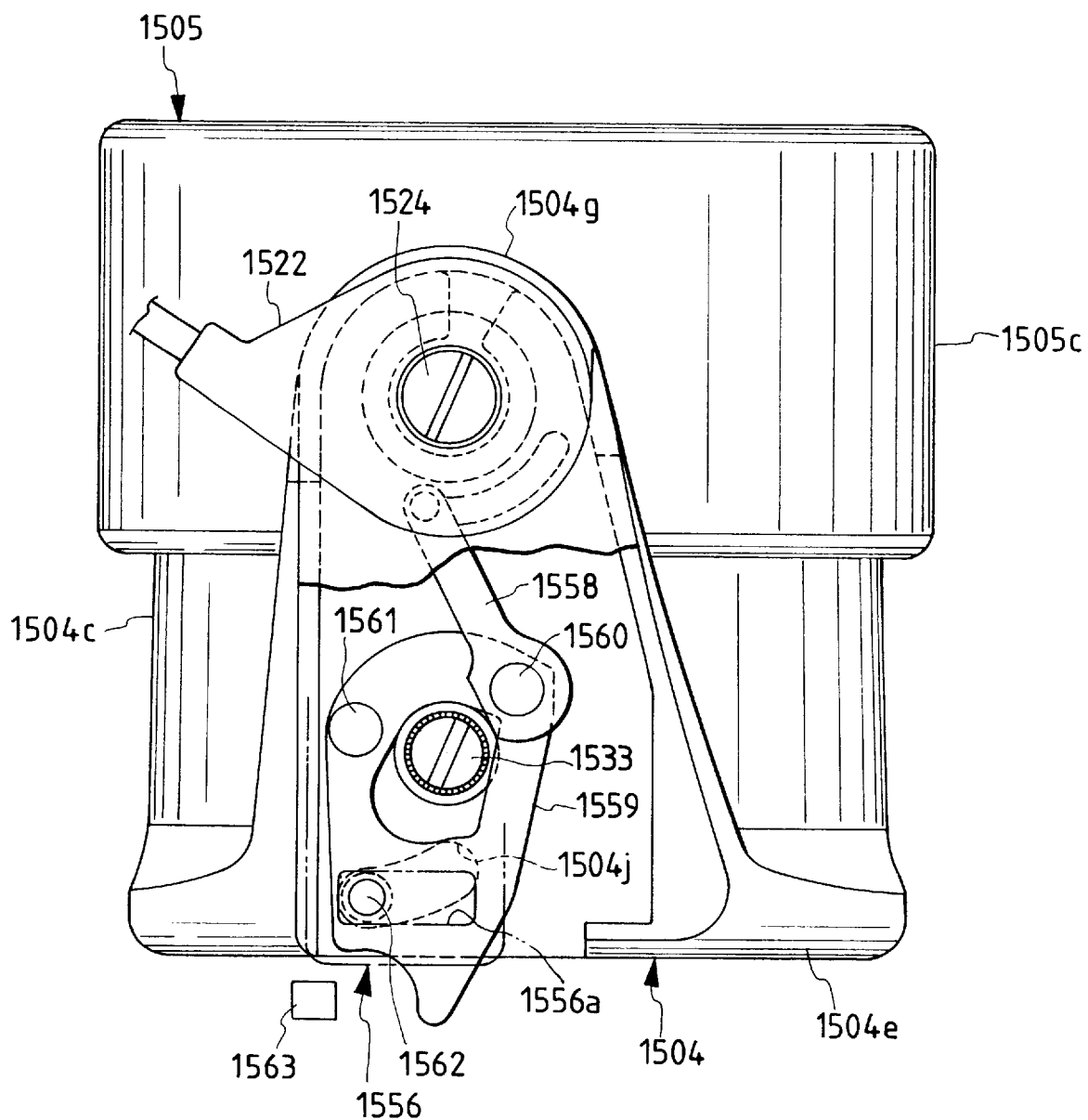
FIG. 59 is an enlarged side view of the other bail support member and the other support arm in the fifteenth embodiment, in which the other bail support member is reversed and the main portions of the other arm are shown in section; and, FIG. 60 is an enlarged sectional side view of the spinning reel for fishing according to the fifteenth embodiment, when the spool is prevented against rotation.
Figure 60:
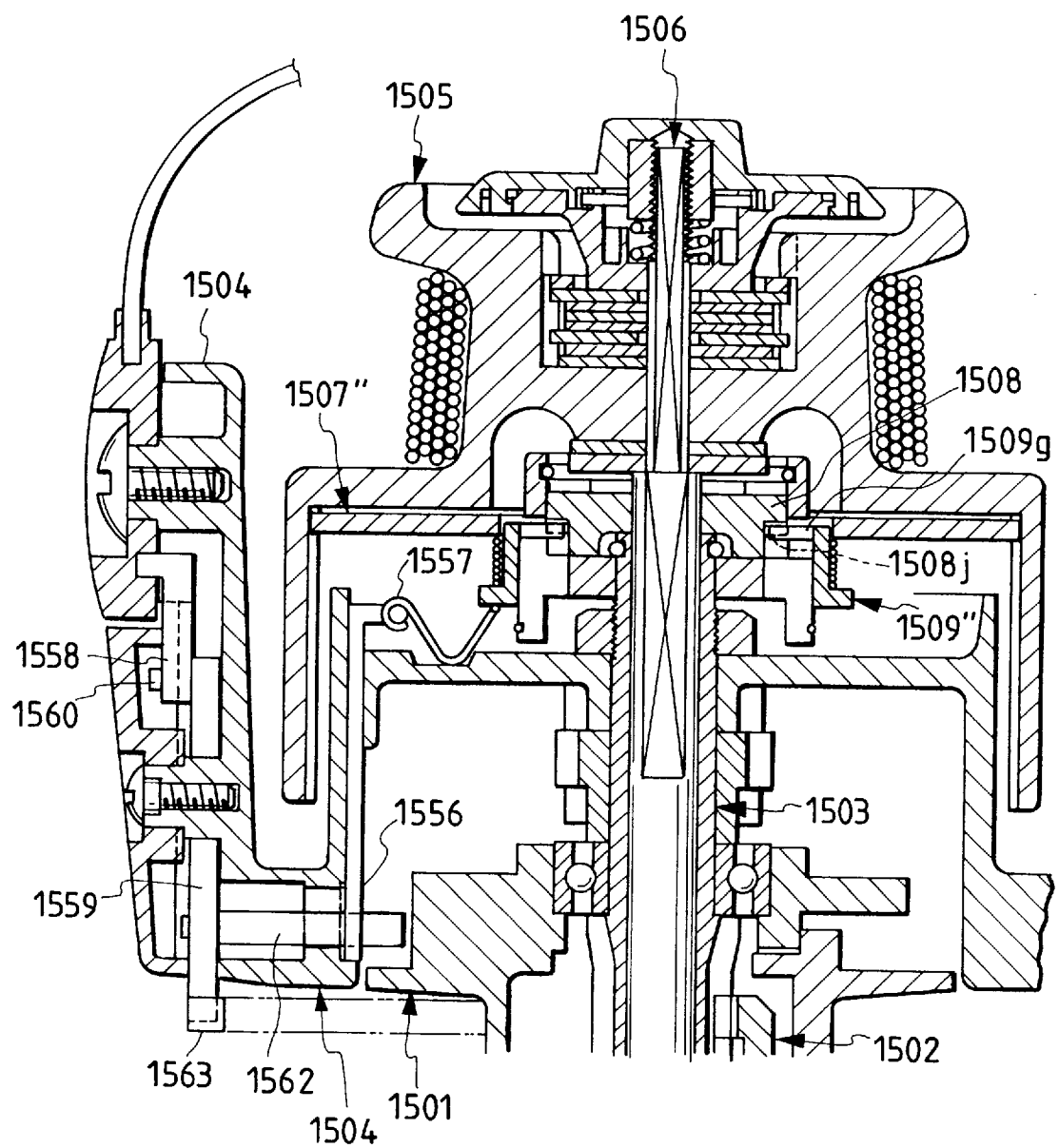

As the bail support members 1521 and 1522 are reversed to their respective fishing line casting positions, as shown in FIGS. 59 and 60, the reverse-function lever 1558 is moved forward. With the forward movement of the reverse-function lever 1558, not only the rotation lever 1559 is rotated but also the other end portion of the rotation lever 1559 is projected outwardly from the base portion 1504e of the other bail support arm 1504g.

As the rotation lever 1559 is rotated, the thick pin shaft 1562 is rotated and the pull plate 1556 is thereby pulled toward the reel main body 1501 rearwardly, while the connecting member 1509" is pushed up by the other end portion of the dogleg-shaped spring 1557.

As the connecting member 1509" is pushed up, the two tongue-like engaging portions 1509g of the connecting member 1509" are respectively engaged with two of a plurality of recessed portions forming the engaging portion 1508j of the second lock member 1508".

Due to this engagement, the connecting member 1509", which is prevented against rotation by the first lock member 1507" in engagement with the spool 1505 in such a manner that it is prevented against rotation, can be brought into contact with the second lock member 1508" which is prevented against rotation by the spool shaft 1506, thereby being able to prevent the spool 1505 from being rotated.

After the casting operation, if the handle 1513 is rotated in a direction in which the fishing line 1535 can be wound around the spool 1505, then the drive gear 1502 is rotated so that the rotary shaft cylinder 1503 and rotor 1504 are rotated forwardly through the pinion 1503a.

With the forward rotation of the rotor 1504, the other end portion of the rotation lever 1559, which is projected outwardly from the base portion 1504e of the other bail support arm 1504g, is butted against the butting contact member 1563 and is rotated to thereby retreat the reverse-function lever 1558. Due to this, the two bail support members 1521 and 1522 are reversed from their respective fishing line casting states to their respective fishing line retrieving states, and the pull plate 1556 is moved forward, thereby releasing the push-up of the connecting member 1509" by the other end portion of the dogleg-shaped spring 1557.

With the release of the push-up of the connecting member 1509", the engagement between the engaging portion 1508j and the engaging portions 1509g is removed to thereby allow the spool 1505 to rotate.

To sum up the structure of the spinning reel for fishing according to the fifteenth embodiment, the first lock member 1507", which is attached to the spool 1505 in such a manner that it is movable in the axial direction but is prevented against rotation in the peripheral direction, is supported in such a manner that it is rotatable with respect to the spool shaft 1506, the second lock member 1508" is supported on the spool shaft 1506 in such a manner that it is prevented against rotation, the connecting means 1509", which is connected to the first lock member 1507" such that it is movable in the axial direction but is prevented against rotation in the peripheral direction, is disposed in such a manner that it can be engaged with and removed from the second lock member 1508", and the engaging portions 1509g of the connecting member 1509" can be engaged with the engaging portion 1508j of the second lock member 1508" in linking with the reversing operation of the two bail support members 1521 and 1522 from their respective fishing line retrieving positions to their respective fishing line casting positions.

Therefore, according to this structure, the spool 1505 is prevented against rotation during the casting operation. Thus, when the casting operation is carried out while the drag force of the drag mechanism is set to a weak level in order to prevent the fishing line from being cut by fish hitting the bait, there is eliminated the possibility that the spool 1505 can be rotated due to the weight of the terminal tackles just as the terminal tackles are thrown to play out the fishing line, so that the fingers of the angler can be protected against damage as well as the terminal tackles can be thrown securely.

As has been described heretofore, according to the invention, even if a drag force is set to a weak level, since the rotation of a spool is locked in a fishing line casting operation, the fingers of an angler can be protected against damage. Also, an operation to return a bail back to its fishing line retrieving state after a fishing line is cast can be carried out automatically and smoothly simply by operating or rotating a rotor in a fishing line retrieving direction, which eliminates the need for the angler to return the bail directly by hand. Thanks to this, the bail return operation is improved in efficiency and the fishing line can be retrieved just after it is cast, so that the angler can enjoy fishing comfortably.

Further, according to the invention, a spring member or a member having a spring property such as a spring body or the like is inserted between a kick member and a securing member (a securing claw), or a securing claw is so formed as to have a spring property. Accordingly, even if, during the reversal operation of a bail support member from a fishing line retrieving state to a fishing line casting state, the securing claw undesirebly attempt to run up onto a projecting portion formed between two mutually adjoining securing grooves, this run-up phenomenon or operation can be absorbed by the spring member or by the spring property of the spring body. With the run-up phenomenon being absorbed in this manner, the securing member can be rotated until it is secured to the securing groove that is situated on the downstream side of the rotational direction of the spool, so that the bail reversing operation can be improved in efficiency and reliability.

What is claimed is:

1. A spinning reel for fishing, comprising:
   a spool;
   a rotor rotatable about the spool for winding a fishing line around the spool;
   a spool shaft;
   a drag mechanism for frictionally coupling the spool to the spool shaft;
   a bail pivotable with respect to the rotor and movable from a fishing line casting position to a fishing line retrieving position and vice versa;

a first engagement member non-rotatably supported on the spool shaft;

a second engagement member interposed between the first engagement member and the spool, and movable radially with respect to the spool so that the first engagement member is operatively engageable with and disengageable from the spool;

first means for radially moving the second engagement member to engage the first engagement member with the spool to thereby prevent the spool from rotating relative to the spool shaft when the bail is switched from the fishing line retrieving position to the fishing line casting position, and second means for radially moving the second engagement member to disengage the first engagement member from the spool to thereby permit the spool to rotate relative to the spool shaft when the bail is switched from the fishing line casting position to the fishing line retrieving position upon rotation of the rotor.

2. A spinning reel for fishing according to claim 1, wherein a plurality of axially extending grooves are formed in an inner peripheral portion of the spool, and the second engagement member is radially movably supported on the first engagement member so as to be engageable with and disengageable from one of the plurality of grooves.

3. A spinning reel for fishing according to claim 1, wherein the second means includes elastic means for energizing the second engagement member in a direction to disengage the first engagement member from the spool.

4. A spinning reel for fishing according to claim 3, wherein the first means includes means for moving the second engagement member against an energizing force of the elastic means to engage the first engagement member with the spool when the bail is switched from the fishing line retrieving position to the fishing line casting position.

5. A spinning reel for fishing wherein a bail support member is supported on a rotor rotatable in accordance with operation of a handle in such a manner that the bail support member can be freely reversed between a fishing line retrieving position and a fishing line casting position, and wherein a return mechanism is provided for returning the bail support member from the fishing line casting position to the fishing line retrieving position by rotating the rotor in a fishing line retrieving direction, said spinning reel for fishing comprising:

a securing claw member engageable with and disengageable from a securing groove formed in an inner peripheral surface of a spool, radially movably mounted on a support body non-rotatably supported on a spool shaft, and energized in a direction to disengage from the securing groove;

an actuator rotatable together with the rotor and axially movable with respect to the rotor, the actuator including an engaging portion engageable with the securing claw member; and a mechanical coupling interconnecting the bail support member and the actuator;

wherein the actuator is moved via the mechanical coupling in accordance with the bail support member being reversed from the fishing line retrieving position to the fishing line casting position so that the securing claw member is moved by contact with the engaging portion of the actuator to engage the securing groove to thereby prevent the spool from rotating, and wherein the securing claw member is moved by contact with the engaging portion of the actuator to disengage from the securing groove when the actuator is moved via the mechanical coupling in accordance with the bail support member being returned from the fishing line casting position to the fishing line retrieving position, thereby permitting the spool to rotate.

* * * * *